United States Patent
Yamashita et al.

(10) Patent No.: US 8,020,666 B2
(45) Date of Patent: Sep. 20, 2011

(54) LUBRICATION DEVICE AND OIL PAN

(75) Inventors: Yoshio Yamashita, Toyota (JP); Hideo Kobayashi, Mishima (JP); Katuhiko Arisawa, Gotenba (JP); Kenichi Yamada, Yaizu (JP); Kunihiko Hayashi, Odawara (JP); Taiithi Mori, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 546 days.

(21) Appl. No.: 12/278,355

(22) PCT Filed: Feb. 7, 2007

(86) PCT No.: PCT/JP2007/052548
§ 371 (c)(1),
(2), (4) Date: Aug. 5, 2008

(87) PCT Pub. No.: WO2007/091720
PCT Pub. Date: Aug. 16, 2007

(65) Prior Publication Data
US 2009/0014248 A1   Jan. 15, 2009

(30) Foreign Application Priority Data
Feb. 7, 2006   (JP) .................... 2006-029351

(51) Int. Cl.
*F01M 1/02*   (2006.01)
*F01M 1/10*   (2006.01)
*F16N 31/00*   (2006.01)

(52) U.S. Cl. .................. 184/6.24; 184/26; 184/106

(58) Field of Classification Search ................. 184/6.24, 184/26, 104.2, 106; 123/196 R
See application file for complete search history.

(56) References Cited

U.S. PATENT DOCUMENTS

| | | | |
|---|---|---|---|
| 4,258,679 A | 3/1981 | Leitermann | |
| 5,454,355 A * | 10/1995 | van der Griendt | ........ 123/196 A |
| 5,782,616 A * | 7/1998 | Yoo | ................. 417/364 |
| 6,637,551 B2 * | 10/2003 | Heath et al. | .................. 184/6.24 |
| 7,143,867 B2 * | 12/2006 | Chopra | ..................... 184/103.2 |
| 7,654,241 B2 * | 2/2010 | Kobayashi et al. | ....... 123/195 C |
| 2005/0098384 A1 * | 5/2005 | Chang | .............................. 184/1.5 |
| 2005/0126649 A1 | 6/2005 | Onishi | |
| 2008/0210491 A1 * | 9/2008 | Mori et al. | ..................... 184/106 |

FOREIGN PATENT DOCUMENTS

| | | |
|---|---|---|
| DE | 28 17 743 A1 | 10/1979 |
| DE | 37 29 545 A1 | 3/1988 |
| EP | 1 553 297 A3 | 7/2005 |
| FR | 2 423 632 A | 11/1979 |
| JP | 54-140034 A | 10/1979 |
| JP | 55-036799 U | 3/1980 |

(Continued)

*Primary Examiner* — Michael Mansen
*Assistant Examiner* — Robert Reese
(74) *Attorney, Agent, or Firm* — Sughrue Mion, PLLC

(57) ABSTRACT

An oil pan separator 132 is disposed so as to divide a space within an oil pan 130 into a first chamber 30*a* and a second chamber 30*b*. The oil pan separator 132 has a protrusion 132*b* formed at a low position in such a manner that a portion of the first chamber 30*a* protrudes into the second chamber 30*b*. A protrusion upper-plate 132*b*1, which serves as an upper end portion of the protrusion 132*b*, is provided with an oil feed valve 138, which is a one-way valve, for allowing substantially only outflow of oil from the first chamber 30*a* to the second chamber 30*b*.

26 Claims, 21 Drawing Sheets

FOREIGN PATENT DOCUMENTS

| | | |
|---|---|---|
| JP | 57-076217 A | 5/1982 |
| JP | 61-009510 U | 1/1986 |
| JP | 61-066813 A | 4/1986 |
| JP | 04-001613 U | 1/1992 |
| JP | 05-043850 B2 | 7/1993 |
| JP | 2001-152825 A | 6/2001 |
| JP | 2003-222012 A | 8/2003 |
| JP | 2005-023899 A | 1/2005 |
| JP | 2005-048695 A | 2/2005 |
| JP | 2005-172206 A | 6/2005 |

* cited by examiner

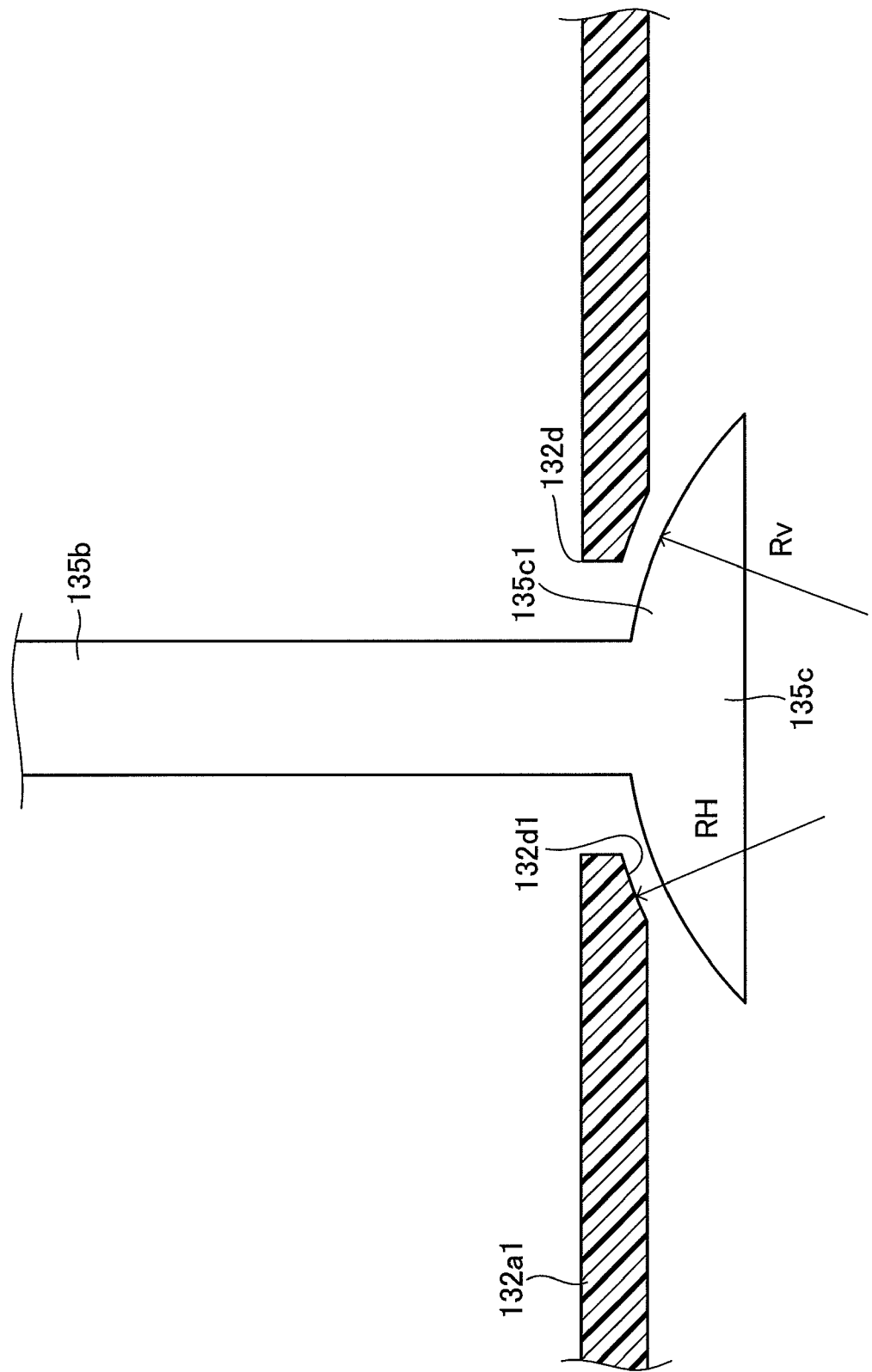

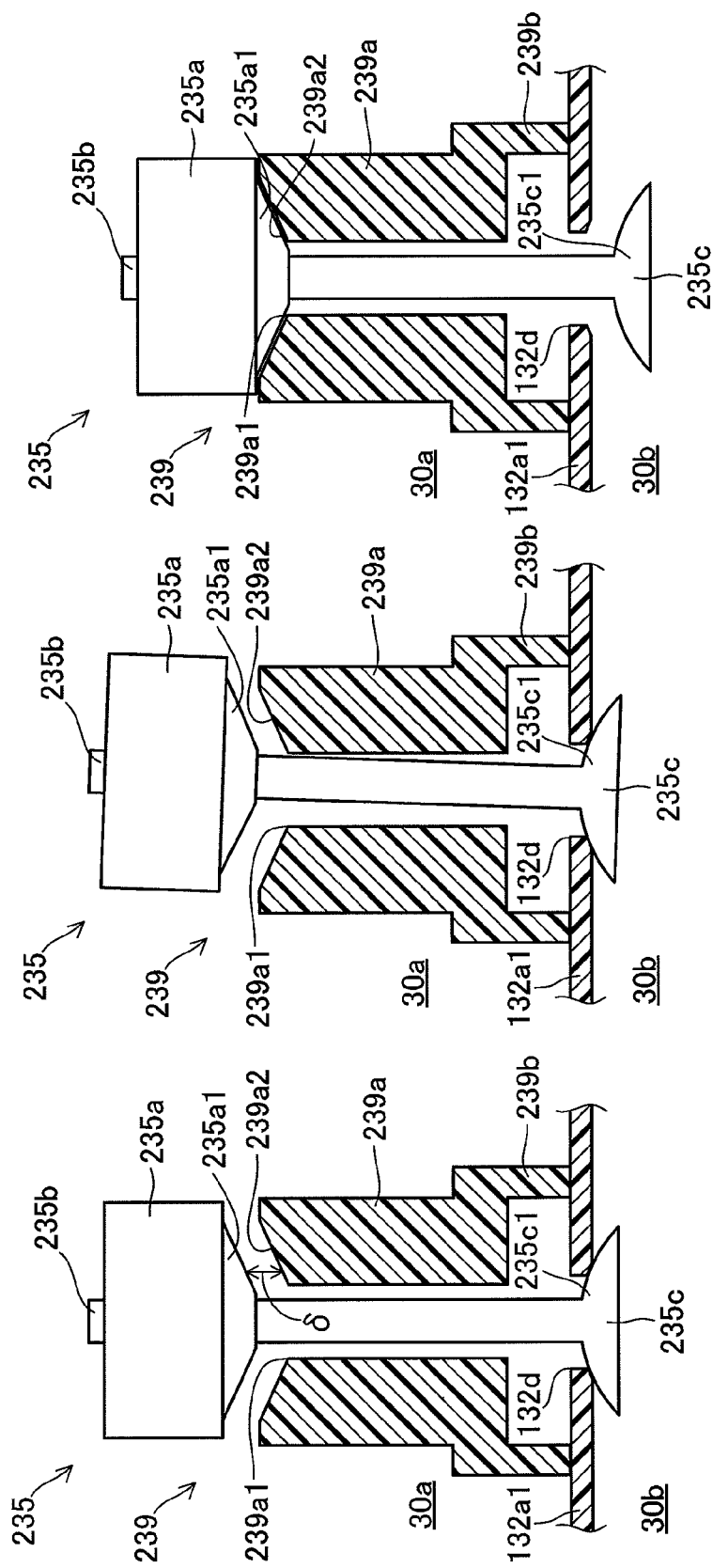

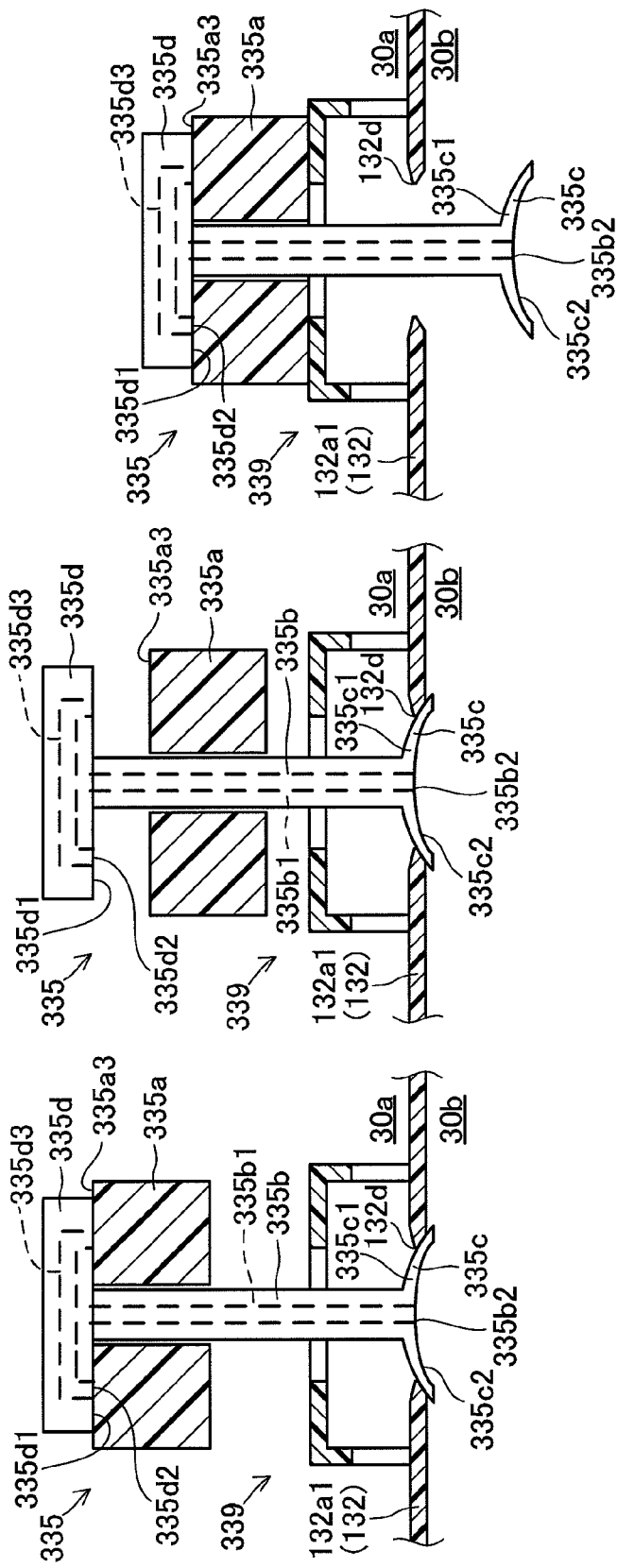

LUBRICATION DEVICE AND OIL PAN

TECHNICAL FIELD

The present invention relates to an oil pan capable of storing oil for lubricating a mechanism-to-be-lubricated (e.g., an engine block, an automatic transmission mechanism, or the like). The present invention also relates to a lubrication device (e.g., an engine, an automatic transmission, or the like) having the oil pan and configured to be able to feed the oil to the mechanism-to-be-lubricated.

BACKGROUND ART

Generally, a lubrication device of this kind is configured to be able to suck up the oil stored in the oil pan by means of an oil pump and to feed the sucked-up oil to members-to-be-lubricated (e.g., gears, cam shafts, cylinders, pistons, etc.) in the mechanism-to-be-lubricated. The lubrication device is configured to provide a lubricating action for the members-to-be-lubricated and such that the oil which has absorbed heat, such as frictional heat, from the members-to-be-lubricated returns into the oil pan from the mechanism-to-be-lubricated under the action of gravity.

A widely known structure for the oil pan is a so-called 2-chamber-type oil pan structure, which can accelerate the progress of a warming-up operation by means of accelerating an increase in temperature of the oil. The oil pan having the 2-chamber-type oil pan structure (hereinafter, referred to merely as the "2-chamber-type oil pan") is configured such that the interior of the oil pan is divided into two chambers; namely, a main chamber (may be referred to as a first chamber) and a sub-chamber (may be referred to as a second chamber).

The lubrication device having the 2-chamber-type oil pan is configured to feed the oil contained in the main chamber to the mechanism-to-be-lubricated. The 2-chamber-type oil pan is configured to restrict the flow of the oil between the main chamber and the sub-chamber during a warming-up operation, in which the temperature of the oil (and the temperature of the members-to-be-lubricated) is low, and to cancel the restriction after completion of the warming-up operation when the temperature of the oil (and the temperature of the members-to-be-lubricated) has increased to an appropriate level.

The 2-chamber-type oil pan operates as follows. First, during the warming-up operation, the flow of the oil between the main chamber and the sub-chamber is restricted. This restricts the amount of the oil to be circulated between the mechanism-to-be-lubricated and the oil pan virtually to the amount of the oil stored in the main chamber. Therefore, the temperature of the oil contained in the main chamber (and the temperature of the members-to-be-lubricated) increases promptly, so that the progress of the warming-up operation can be accelerated.

After completion of the warming-up operation, the restriction is mitigated or canceled. This enables the oil stored in the sub-chamber to flow into the main chamber. Specifically, substantially the whole quantity of the oil contained in the oil pan can serve in circulation between the mechanism-to-be-lubricated and the oil pan. Therefore, in the mechanism-to-be-lubricated, the oil can carry out good lubrication and cooling.

Known examples of such the 2-chamber-type oil pan are described in Japanese Patent Application Laid-Open (kokai) No. 2003-222012 (Patent Document 1) and Japanese Patent Publication (kokoku) No. 5-43850 (Patent Document 2).

According to the configuration described in Japanese Patent Application Laid-Open (kokai) No. 2003-222012 (Patent Document 1), an oil pan separator is disposed in the inner space of the oil pan. The oil pan separator is configured and disposed to divide the inner space of the oil pan into two chambers; namely, the main chamber and the sub-chamber.

The main chamber is formed in such a manner as to open toward an engine block, which serves as the mechanism-to-be-lubricated. The main chamber is provided in a communicating relation with the engine block so as to be able to receive the oil that returns to the oil pan from the engine block. An oil strainer is disposed in a bottom region of the main chamber. The oil strainer is connected to the oil pump and has a suction port through which the oil residing in the main chamber is sucked up.

The oil pan separator has first communication holes and second communication holes for establishing communication between the main chamber and the sub-chamber. The first communication holes are located above the second communication holes, and each has a larger opening diameter than do the second communication holes. For example, several first communication holes are formed as circular through-holes each having a diameter of about 8 mm. A large number (10-odd to tens) of second communication holes are formed as circular through-holes each having a diameter of about 2 mm.

In the 2-chamber-type oil pan having the above configuration, a change in viscosity of the oil associated with a change in temperature of the oil controls the flow condition of the oil between the main chamber and the sub-chamber.

Specifically, during the warming-up operation, the oil which resides in a bottom region of the sub-chamber and which is low in temperature and high in viscosity encounters difficulty in passing through the second communication holes, which are small in opening diameter and are formed at a lower level. Even during the warming-up operation, the oil that resides in an upper region of the sub-chamber and is relatively high in temperature can readily flow into an upper region of the main chamber through the first communication holes, which are large in opening diameter and are formed at an upper level. Meanwhile, as the warming-up operation progresses, and thus the temperature of the oil in the sub-chamber rises, the oil can flow between the main chamber and the sub-chamber through the first communication holes and through the second communication holes.

According to the configuration described in Japanese Patent Publication (kokoku) No. 5-43850 (Patent Document 2), a partition that separates the main chamber and the sub-chamber from each other has a communication section. The communication section has a valve device that operates according to the temperature of the oil contained in the main chamber. The valve device has a thermostat valve, which is closed until the temperature of the oil rises to a high-temperature-side set temperature (e.g., about 60° C.) which is a relatively high temperature as a result of the warming-up operation and which opens when the temperature of the oil rises to the high-temperature-side set temperature or higher.

DISCLOSURE OF THE INVENTION

In a device having the 2-chamber-type oil pan described in Japanese Patent Application Laid-Open (kokai) No. 2003-222012 (Patent Document 1), even during the warming-up operation, the main chamber and the sub-chamber are communicated with each other through the first communication holes and the second communication holes. Accordingly, during the warming-up operation, the inflow of the oil into the main chamber from the sub-chamber is insufficiently and unstably restricted. Thus, the effect of the 2-chamber-type oil pan; i.e., the acceleration of the progress of the warming-up operation, is not necessarily sufficiently yielded.

Also, in the device, assuming an oil flow path along which the oil flows into the main chamber from the sub-chamber through the first communication holes and through the second communication holes and is then sucked into the suction port of the oil strainer, the flow resistance of the oil flowing through the oil flow path is taken as $R_{2-1}$. Also, assuming an oil flow path along which the oil stored originally in the main chamber is sucked into the suction port of the oil strainer, the flow resistance of the oil flowing through the oil flow path is taken as $R_{1-1}$. In this case, apparently, $R_{2-1}$ is greater than $R_{1-1}$.

Accordingly, in the device, even after completion of the warming-up operation, similar to the period of the warming-up operation, mainly the oil stored in the main chamber is sucked up through the suction port of the oil strainer and is fed to the mechanism-to-be-lubricated. Therefore, in the device, the oil stored in the sub-chamber is unlikely to serve in circulation between the engine block and the oil pan. For this reason, in the device, the oil stored in the oil pan (particularly, the oil continuously stored in the main chamber) can accelerate in deterioration.

Meanwhile, in a device having the 2-chamber-type oil pan described in Japanese Patent Publication (kokoku) No. 5-43850 (Patent Document 2), by means of opening and closing the valve device, an oil path having a relatively large opening diameter can be reliably opened and closed according to the condition of operation. Therefore, during the warming-up operation, the inflow of the oil into the main chamber from the sub-chamber can be reliably restricted After completion of the warming-up operation, communication is established between the main chamber and the sub-chamber through the oil communication path, whereby the inflow of the oil into the main chamber from the sub-chamber can be facilitated.

However, in the device, at the time of oil change, the temperature of the oil contained in the main chamber is not higher than the high-temperature-side set temperature; thus, the valve device is closed. Accordingly, when fresh oil is injected into the empty oil pan, difficulty is encountered in smoothly carrying out the injecting operation.

Specifically, at the time of the injecting operation, usually, the fresh oil is first injected into the main chamber, in which the suction port is located. Then, the oil flows out into the sub-chamber from the main chamber, whereby the oil can uniformly spread throughout the interior of the oil pan. However, when the valve device is closed, difficulty is encountered in promptly carrying out the outflow of the oil from the main chamber into the sub-chamber. In this case, the main chamber and the sub-chamber differ in oil level. Thus, at the time of oil change, difficulty is encountered in adjusting the oil level in the oil pan by use of an oil level gauge.

The present invention has been made for solving the aforementioned problems, and an object of the invention is to provide a 2-chamber-type oil pan that favorably accelerates a warming-up operation, restrains early deterioration of the oil to the greatest possible extent, and enables prompt oil-change work, as well as a lubrication device having the 2-chamber-type oil pan.

A lubrication device to which the present invention is applied is configured to be able to feed oil for lubricating a mechanism-to-be-lubricated to the mechanism. The lubrication device comprises an oil pan, an oil pump, and an oil strainer. The oil pan to which the present invention is applied is configured to be able to store the oil in a space within the oil pan. The oil pan comprises an oil pan cover and an oil pan separator.

The oil pump is configured to be able to deliver the oil stored in the oil pan to the mechanism-to-be-lubricated. The oil strainer has a suction port through which the oil residing in the space is sucked up, and is connected to the oil pump via an oil flow path.

The oil pan cover has an oil storage cavity section opening toward the mechanism-to-be-lubricated. The oil pan separator is configured and disposed to divide a space within the oil storage cavity section into a first chamber and a second chamber.

The first chamber opens toward the mechanism-to-be-lubricated so as to communicate with the mechanism-to-be-lubricated. The suction port of the oil strainer is disposed in a bottom region of the first chamber. The second chamber is disposed adjacent to the first chamber.

The oil pan of the present invention can be provided with a communication valve. The communication valve is provided on the oil pan separator. The communication valve is configured to be able to establish communication between the first chamber and the second chamber according to an operating condition of the mechanism-to-be-lubricated.

(1) In order to achieve the above-mentioned object, the oil pan and the lubrication device of the present invention are characterized by having a one-way valve configured to be able to allow substantially only outflow of the oil from the first chamber to the second chamber. The one-way valve is provided on the oil pan separator. The one-way valve is configured to function according to a difference in oil level between the first chamber and the second chamber.

In such the configuration, when the mechanism-to-be-lubricated is operated, the oil pump is actuated. When the oil pump is actuated, the oil residing in a bottom region of the first chamber is sucked up through the suction port of the oil strainer and is fed to the oil pump through the oil flow path. The oil that has been sucked up from the bottom region of the first chamber and fed to the oil pump is delivered to the mechanism-to-be-lubricated by the oil pump.

The oil fed to the mechanism-to-be-lubricated provides a lubricating action for the mechanism-to-be-lubricated and absorbs heat that has been generated by friction and combustion of fuel in the mechanism-to-be-lubricated, thereby rising in temperature. The oil whose temperature has risen returns toward the oil pan under the action of gravity. The return oil flows into the first chamber, which communicates with the mechanism-to-be-lubricated, whereby the oil stored in the first chamber rises in temperature.

Immediately before start-up, the first chamber and the second chamber have substantially the same oil level. However, when a warming-up operation starts subsequent to a cold start, as mentioned above, the oil contained in the first chamber is sucked up by the oil pump. As a result, the first chamber becomes lower in oil level than the second chamber; thus, a difference in oil level arises between the first chamber and the second chamber.

The one-way valve is configured to allow substantially only outflow of the oil from the first chamber to the second chamber. Therefore, even when the above-mentioned difference in oil level arises, inflow of the oil into the first chamber from the second chamber through the one-way valve substantially does not arise.

As mentioned above, during the warming-up operation, the oil contained in the first chamber is sucked up by the oil pump, whereas inflow of the oil into the first chamber from the second chamber is restricted. Particularly, inflow of the oil into the first chamber from the second chamber through the one-way valve substantially does not arise.

Accordingly, the amount of the oil circulated between the mechanism-to-be-lubricated and the oil pan is restricted substantially to the amount of the oil stored in the first chamber. Therefore, an increase in temperature of the oil contained in the first chamber is accelerated, whereby the progress of the warming-up operation is accelerated.

An operational changeover from the warming-up operation to a post-warming-up operation can be made according to an operating condition of the mechanism-to-be-lubricated. Example factors that can be used as the "operating condition" include the temperature of the oil, a cooling water temperature, and time that has elapsed from the start of operation (these factors relating to the "operating condition" can be used singly or in combination).

When the whole quantity of the oil is to be drained from the oil pan for oil change, usually, a drain bolt is removed from a bottom portion of the oil pan cover, whereby a drain bolt hole, which has been closed by the drain bolt, is opened.

When the drain bolt hole is opened, the oil contained in the second chamber is preferentially drained to the exterior of the oil pan, and thus the oil level of the second chamber drops. This brings about a difference in oil level (a difference of a predetermined amount) between the second chamber and the first chamber such that the oil level of the first chamber becomes higher than that of the second chamber.

When such a difference in oil level arises, the one-way valve functions so as to allow substantially only outflow of the oil from the first chamber to the second chamber. Through functioning of the one-way valve, the oil remaining in the first chamber flows out into the second chamber and is then drained to the exterior of the oil pan via the second chamber and the drain bolt hole. Accordingly, the oil stored in the oil pan is efficiently and promptly drained to the exterior of the oil pan.

Furthermore, at the time of oil change, when fresh oil is injected into the empty oil pan, for example, the oil intensively flows into the first chamber. Thus, the oil level of only the first chamber rises. Also, in this case, there arises a difference in oil level between the first chamber and the second chamber such that the oil level of the first chamber becomes higher than that of the second chamber.

Similar to the aforementioned case, this difference in oil level causes the one-way valve to function. As a result, the fresh oil injected into the first chamber is also fed into the second chamber via the one-way valve. Thus, the first chamber and the second chamber can be reliably adjusted in oil level. Therefore, the fresh oil can be efficiently and smoothly injected into the oil pan.

Thus, according to the present configuration, the warming-up operation can be favorably accelerated; early deterioration of the oil can be restrained to the greatest possible extent; and, in oil-change work, the oil can be promptly drained and injected.

(2) The oil pan and the lubrication device may be configured as follows. The oil pan separator comprises a bottom plate and a side plate. The side plate is provided in such a manner as to surround the bottom plate. The side plate is connected to an end portion of the bottom plate. Also, a first-chamber-forming cavity section formed of the side plate and the bottom plate is configured to open toward the mechanism-to-be-lubricated.

More preferably, the bottom plate and the side plate are integrally formed. More preferably, the bottom plate and the side plate are formed from a material having low thermal conductivity and high thermal insulation performance (heat-resistant synthetic resin, etc.).

In such the configuration, the oil pan cover, which opens (upward) toward the mechanism-to-be-lubricated, is disposed externally of the first-chamber-forming cavity section, which opens (upward) toward the mechanism-to-be-lubricated. By virtue of this arrangement, a space located externally of the first-chamber-forming cavity section of the oil pan separator serves as the second chamber.

Specifically, by means of disposing the oil pan separator in such a manner that the side plate is spaced apart from the inner side surface of the oil pan cover, the second chamber can be formed on the laterally outer side of the first chamber. Also, by means of disposing the oil pan separator in such a manner that the bottom plate is spaced apart from the inner wall surface of a lower end portion of the oil pan cover, the second chamber can be formed on the downward outer side of the first chamber.

Being formed externally of the first chamber, the second chamber can function as a thermally insulating layer that covers the first chamber in a thermally insulative manner.

At the time of oil change, as mentioned previously, when the drain bolt hole is opened through removal of the drain bolt, first, the oil contained in the second chamber, which is formed externally of the first chamber, is drained to the exterior of the oil pan. As a result, the oil level of the second chamber drops. This brings about a difference in oil level (a difference of a predetermined amount) between the second chamber and the first chamber located inwardly of the second chamber such that the oil level of the first chamber becomes higher than that of the second chamber.

When such a difference in oil level arises, the one-way valve functions so as to allow substantially only outflow of the oil from the first chamber to the second chamber. Through functioning of the one-way valve, the oil remaining in the first chamber flows out into the second chamber and is then drained to the exterior of the oil pan via the second chamber and the drain bolt hole. In this manner, the oil stored in the oil pan is efficiently and promptly drained to the exterior of the oil pan.

Furthermore, at the time of oil change, when fresh oil is injected into the empty oil pan, for example, the oil intensively flows into the first-chamber-forming cavity section. This brings about a difference in oil level between the first chamber and the second chamber.

Because of this difference in oil level, the fresh oil injected into the first-chamber-forming cavity section flows out, via the one-way valve, into the second chamber formed externally of the first-chamber-forming cavity section. In this manner, the oil injected into the first-chamber-forming cavity section is also fed into the second chamber.

According to the present configuration, at the time of the warming-up operation, since the first chamber is covered in a thermally insulative manner by the second chamber formed externally of the first chamber, an increase in temperature of the oil contained in the first chamber can be effectively accelerated. This can further accelerate the progress of the warming-up operation.

Also, according the present configuration, even though the second chamber is formed externally of the first chamber, when the whole quantity of the oil stored in the oil pan is to be drained, the oil can be efficiently drained from the first chamber into the second chamber formed externally of the first chamber. Also, when the fresh oil is injected into the oil pan, the oil can be efficiently fed from the first chamber into the second chamber formed externally of the first chamber. Thus, the oil-change work can be carried out promptly.

(2') The oil pan and the lubrication device may further comprise a return-oil storage separator and an oil return control valve.

The return-oil storage separator is configured to be able to form a return-oil storage chamber above the second chamber. The return-oil storage chamber is formed to be able to store a residual portion of return oil, which returns toward the oil pan from the mechanism-to-be-lubricated, other than a portion of the return oil which returns directly to the first chamber.

The oil return control valve is provided on the return-oil storage separator. The oil return control valve is configured to be able to allow inflow of the oil into the second chamber from the return-oil storage chamber by means of opening according to an operating condition of the mechanism-to-be-lubricated.

Specifically, the return-oil storage separator can comprise a horizontal partition plate and a vertical partition plate. The horizontal partition plate is connected to the upper end of the first-chamber-forming cavity section of the oil pan separator. The horizontal partition plate is configured and disposed to separate the second chamber and the return-oil storage chamber from each other with respect to the vertical direction.

The vertical partition plate stands upward from the horizontal partition plate. A cavity defined by the horizontal partition plate and the vertical partition plate and capable of storing the oil serves as the return-oil storage chamber.

In such the configuration, as mentioned previously, the oil that has been fed to the mechanism-to-be-lubricated carries out lubrication and cooling for the mechanism-to-be-lubricated to thereby increase in temperature, and then returns toward the oil pan under the action of gravity. A portion of the return oil flows into the first chamber, which communicates with the mechanism-to-be-lubricated. This causes an increase in temperature of the oil stored in the first chamber. Also, the residual portion of the return oil is received and temporarily stored by the return-oil storage chamber.

During the warming-up operation, the oil return control valve provided on the return-oil storage separator is closed, thereby shutting off communication between the second chamber and the return-oil storage chamber.

Thus, a restricted amount of the oil is circulated between the mechanism-to-be-lubricated and the oil pan, thereby accelerating an increase in temperature of the oil contained in the first chamber. Also, a predetermined amount of the return oil is stored in the return-oil storage chamber, which is located above the second chamber.

After the warming-up operation is completed, through opening of the oil return control valve, the return oil stored in the return-oil storage chamber flows into an upper region of the second chamber, so that the oil level of the second chamber rises. The rising of the oil level of the second chamber brings about a difference in oil level such that the oil level of the second chamber becomes higher than that of the first chamber.

According to the present configuration, while promptness of the oil-change work is ensured, subsequently to completion of the warming-up operation, the oil contained in the oil pan can be efficiently circulated.

(3) The oil pan and the lubrication device may be configured as follows. The oil pan separator has an oil feed hole in the form of a through-hole formed in a region between the bottom plate and an upper end portion of the side plate. The one-way valve has an oil-feed-hole shutoff valve body configured and disposed to be able to open and close the oil feed hole according to a difference in oil level between the first chamber and the second chamber.

In such the configuration, at the time of oil change, as mentioned previously, there arises a difference in oil level (a difference of a predetermined amount) such that the oil level of the first chamber becomes higher than that of the second chamber. This difference in oil level causes the oil-feed-hole shutoff valve body to open the oil feed hole, whereby the oil flows out from the first chamber having a high oil level to the second chamber having a low oil level.

Meanwhile, during the warming-up operation, even though there arises a difference in oil level such that the oil level of the second chamber becomes higher than that of the first chamber, the oil feed hole is closed by the oil-feed-hole shutoff valve body. During the warming-up operation, this restricts inflow of the oil into the first chamber from the second chamber through the oil feed hole.

According to the present configuration, during the warming-up operation, inflow of the oil into the first chamber from the second chamber through the oil feed hole can be reliably restricted by means of a simple device configuration. Also, the one-way valve that enables prompt oil-change work can be implemented by means of a simple device configuration.

(4) The oil feed hole and the oil-feed-hole shutoff valve body may be formed such that an outer perimeter of the oil-feed-hole shutoff valve body and a perimeter of the oil feed hole are in line contact with each other.

In such the configuration, when the oil level in the second chamber is higher than the oil feed hole and the oil-feed-hole shutoff valve body, sludge, impurities, and the like may precipitate toward a contact region between the outer perimeter of the oil-feed-hole shutoff valve body and the perimeter of the oil feed hole.

However, in the present configuration, the outer perimeter of the oil-feed-hole shutoff valve body and the perimeter of the oil feed hole are in line contact with each other. That is, in contrast to the case where the outer perimeter of the oil-feed-hole shutoff valve body and the perimeter of the oil feed hole are in surface contact with each other (in contact with each other via a relatively wide area), the present configuration is small in area where the outer perimeter of the oil-feed-hole shutoff valve body and the perimeter of the oil feed hole face each other across a narrow clearance and where the sludge and the like may be retained.

Thus, the present configuration can restrain, to the greatest possible extent, occurrence of problems, such as a failure in an appropriate opening-closing operation of the oil-feed-hole shutoff valve body according to the above-mentioned difference in oil level, and at-all-times establishment of communication through the oil feed hole, which could otherwise result from adhesion of the sludge and the like to a contact region between the outer perimeter of the oil-feed-hole shutoff valve body and the perimeter of the oil feed hole.

(5) The oil pan and the lubrication device may be configured as follows. The oil pan separator has a protrusion formed in a region between an upper end of the side plate and a connection portion between the side plate and the bottom plate. The protrusion projects laterally toward the outside of the oil pan. The oil feed hole is formed in a protrusion upper-plate, which serves as an upper end portion of the protrusion. The oil-feed-hole shutoff valve body is configured to be able to close the oil feed hole from above the protrusion upper-plate by means of lowering by its own weight. In this case, preferably, the oil-feed-hole shutoff valve body is formed from a material whose specific gravity is slightly higher than that of the oil (preferably, about 1.2 times to about 2 times the specific gravity of the oil).

In such the configuration, during the warming-up operation, there may arise a difference in oil level between the first chamber and the second chamber such that the oil level of the second chamber becomes higher than that of the first chamber, and the oil level in the second chamber may become higher than the protrusion upper-plate.

In this case, the pressure of the oil residing above the protrusion upper-plate presses the oil-feed-hole shutoff valve body downward. Because of the pressure to which the oil-feed-hole shutoff valve body is subjected and the own weight of the oil-feed-hole shutoff valve body, the oil feed hole is closed. That is, there is restrained inflow of the oil from the second chamber to the first chamber through the oil feed hole (the one-way valve is closed).

Thus, during the warming-up operation, an unintended inflow of the oil into the first chamber from the second chamber through the oil feed hole can be effectively restrained by means of a simple configuration.

At the time of oil change, as mentioned previously, first, only the oil contained in the second chamber is drained to the exterior of the oil pan. As a result, there arises a difference in oil level (a difference of a predetermined amount) between the second chamber and the first chamber located internally of the second chamber such that the oil level of the second chamber becomes lower than that of the first chamber. Upon occurrence of such a difference in oil level, the pressure of the oil contained in the first chamber pushes up the oil-feed-hole shutoff valve body This causes opening of the oil feed hole; thus, the oil flows out into the second chamber through the oil feed hole. In this manner, the oil remaining in the first chamber flows out into the second chamber.

When the oil is intensively injected into the first chamber, only the oil level in the first chamber rises. When the oil level in the first chamber reaches the level of the protrusion upper-plate, the pressure of the oil injected into the first chamber pushes up the oil-feed-valve shutoff valve body. This causes opening of the oil feed hole; thus, the oil is fed into the second chamber from the first chamber through the oil feed hole.

According to the present configuration, while the performance of accelerating the warming-up operation is ensured, promptness of the oil-change work can be achieved.

(6) The oil pan and the lubrication device may be configured as follows. The oil pan and the lubrication device may further comprise an oil-level-gauge support section. The oil-level-gauge support section has an oil-level-gauge insertion hole. The oil-level-gauge insertion hole is configured to allow insertion therethrough of an oil level gauge. The oil level gauge is formed of a rod-like member and is configured to allow visual check for the oil level in the oil pan. The oil-level-gauge support section is configured to be able to support the oil level gauge when the oil level gauge is inserted into the oil-level-gauge insertion hole. The one-way valve is configured such that, when, in place of the oil level gauge, a tube for draining or injecting the oil of an oil-changing device used for oil change is inserted into the oil-level-gauge insertion hole of the oil-level-gauge support section, the oil-feed-hole shutoff valve body opens the oil feed hole.

In such the configuration, at the time of oil change, the tube of the oil-changing device is inserted into the oil-level-gauge insertion hole of the oil-level-gauge support section. This causes opening of the oil feed hole, so that the first chamber and the second chamber communicate with each other.

Thus, when the oil stored in the oil pan is drained to the exterior of the oil pan through the tube, the oil flows through the oil feed hole, whereby the oil stored in the first chamber and the second chamber is promptly drained to the exterior of the oil pan through the tube. Also, when fresh oil is injected into the oil pan through the tube, the oil flows through the oil feed hole, whereby the fresh oil promptly spreads to the first chamber and the second chamber.

According to the present configuration, even when the oil-changing device abruptly drains old oil from one of the first chamber and the second chamber or even when the oil-changing device abruptly injects fresh oil into one of the first chamber and the second chamber, there can be restrained the occurrence of a large pressure difference between the first chamber and the second chamber.

Thus, there can be effectively prevented breakage of the oil pan separator, which separates the first chamber and the second chamber from each other, which breakage could otherwise result from such a large pressure difference mentioned above. Therefore, oil-change work by use of the oil-changing device can be carried out favorably and more promptly.

(7) The one-way valve may comprise an abutment member and a link section. The abutment member is located on an extension line of a center axis of the oil-level-gauge insertion hole. The abutment member is configured to be able to touch an end portion of the tube when the tube is inserted through the oil-level-gauge insertion hole. The link section is configured to move the oil-feed-hole shutoff valve body in a direction of opening the oil feed hole when the end portion of the tube touches and presses the abutment member.

In such the configuration, at the time of oil change, the tube of the oil-changing device is inserted through the oil-level-gauge insertion hole, and an end portion of the tube touches and presses the abutment member. As a result, the link section functions to move the oil-feed-hole shutoff valve body in a direction of opening the oil feed hole.

According to the present configuration, at the time of oil-change work by use of the oil-changing device, the opening of the oil feed hole can be reliably carried out by means of a simple device configuration.

(8) Pits and projections (convexoconcave) may be formed on a surface of the abutment member. The Convexoconcave is formed in such a geometry that, when the end portion of the tube having a tube end opening touches the surface of the abutment member, clearances are formed between the surface of the abutment member and an end face of the tube around the tube end opening.

For example, the convexoconcave can be formed by a knurling process, a sandblasting process, a grooving process, etc. Also, the convexoconcave can be formed by forming holes or through-holes in the abutment member.

When the oil stored in the oil pan is drained by use of the oil-changing device, such the configuration can prevent the surface of the abutment member from closing the tube end opening.

(9) The abutment member may be disposed so as to be spaced apart from a tip of the oil level gauge in a state in which the oil level gauge is supported in the oil-level-gauge support section.

In such the configuration, during operation, while being inserted through the oil-level-gauge insertion hole, the oil level gauge is supported in the oil-level-gauge support section. In this case, the tip of the oil level gauge does not touch the abutment member. Therefore, the insertion of the oil level gauge through the oil-level-gauge insertion hole does not cause opening of the oil feed hole.

According to the present configuration, the closing of the oil feed hole during operation and the opening of the oil feed hole at the time of the oil-change work by use of the oil-changing device can be reliably carried out by means of a simple device configuration.

(10) A clearance that constitutes the second chamber may be formed between the bottom plate of the oil pan separator and a bottom portion of the oil pan cover.

In such the configuration, the second chamber can be formed in such a manner as to entirely cover a laterally outside region and a downwardly outside region of the first chamber. Thus, at the time of the warming-up operation, since the first chamber is covered in a thermally insulative manner by the second chamber formed externally of the first chamber, an increase in temperature of the oil contained in the first chamber can be effectively accelerated. This can further accelerate the progress of the warming-up operation. Also, according to the present configuration, even when the second chamber is formed in such a manner as to entirely cover the first chamber from the outside of the first chamber, the oil-change work can be carried out promptly.

(11) There my further be provided a float valve configured to be able to open and close a drain hole according to the oil level in the first chamber. The drain hole is a through-hole formed in the bottom plate of the oil pan separator. The drain hole is formed so as to establish communication between the clearance constituting the second chamber, and a bottom region of the first chamber located above the clearance. The float valve comprises a float element and a valve mechanism.

The float element is disposed within the first chamber and is configured to be able to float in the oil stored in the first chamber under the effect of buoyancy. The valve mechanism is configured to be able to close the drain hole through rising of the float element associated with rising of the oil level in the first chamber.

In such the configuration, in the case where the oil level in the first chamber is sufficiently high, the float element rises to its upper-limit position. Thus, the drain hole is closed by the valve mechanism. During the warming-up operation, this restrains (shuts off) inflow of the oil into a bottom region of the first chamber from a bottom region of the second chamber through the drain hole.

Meanwhile, for example, at the time of very-low-temperature start-up, if the amount of oil is small immediately before the start-up, the oil level in the first chamber may drop excessively. In such a case, the float element lowers, thereby canceling a state in which the drain hole is closed by the valve mechanism. As a result, the oil can be fed into a bottom region of the first chamber from a bottom region of the second chamber through the drain hole.

When, for oil change, the whole quantity of the oil is to be drained from the oil pan, the drain bolt is removed, thereby opening the drain bolt hole. As a result, the oil level in the second chamber drops. At this time, the oil to be drained remains in the first chamber, and, because of the float element being subjected to buoyancy, the drain hole is closed by the valve mechanism.

However, in this case, since the oil level in the first chamber becomes higher than that in the second chamber, a difference in oil level (a difference of a predetermined amount) arises, so that the one-way valve is opened. As a result, the oil stored in the first chamber flows out into the second chamber through the one-way valve.

Thus, according to the present configuration, in the contingency that, while the drain hole is closed by the float valve, the oil level in the first chamber abruptly drops, the float valve functions. Therefore, while the progress of the warming-up operation is reliably accelerated, the occurrence of a shortage of supply of the oil to the mechanism-to-be-lubricated can be effectively restrained.

Also, in the process of draining the whole quantity of the oil from the oil pan for oil change, by virtue of the functioning of the one-way valve, the oil stored in the first chamber can be drained into the second chamber at a relatively early stage of the process. Therefore, the oil-change work can be carried out promptly.

(12) The valve mechanism may comprise a drain-hole shutoff valve body, a connection bar, and a support member.

The drain-hole shutoff valve body is disposed within the first chamber and above the drain hole. The connection bar is configured to connect the drain-hole shutoff valve body and the float element together. The support member is configured to pivotally support the connection bar. The valve mechanism is configured such that the drain-hole shutoff valve body lowers through a pivotal movement of the connection bar in a first direction effected by rising of the float element associated with rising of the oil level in the first chamber and such that the drain-hole shutoff valve body rises through a pivotal movement of the connection bar in a second direction opposite the first direction effected by lowering of the float element associated with lowering of the oil level in the first chamber.

In such the configuration, the component elements of the float valve are disposed above the bottom plate of the oil pan separator.

According to the present configuration, even when a bottom portion of the oil pan cover is deformed upward with a resultant variation in the distance between the bottom portion of the oil pan cover and the bottom plate of the oil pan separator, the float valve can reliably function according to the oil level in the first chamber.

Also, according to the present configuration, while the reliable functioning of the float valve is ensured, the clearance between a bottom portion of the oil pan cover and the bottom plate of the oil pan separator can be reduced to the greatest possible extent. Furthermore, while a space between the bottom plate of the oil pan separator and the suction port of the oil strainer is set to such a width as to allow good suction of the oil through the suction port, the bottom plate and the suction port can be disposed as low as possible.

Thus, even when the amount of the oil stored in the oil pan decreases, the oil level in the first chamber is more likely to be maintained above the suction port of the oil strainer. This can restrain the occurrence of a shortage of supply of the oil to the mechanism-to-be-lubricated to the greatest possible extent. Also, without need to considerably increase the capacity of the oil pan and the capacity of the first chamber, a supply of the oil to the mechanism-to-be-lubricated can be ensured. Therefore, at the time of the warming-up operation, the temperature of the oil contained in the first chamber rises at an earlier stage, and thus the effect of further lowering fuel consumption can be yielded.

(13) The one-way valve is formed so as to be located lower than an upper limit position for the float element of the float valve. In such the configuration, the one-way valve is disposed at a position corresponding to a bottom region of the first chamber and lower than the upper limit position for the float element. Specifically, for example, the oil feed hole, the oil-feed-hole shutoff valve body, or the protrusion upper-plate is disposed at a position lower than the upper limit position.

In such the configuration, when, for oil change, the drain bolt is removed from a bottom portion of the oil pan cover, the drain bolt hole, which has been closed by the drain bolt, is opened. By this procedure, first, the oil contained in the second chamber begins to be drained to the exterior of the oil pan, and thus the oil level in the second chamber begins to lower. Thus, a difference (a small difference) in oil level arises between the second chamber and the first chamber to such an extent that the one-way valve can be opened.

By the effect of a pressure difference that arises between the first chamber and the second chamber on the basis of the above-mentioned difference in oil level, the oil stored in the first chamber flows out into the second chamber through the one-way valve and is then drained to the exterior of the oil pan via the second chamber. In this manner, from the beginning to the end of the drainage of oil, the oil can be substantially continuously drained to the exterior of the oil pan from both of the first chamber and the second chamber.

As mentioned above, the outflow of the oil from the first chamber into the second chamber through the one-way valve continues until the oil level in the first chamber reaches substantially the same level as that of the one-way valve. At this point of time, the oil level in the first chamber is lower than the upper-limit position for the float element of the float valve. Thus, at this point of time, the drain hole is opened. Therefore, the oil remaining in a bottom region of the first chamber can be drained into a bottom region (the aforementioned clearance) of the second chamber.

Meanwhile, in such the configuration, when, for oil change, fresh oil is injected into the empty oil pan, first, the oil is injected into the empty first chamber. At this time, the float valve is lowered, and thus the drain hole is opened. Therefore, the oil flows into the second chamber through the drain hole.

When the oil level in the second chamber rises and reaches the bottom plate of the oil pan separator, the float valve begins to rise. Before the float element rises to the upper-limit position, and the drain hole is closed, the one-way valve is opened. Thus, the oil injected into the first chamber can be continuously fed into the second chamber. Until the injection of the oil into the first chamber is completed, the one-way valve remains open. That is, from the beginning to the end of oil injection, the fresh oil can be continuously injected into both of the first chamber and the second chamber.

In this manner, according to the present configuration, at the time of injection and drainage of the oil, the one-way valve is opened at a relatively early stage, and the oil level in the first chamber and the oil level in the second chamber vary substantially in an interlocking relation with each other at all times. Therefore, according to the present configuration, the oil-change work can be carried out promptly.

Also, according to the present configuration, at the time of oil injection, the oil level in the first chamber and the oil level in the second chamber can be appropriately adjusted so as to make the oil levels substantially coincide with each other. Therefore, at the time of oil injection, by use of the oil level gauge, the amount of oil contained in the oil pan can be appropriately and readily grasped.

Furthermore, even if the float valve should fail to open due to sedimentation of sludge and the like, the oil can be drained from the first chamber into the second chamber in the largest possible amount. Therefore, the amount of old oil remaining in the first chamber can be restrained to the smallest possible value. Also, at the time of injection of the oil, even though the drain hole is not opened, the feed of the oil into the second chamber from the first chamber can be initiated at a relatively early stage.

In this manner, according to the present configuration, at the time of drainage of the oil, the oil stored in the first chamber can be reliably drained into the second chamber. Also, fresh oil injected into the first chamber can be reliably fed into the second chamber. Therefore, according to the present configuration, the oil-change work can be carried out promptly and reliably.

Particularly, as mentioned above, in the case where the valve mechanism comprises the drain-hole shutoff valve body, the connection bar, and the support member, and the component elements of the float valve are disposed above the bottom plate of the oil pan separator, drainage and injection of the oil can be reliably carried out.

BRIEF DESCRIPTION OF THE DRAWINGS

FIG. 3 is a side sectional view showing, on an enlarged scale, a drain hole and its periphery shown in FIG. 2.

FIGS. 4A and 4B are side sectional views showing, on an enlarged scale, a communication valve and its periphery shown in FIG. 2, wherein FIG. 4A shows a state in which the communication valve is closed at a low temperature, and FIG. 4B shows a state in which the communication valve is opened at a high temperature.

FIGS. 16A, 16B, and 16C are side sectional views showing the configuration of a further modification of the float valve shown in FIG. 2.

FIGS. 17A and 17B are views showing the configuration of still another modification of the float valve shown in FIG. 2, wherein FIG. 17A is a plan view of a float guide member, and FIG. 17B is a side sectional view showing, on an enlarged scale, a drain hole and its periphery of an oil pan separator.

FIGS. 18A, 18B, and 18C are side sectional views showing movements of the float valve shown in FIG. 17.

BEST MODE FOR CARRYING OUT THE INVENTION

An embodiment of the present invention (the best mode contemplated by the applicant at the time of filing the present application) will next be described with reference to the drawings.

<Schematic Configuration of Engine of Embodiment>

Figure 1:
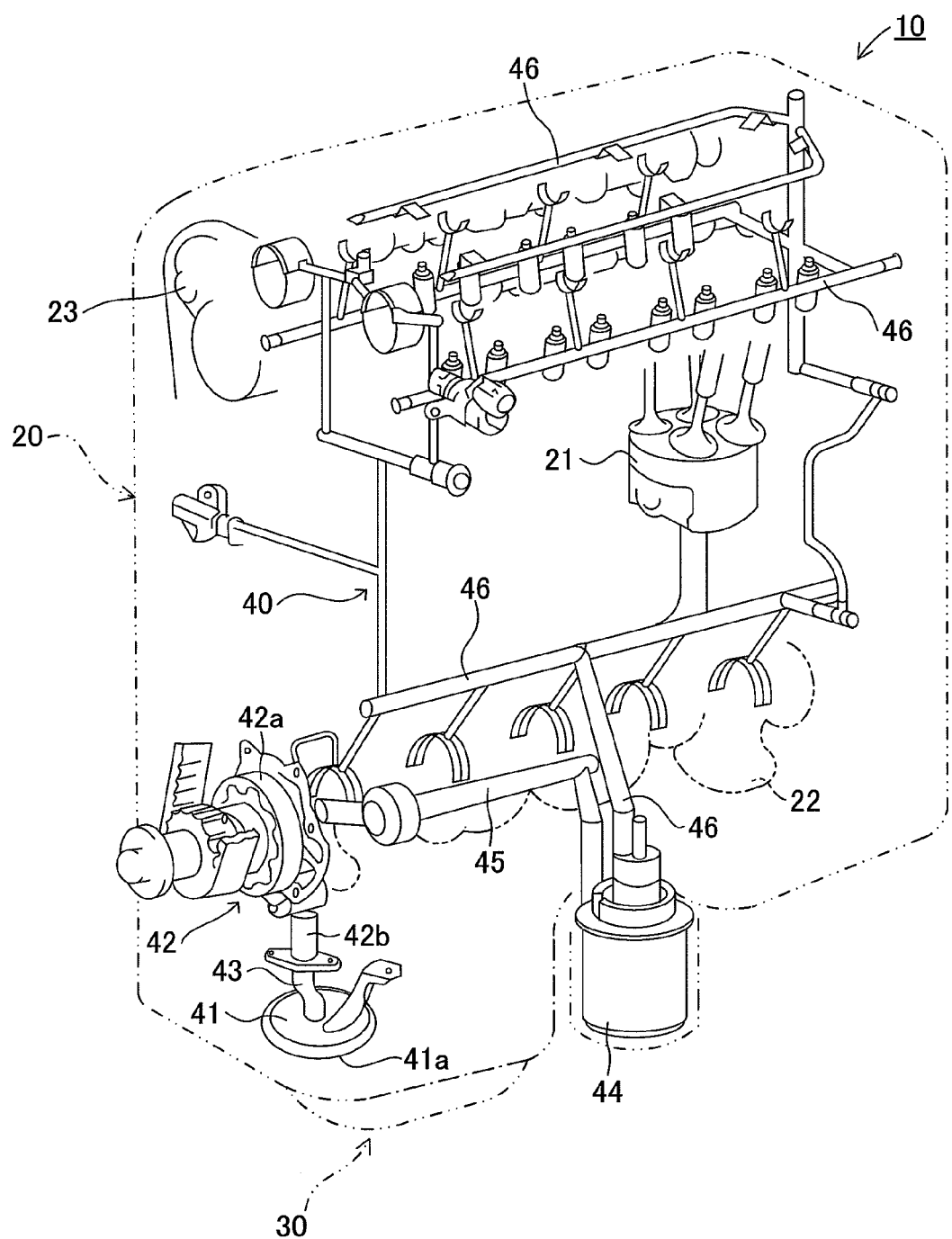
FIG. 1 is a schematic, configurational view of an engine, which is a lubrication device of an embodiment of the present invention.

FIG. 1 is a schematic view of an engine 10, which is an embodiment of a lubrication device of the present invention. The engine 10 includes an engine block 20, an oil pan 30, and an oil feed section 40.

In an engine block 20, which serves as a mechanism-to-be-lubricated, a plurality of members-to-be-lubricated, such as pistons 21, a crankshaft 22, and a camshaft 23, are disposed. An oil pan 30 is connected to a lower end portion of the engine block 20. The oil pan 30 is configured to be able to store oil for lubrication of the interior of the engine block 20, in an inner space of the oil pan 30. The configuration of the oil pan 30 will be described in detail later.

The oil feed section 40 is configured, as described below, to be able to feed oil stored in the oil pan 30 to internal mechanisms of the engine block 20.

An oil strainer 41 is disposed within the oil pan 30. The oil strainer 41 has an oil suction port 41a for sucking up oil stored in the oil pan 30. The oil strainer 41 is connected to an oil pump 42 provided in the engine block 20.

The oil pump 42 is configured to be able to deliver oil stored in the oil pan 30 to the members-to-be-lubricated in the engine block 20. Specifically, in the present embodiment, the oil pump 42 is a known rotary pump. A rotor 42a of the oil pump 42 is mechanically coupled with the crankshaft 22 so as to rotate with the crankshaft 22.

The oil strainer 41 and the oil pump 42 are connected via a strainer channel 43. The strainer channel 43 is formed of a pipe made of a metal or a synthetic resin. A lower end of the strainer channel 43 is connected to the oil strainer 41. An upper end of the strainer channel 43 is connected to a pump inlet path 42b, which is an oil path formed at a lower end portion of the engine block 20.

The oil delivery side of the oil pump 42 is connected, via an oil transport path 45, to an oil filter 44 provided at the exterior of the engine block 20. The oil filter 44 is connected to an oil feed path 46, which is provided as an oil flow path extending to the members-to-be-lubricated.

<Configuration of Oil Pan of Embodiment>

Figure 2:
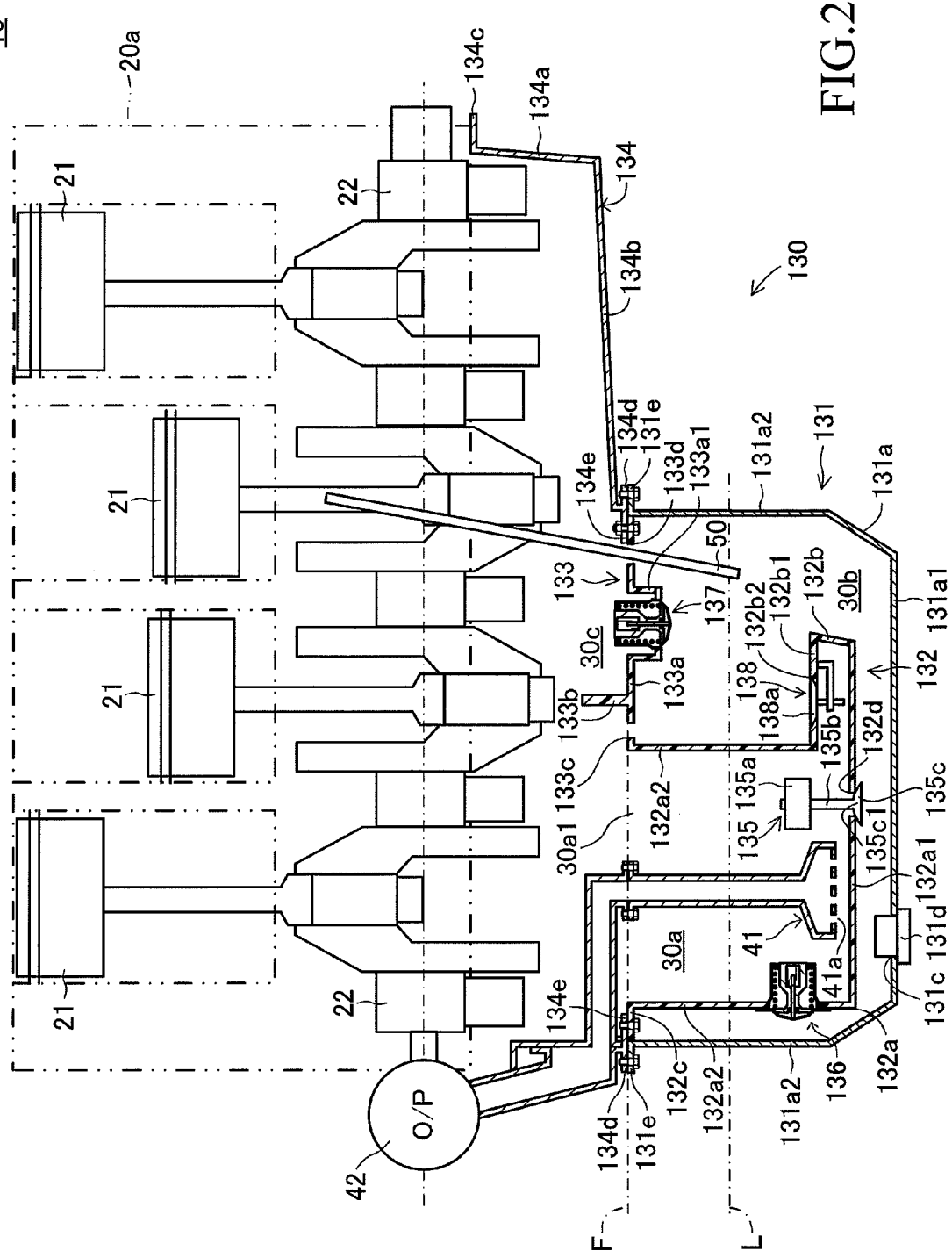
FIG. 2 is a side sectional view showing the schematic configuration of an embodiment of an oil pan shown in FIG. 1.

FIG. 2 is a side sectional view showing the schematic configuration of an oil pan 130, which is an embodiment of the oil pan 30 shown in FIG. 1.

Referring to FIG. 2, the oil pan 130 of the present embodiment includes an oil pan cover 131, an oil pan separator 132, a return-oil storage separator 133, a lower case 134, a float valve 135, a communication valve 136, an oil return control valve 137, and an oil feed valve 138.

<<Oil Pan Cover>>

The oil pan cover 131 is a member that serves as a lower cover of the oil pan 130. The oil pan cover 131 is formed by drawing a steel plate by use of press-working dies so as to assume a bathtub form that opens toward a cylinder block 20a located above. That is, the oil pan cover 131 is configured to be able to store oil in an inner space of an oil storage cavity section 131a, which opens toward the cylinder block 20a located above.

The oil storage cavity section 131a is formed of a bottom plate 131a1 and a side plate 131a2. The bottom plate 131a1 and the side plate 131a2 are integrally formed in a seamless manner so as to form the above-mentioned bathtub shape. The side plate 131a2 stands upward from the perimeter of the bottom plate 131a1.

In the present embodiment, as indicated by the dash-dot line in FIG. 2, the upper end of the oil storage cavity section 131a; i.e., the upper end of the side plate 131a2 of the oil pan cover 131, is located at a level corresponding to the mark "F" indicative of an oil level on an oil level gauge 50.

The oil level gauge 50 is formed of a rodlike member and is configured to enable visual check for an oil level in the oil pan 130 (a second chamber 30b) by means of a tip portion of the oil level gauge 50.

The bottom plate 131a1 has a drain bolt hole 131c provided at a lowest position. The "lowest position" is a lowest position in a predetermined device (e.g., an automobile) including the engine 10 with respect to the vertical direction (a direction along which the gravity acts) when the device is place on a flat ground.

The drain bolt hole 131c has internal threads formed on its wall so as to allow a drain bolt 131d to be screwed thereinto. The oil pan cover 131 is formed into such a shape that oil stored in the oil storage cavity section 131a can flow down toward the drain bolt hole 131c under the action of gravity.

A flange portion 131e is formed along the upper end of the side plate 131a2 of the oil pan cover 131. The flange portion 131e stands in such a manner as to extend laterally outward from the upper end of the side plate 131a2. The flange portion 131e is fixed to the lower case 134, which will be described later, by use of bolts or the like, whereby the oil pan cover 131 is connected to a lower end portion of the cylinder block 20a via the lower case 134.

<<Oil Pan Separator>>

The oil pan separator 132 is integrally formed from a synthetic resin having low thermal conductivity.

Examples of a preferred material used to form the oil pan separator 132 include synthetic resins having high heat resistance (heat resistance temperature: 150° C., preferably in excess of 250° C.), such as nylon, polyimide, polyamide-imide (PAI), polysulfone (PSF), polyarylate (PAR), polyphenylene sulfide (PPS), polyetheretherketone (PEEK), polytetrafluoroethylene (PTFE), and tetrafluoroethylene-perfluoroalkyl vinyl ether copolymer (PFA), and these synthetic resins reinforced with glass fiber or the like.

In the present embodiment, the oil pan separator 132 is formed from a glass-fiber-reinforced 6-nylon resin, which is high in heat resistance, mechanical strength, and high-temperature creep strength.

The oil pan separator 132 is disposed within the oil storage cavity section 131a of the oil pan cover 131. The oil pan separator 132 is configured and disposed to be able to divide the oil storage cavity section 131a into a first chamber 30a and a second chamber 30b.

The first chamber 30a is formed in such a manner to open toward the cylinder block 20a. The first chamber 30a is provided in such a manner as to communicate with the cylinder block 20a via a first-chamber opening portion 30a1. The oil suction port 41a of the oil strainer 41 is disposed in a bottom region of the first chamber 30a.

The second chamber 30b is provided adjacent to the first chamber 30a with the oil pan separator 132 therebetween. The second chamber 30b is provided externally of the first chamber 30a so as to surround the first chamber 30a from the lateral outside and from the downward outside. That is, the second chamber 30b is a space located laterally externally of and downwardly of the first chamber 30a and intervening between the oil pan cover 131 and the oil pan separator 132.

The oil pan separator 132 has a first-chamber-forming cavity section 132a. The inner space of the first-chamber-forming cavity section 132a serves as the first chamber 30a, which opens toward the cylinder block 20a. The first-chamber-forming cavity section 132a is formed of a bottom plate 132a1 and a side plate 132a2.

The bottom plate 132a1 is disposed so as to form a clearance that constitutes the second chamber 30b, between the bottom plate 132a1 and the bottom plate 131a1 of the oil pan cover 131.

The side plate 132a2 is disposed in such a manner as to surround the bottom plate 132a1. The side plate 132a2 stands upward from an end portion (perimetric portion) of the bottom plate 132a1. Furthermore, the side plate 132a2 is disposed so as to form a clearance that constitutes the second chamber 30b, between the side plate 132a2 and the side plate 131a2 of the oil pan cover 131. An end portion of the bottom plate 132a1 and a lower end portion of the side plate 132a2 are connected, whereby the bottom plate 132a1 and the side plate 132a2 are integrally formed in a seamless manner.

The first-chamber opening portion 30a1 is formed at an upper end portion of the side plate 132a2; i.e., at an upper end portion of the first chamber 30a. In the present embodiment, as indicated by the dash-dot line in FIG. 2, the position of the first-chamber opening portion 30a1 is set to a level corresponding to the mark "F" indicative of an oil level on the oil level gauge 50. The first-chamber opening portion 30a1 is formed so as to establish communication between the cylinder block 20a and the first chamber 30a. That is, the first-chamber opening portion 30a1 is formed such that return oil that drops from the cylinder block 20a under the action of gravity can reach the first chamber 30a through the first-chamber opening portion 30a1.

The first-chamber-forming cavity section 132a has a protrusion 132b laterally protruding from its bottom portion located on a side toward an unillustrated power train mechanism (the right side in FIG. 2). The protrusion 132b is formed such that a bottom region of the first chamber 30a protrudes toward the second chamber 30b (outwardly). A flat-plate-like protrusion upper-plate 132b1 is formed at an upper end portion of the protrusion 132b. The protrusion upper-plate 132b1 is formed as a flat portion substantially in parallel with a horizontal plane.

In the present embodiment, the protrusion 132b is formed at a bottom portion of the oil pan 130. That is, the protrusion upper-plate 132b1 is formed below a level corresponding to the mark "L" indicative of an oil level on the oil level gauge 50. Also, the protrusion upper-plate 132b1 is disposed at an intermediate position between the above-mentioned oil level "L" and the bottom plate 131a1 of the oil pan cover 131, the bottom plate 131a1 being a lowest portion of the oil pan 130. Furthermore, the protrusion upper-plate 132b1 is formed at substantially the same level as that of an upper end portion of the oil strainer 41.

The oil level "L" on the oil level gauge 50 can be set to a level corresponding to a minimum oil level at which, even under severe operating conditions, oil can be favorably sucked up through the oil suction portion 41a of the oil strainer 41.

According to a specific example, the oil level "L" can be set to a pre-start-up minimum oil level at which, when a cold start is activated in an environment of very low temperature (e.g., about −30° C.), no air is sucked up through the oil suction port 41a of the oil strainer 41. An oil level corresponding to the oil level "L" can be determined by experiment or the like.

The oil level "F" can be set to an oil level that is established by adding an appropriate amount of oil to the amount of oil stored at the above-mentioned oil level "L."

In the oil pan 130 of the present embodiment, when the oil level in the first chamber 30a is "F," the amount of oil stored in the first chamber 30a is about 2.8 liters. When the oil level in the first chamber 30a is "L," the amount of oil stored in the first chamber 30a is about 1.6 liters. The level difference between the oil level "F" and the oil level "L" is set to about 10 mm to 50 mm.

A flange portion 132c is formed along the upper end of the side plate 132a2 of the oil pan separator 132. The flange portion 132c stands in such a manner as to extend laterally outward from the upper end of the side plate 132a2. The flange portion 132c is fixed to the lower case 134, which will be described later, by use of bolts or the like, whereby the oil pan separator 132 is connected to a lower end portion of the cylinder block 20a via the lower case 134.

The bottom plate 132a1 of the oil pan separator 132 has a drain hole 132d in the form of a through-hole formed at the lowest position. The drain hole 132d is formed so as to be able to establish communication between a clearance that constitutes the second chamber 30b and resides between the bottom plate 131a1 of the oil pan cover 131 and the bottom plate 132a1 of the oil pan separator 132, and a bottom region of the first chamber 30a located above the clearance.

Also, the drain hole 132d is formed in the vicinity of the oil suction port 41a of the oil strainer 41. The drain hole 132d is formed to such a sufficiently large size (e.g., a diameter of about 20 mm) as to allow even low-temperature (e.g., about 0° C.) high-viscosity oil to flow out therethrough to the exterior of the first chamber 30a (into the second chamber 30b).

<<Return-Oil Storage Separator>>

The return-oil storage separator 133 is disposed above the above-mentioned protrusion upper-plate 132b1 of the oil pan separator 132. The return-oil storage separator 133 is configured to be able to form a return-oil storage chamber 30c above the second chamber 30b in a region (a right-hand region in FIG. 2) adjacent to the above-mentioned unillustrated power train mechanism.

The return-oil storage chamber 30c is configured to be able to store, in a predetermined amount during the warming-up operation, a residual portion of return oil, which returns toward the oil pan 130 from the cylinder block 20a, other than a portion of the return oil that directly flows into the first chamber 30a. That is, the return-oil storage chamber 30c is formed so as to be able to receive and temporarily store the return oil that has returned, under the action of gravity, at a side of the cylinder block 20a toward the above-mentioned unillustrated power train mechanism.

The return-oil storage separator 133 in the present embodiment is formed from the same synthetic resin as that used to form the oil pan separator 132 and is formed integrally with the oil pan separator 132. The return-oil storage separator 133 is composed of a horizontal partition plate 133a and a vertical partition plate 133b.

The horizontal partition plate 133a is a flat-plate-like member and is disposed substantially in parallel with the protrusion upper-plate 132b1 of the oil pan separator 132. The horizontal partition plate 133a is disposed so as to separate an upper region of the second chamber 30b and the return-oil storage chamber 30c from each other.

The vertical partition plate 133b stands upward from an end portion of the horizontal partition plate 133a which is located on a side (left side in FIG. 2) opposite a side toward the above-mentioned unillustrated power train mechanism. The vertical partition plate 133b is disposed so as to serve as one end portion of the return-oil storage chamber 30c with respect to the longitudinal direction of the engine (a cylinder arrangement direction; i.e., the longitudinal direction of the crankshaft 22, or the left-right direction in FIG. 2).

The horizontal partition plate 133a has an oil return through-hole 133c and an oil-level-gauge support through-hole 133d.

The oil return through-hole 133c is formed externally of the return-oil storage chamber 30c. That is, the oil return through-hole 133c is disposed on a side (left side in FIG. 2) opposite the above-mentioned unillustrated power train mechanism with respect to the vertical partition plate 133b. The oil return through-hole 133c is formed such that at least a portion of the return oil overflowing the vertical partition plate 133b from the return-oil storage chamber 30c can flow into the second chamber 30b therethrough.

The oil-level-gauge support through-hole 133d is a through-hole formed in the horizontal partition plate 133a and is configured to be able to support the rodlike oil level gauge 50. The oil-level-gauge support through-hole 133d is located at a highest position in the second chamber 30b. Also, the oil-level-gauge support through-hole 133d is located in the inside region of the return-oil storage chamber 30c. That is, the oil-level-gauge support through-hole 133d is disposed at an end portion of the horizontal partition plate 133a located on a side toward the above-mentioned unillustrated power train mechanism (right side in FIG. 2).

The oil-level-gauge support through-hole 133d is formed into such a shape that a predetermined narrow clearance is formed between the oil-level-gauge support through-hole 133d and the oil level gauge 50 inserted through the oil-level-gauge support through-hole 133d. The "predetermined narrow clearance" is such a clearance (e.g., about several mm) as to be difficult for low-temperature high-viscosity oil during the warming-up operation to pass therethrough and as to be easy for relatively-high-temperature (e.g., 60° C. or higher) low-viscosity oil after completion of the warming-up operation to pass therethrough.

In the present embodiment, the oil pan separator 132 and the return-oil storage separator 133 are appropriately shaped so as to allow good circulation of oil at all times under any operating conditions of the engine 10. That is, the shapes of the horizontal partition plate 133a and the vertical partition plate 133b are appropriately determined as follows: during the warming-up operation, while an appropriate amount of the return oil returns directly into the first chamber 30a through the first-chamber opening portion 30a1 to thereby prevent oil shortage in the first chamber 30a at the time of very-low-temperature start-up, an increase in temperature of oil contained in the first chamber 30a sufficiently accelerates the warming-up operation.

Specifically, the oil pan 130 of the present embodiment is configured such that about 30% to 60% of an opening portion located at the lower end of the cylinder block 20a directly faces the first chamber 30a. In other words, the oil pan 130 of the present embodiment is configured such that about 40% to 70% of the opening portion located at the lower end of the cylinder block 20a faces the return-oil storage chamber 30c. The shapes of the oil pan separator 132 and the return-oil storage separator 133 are appropriately determined such that about 30% to 60% of the return oil returns directly into the first chamber 30a and such that about 40% to 70% of the return oil is received in and temporarily stored in the return-oil storage chamber 30c (a portion of the return oil returning to the return-oil storage chamber 30c may overflow the vertical partition plate 133b to thereby flow into the first chamber 30a).

<<Lower Case>>

The lower case 134 is disposed at a lower end portion of the cylinder block 20a in such a manner as to cover a region below the crankshaft 22. The lower case 134 includes a side wall portion 134a, a slope portion 134b, an upper flange portion 134c, a lower flange portion 134d, and an inner flange portion 134e.

The side wall portion 134a is tubularly configured so as to laterally cover the region below the crankshaft 22. The slope portion 134b is disposed so as to cover, from underneath, a portion of opening surrounded by the lower end of the side wall portion 134a which is located on a side toward the above-mentioned unillustrated power train mechanism (right side in FIG. 2). The upper surface of the slope portion 134b is formed in such a manner that the received return oil can be gently sent toward the inner space of the above-mentioned oil pan cover 131.

A space surrounded by the side wall portion 134a and the slope portion 134b of the lower case 134, and the horizontal partition plate 133a and the vertical partition plate 133b of the above-mentioned return-oil storage separator 133 serves as the above-mentioned return-oil storage chamber 30c.

The upper flange portion 134c is formed in such a manner as to extend outwardly from the upper end of the side wall portion 134a in a substantially horizontal direction. The upper flange portion 134c is joined to and fixed to the lower end surface of the cylinder block 20a by use of bolts or the like, whereby the lower case 134 is connected to the cylinder block 20a.

The lower flange portion 134d is formed in such a manner as to extend outwardly from the lower ends of the side wall portion 134a and the slope portion 134b, respectively, in a substantially horizontal direction. The flange portion 131e of the above-mentioned oil pan cover 131 is joined to and fixed to the lower flange portion 134d, whereby the oil pan cover 131 is connected to the lower case 134 in such a manner as to cover the lower-end opening of the lower case 134.

The inner flange portion 134e is formed in such a manner as to extend inwardly from the lower ends of the side wall portion 134a and the slope portion 134b, respectively, in a substantially horizontal direction. The flange portion 132c of the above-mentioned oil pan separator 132 and an end portion of the return-oil storage separator 133 are joined to and fixed to the inner flange portion 134e, whereby the oil pan separator 132 and the return-oil storage separator 133 are supported in the inner space of the oil pan cover 131.

<<Float Valve>>

The float valve 135 is attached to the above-mentioned drain hole 132d formed in a bottom portion of the oil pan separator 132. The float valve 135 is configured to be able to open and close the drain hole 132d by functioning according to the oil level in the first chamber 30a. The float valve 135 includes a float element 135a, a connection bar 135b, and a drain-hole shutoff valve body 135c.

The float element 135a is disposed within the first chamber 30a. The float element 135a is configured to be able to float in oil stored in the first chamber 30a under the effect of buoyancy. Specifically, the float element 135a is formed from a material whose specific gravity is lower than the specific gravity of oil (0.85 to 0.98). The float element 135a can be formed from hollow molding of, for example, a resin foam having heat resistance (foam of phenolic resin, polyester, polypropylene, or the like) or a synthetic resin having heat resistance.

The float element 135a is provided at one end portion of the connection bar 135b. The drain-hole shutoff valve body 135c is connected to the other end portion of the connection bar 135b. The drain-hole shutoff valve body 135c is disposed in the second chamber 30b and is configured to be able to close the drain hole 132d from underneath by touching the bottom plate 132a1 of the oil pan separator 132.

FIG. 3 is a side sectional view showing, on an enlarged scale, the drain hole 132d and its periphery shown in FIG. 2. Referring to FIG. 3, a valve surface 135c1, which is an upper surface of the drain-hole shutoff valve body 135c and faces the drain hole 132d (bottom plate 132a1), is convexly spherically formed. A valve-body contact face 132d1 is formed at a lower end opening portion of the drain hole 132d and faces the valve surface 135c1. The valve-body contact face 132d1 is concavely spherically formed.

In the present embodiment, the valve surface 135c1 and the valve-body contact face 132d1 are formed such that a radius of curvature Rv of the valve surface 135c1 and a radius of curvature RH of the valve-body contact face 132d1 are in the relation of Rv≦RH.

Referring again to FIG. 2, the float valve 135 of the present embodiment is configured such that, when the oil level in the first chamber 30a becomes a predetermined float-lowering start level or higher, the float valve 135 rises up to the upper limit position shown in FIG. 2 under the effect of buoyancy of the float element 135a and can close the drain hole 132d from underneath by means of the drain-hole shutoff valve body 135c. Also, the float valve 135 is configured such that, when the oil level in the first chamber 30a lowers below the float-lowering start level to thereby cause shortage of oil contained in the first chamber 30a, the float valve 135 lowers accordingly and can open the drain hole 132d.

The float valve 135 is disposed such that the level of the float element 135a at the time of rise to the upper limit position (hereinafter, referred to merely as the "upper limit position of the float element 135a") is higher than the protrusion upper-plate 132b1, which serves as an upper end portion of the protrusion 132b of the oil pan separator 132. The "level of the float element 135a" in the present embodiment is of the center of gravity of the float element 135a. The float valve 135 of the present embodiment is configured such that the "upper limit position of the float element 135a" and the float-lowering start level substantially coincide with each other.

<<Configuration of Oil Communication Path Between First Chamber and Second Chamber>>

The side plate 132a2 of the oil pan separator 132 is provided with the communication valve 136 at a bottom portion of the side plate 132a2. The communication valve 136 is provided in such a manner as to extend through the side plate 132a2.

The communication valve 136 is configured to be able to establish communication between the first chamber 30a and the second chamber 30b according to the temperature of oil contained in the first chamber 30a, which temperature varies according to operating conditions of the engine 10. That is, the communication valve 136 provides an oil communication path through which oil can flow between the first chamber 30a and the second chamber 30b according to the temperature of oil contained in the first chamber 30a.

The communication valve 136 is disposed at a level lower than the oil level mark "L" on the oil level gauge 50 and higher than the oil suction port 41a of the oil strainer 41. The communication valve 136 is disposed such that a central portion of the communication valve 136 is located at substantially the same level as the upper limit position of the float element 135a (preferably, slightly (several mm to several cm) higher than the upper limit position). The communication valve 136 is provided on a portion of the side plate 132a2 most distant from the return-oil storage chamber 30c.

Figure 4A:
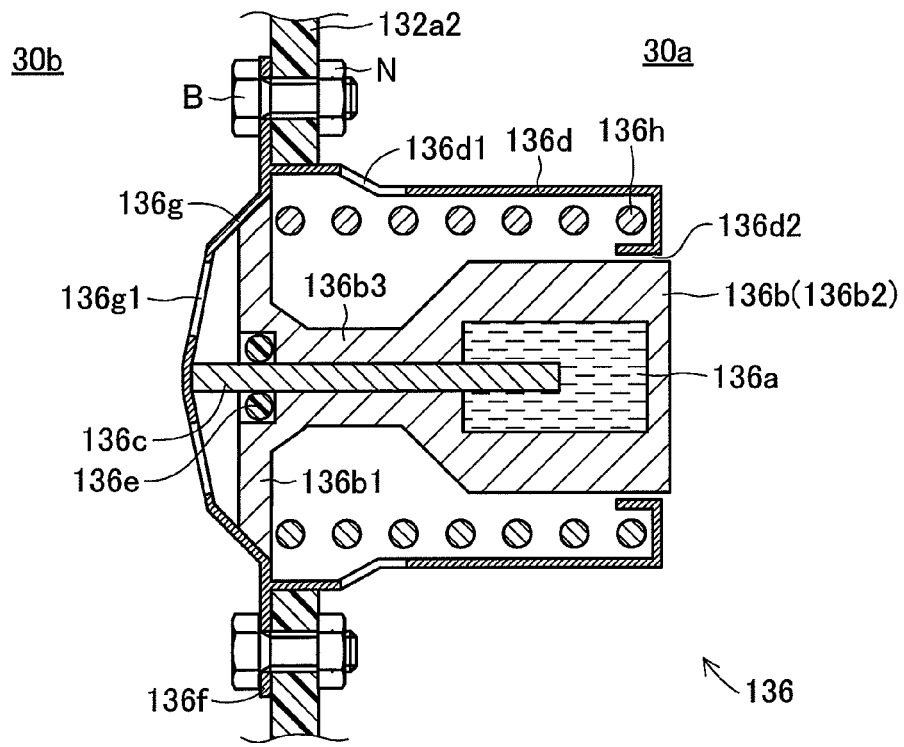
Figure 4B:
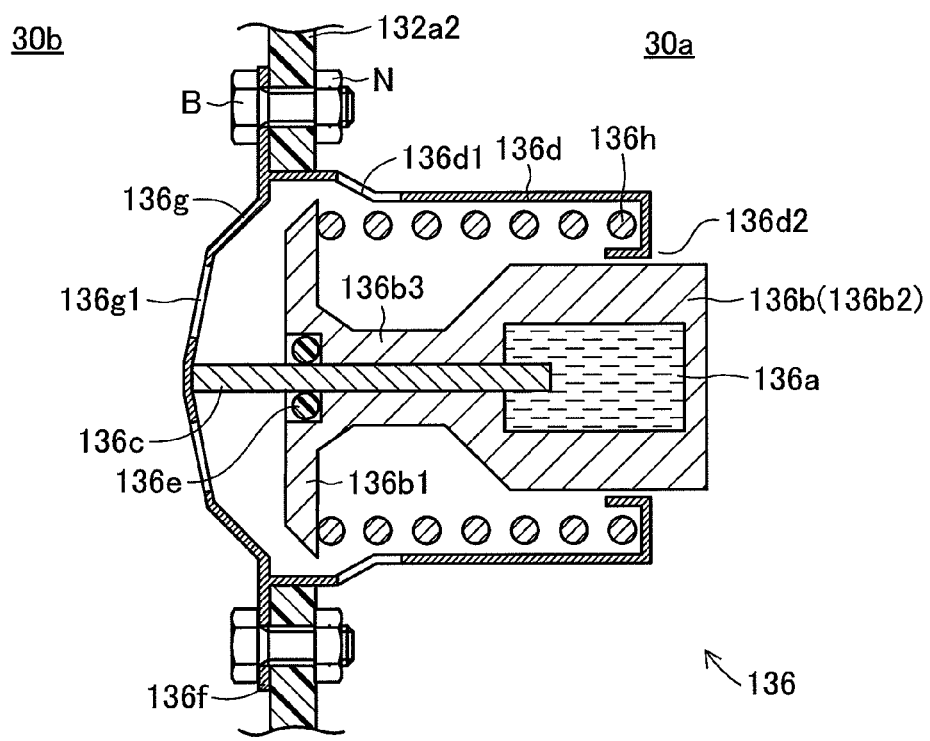

FIGS. 4A and 4B are side sectional views showing, on an enlarged scale, the communication valve 136 and its periphery shown in FIG. 2. FIG. 4A shows a state in which the communication valve 136 is closed at a low temperature, and FIG. 4B shows a state in which the communication valve 136 is opened at a high temperature. The communication valve 136 has wax 136a, which is a temperature-sensitive element that is sensitive to the temperature of oil contained in the first chamber 30a. The communication valve 136 is disposed such that the wax 136a is located on a side toward the first chamber 30a.

The wax 136a is sealed in a thermostat valve body 136b made of a metal. The thermostat valve body 136b includes a substantially disklike communication path on-off valve 136b1 having a center through-hole; a substantially cylindrical body portion 136b2 having a hollow portion in which the wax 136a is sealed; and a substantially cylindrical connection portion 136b3, which connects together the communication path on-off valve 136b1 and the body portion 136b2.

The above-mentioned through-hole formed in the communication path on-off valve 136b1 is formed in such a manner as to be connected to an inner space of the cylindrical connection portion 136b3. A rod 136c is disposed in the through-hole and in the inner space. The rod 136c is disposed such that its one end is exposed in the hollow portion in which the wax 136a is sealed. Also, the rod 136c is disposed such that its other end is exposed from the communication path on-off valve 136b1 to the exterior of the thermostat valve body 136b.

A seal member 136e is fitted into the through-hole of the communication path on-off valve 136b1. The seal member 136e prevents leakage of the wax 136a sealed in the thermostat valve body 136b to the exterior of the thermostat valve body 136b.

A housing 136d, which is a substantially cylindrical member made of a metal, surrounds the body portion 136b2 of the thermostat valve body 136b. The housing 136d has first-chamber-side openings 136d1, which are through-holes. The first-chamber-side openings 136d1 are configured so as to be able to establish communication between the inner space of the housing 136d and an outer space (first chamber 30a) around the housing 136d.

A through-hole 136d2 is formed in an end portion of the housing 136d located on a side toward the first chamber 30a. The through-hole 136d2 is configured to allow the body portion 136b2 of the thermostat valve body 136b to move (slide) therethrough.

An end portion of the housing 136d located on a side toward the second chamber 30b has a circular flange portion 136f formed in such a manner as to extend outwardly (vertically in FIGS. 4A and 4B). The flange portion 136f is fixed to the side plate 132a2 of the oil pan separator 132 by use of bolts B and nuts N, whereby the communication valve 136 is attached to the side plate 132a2.

A second-chamber-side cover 136g, which is formed of a plate member and is exposed toward the second chamber 30b, is provided on a side toward the second chamber 30b with respect to the flange portion 136f. The second-chamber-side cover 136g has second-chamber-side openings 136g1, which are through-holes. The other end of the above-mentioned rod 136c is fixed to the second-chamber-side cover 136g. The shape of the second-chamber-side cover 136g (and the shape of the communication path on-off valve 136b1) is determined such that, when the second-chamber-side cover 136g and the communication path on-off valve 136b1 touch each other, communication between the inner space of the housing 136d and the inner space of the second-chamber-side cover 136g can be shut off by the communication path on-off valve 136b1.

A coil spring 136h is disposed in the inner space of the housing 136d in such a manner as to surround the thermostat valve body 136b. One end of the coil spring 136h touches the communication path on-off valve 136b1, and the other end of the coil spring 136h touches the one end of the housing 136d.

The thus-configured communication valve 136 functions as follows: when a temperature around the thermostat valve body 136b in which the wax 136a is sealed is lower than a predetermined valve-opening temperature, the wax 136a contracts, whereby, as shown in FIG. 4A, communication between the first chamber 30a and the second chamber 30b is shut off (valve-closed condition).

That is, because of the above-mentioned contraction of the wax 136a, the elastic force of the coil spring 136h causes the rod 136c to be pushed into the hollow portion in which the wax 136a is sealed; thus, the second-chamber-side cover 136g and the communication path on-off valve 136b1 touch each other, thereby shutting off communication between the first chamber 30a and the second chamber 30b.

Also, the communication valve 136 functions as follows: when a temperature around the thermostat valve body 136b in which the wax 136a is sealed is high, the wax 136a melts and increases in volume, whereby, as shown in FIG. 4B, an oil communication path extending through the interior of the housing 136d between the first-chamber-side openings 136d1 and the second-chamber-side openings 136g1 (hereinafter, referred to merely as the "oil communication path") is opened (valve-opened condition).

That is, because of the above-mentioned expansion of the wax 136a, the one end of the rod 136c is pushed out from the hollow portion in which the wax 136a is sealed; thus, the thermostat valve body 136b is pushed toward the first chamber 30a against the pressing force of the coil spring 136h, thereby forming a clearance between the second-chamber-side cover 136g and the communication path on-off valve 136b1.

The communication valve 136 is designed such that the valve opening rate (the ratio of the current sectional area of the oil communication path to the maximum sectional area of the oil communication path) increases with temperature.

That is, according to an oil temperature in the first chamber 30a as measured in the vicinity of the communication valve 136, the thermostat valve body 136b is positioned at a predetermined position where a force of pushing the thermostat valve body 136b toward the first chamber 30a as effected by expansion of the wax 136a and the pressing force of the coil spring 136h balance with each other, whereby the condition of oil flow through the oil communication path varies according to the oil temperature.

Thus, the wax 136a, the thermostat valve body 136b, and the rod 136c constitute a temperature-sensitive deformable section that is deformable according to the temperature of oil contained in the first chamber 30a.

<<Configuration of Oil Return Path Between Second Chamber and Return-Oil Storage Chamber>>

Referring again to FIG. 2, the horizontal partition plate 133a, the vertical partition plate 133b, and the lower case 134 constitute the above-mentioned return-oil storage chamber 30c.

As mentioned previously, the oil return through-hole 133c is formed such that the return oil which has been received in and temporarily stored in the return-oil storage chamber 30c and subsequently overflows the vertical partition plate 133b from the return-oil storage chamber 30c can return to the second chamber 30b.

Also, the oil-level-gauge support through-hole 133d is formed into such a shape that a predetermined narrow clearance is formed between the oil-level-gauge support through-hole 133d and the oil level gauge 50 inserted through the oil-level-gauge support through-hole 133d. That is, the oil-level-gauge support through-hole 133d is configured to allow the return oil having a high temperature corresponding to a temperature after completion of the warming-up operation to return to an upper region of the second chamber 30b from the return-oil storage chamber 30c.

Furthermore, the horizontal partition plate 133a, which serves as the bottom plate of the return-oil storage chamber 30c, has an oil return cavity section 133a1. The oil return control valve 137 is provided in the oil return cavity section 133a1.

The oil return control valve 137 has a configuration similar to that of the above-mentioned communication valve 136. That is, the oil return control valve 137 is configured to be able to control the condition of communication between the return-oil storage chamber 30c and the second chamber 30b located under the return-oil storage chamber 30c by means of opening and closing according to the temperature of oil stored in the return-oil storage chamber 30c.

The oil return control valve 137 is configured in such a manner that, when the temperature of the return oil temporarily stored in the return-oil storage chamber 30c reaches a predetermined high temperature (e.g., 60° C.), the oil return control valve 137 opens so as to allow the return oil to flow at a stroke into the second chamber 30b from the return-oil storage chamber 30c.

In the present embodiment, the oil return control valve 137, which serves as a communication section between the return-oil storage chamber 30c and the second chamber 30b, and the communication valve 136, which serves as a communication section (the oil communication path) between the first chamber 30a and the second chamber 30b, are diagonally positioned (positioned most distant) to each other. Also, in the present embodiment, the oil return control valve 137 is configured to open after the communication valve 136 opens.

As mentioned above, the return-oil storage chamber 30c and an upper region of the second chamber 30b communicate with each other via the oil return through-hole 133c, the oil-level-gauge support through-hole 133d, and the oil return control valve 137. The communication valve 136 is disposed diagonally (disposed most distant) to the oil return control valve 137, which serves as a communication section between the return-oil storage chamber 30c and the second chamber 30b.

That is, the first-chamber opening portion 30a1 serves as a first oil return path through which the return oil returns directly to the first chamber 30a. Also, the oil return through-hole 133c, the oil-level-gauge support through-hole 133d, and the oil return control valve 137 constitute a second oil return path through which (after being received in and temporarily stored in the return-oil storage chamber 30c) the return oil returns to the second chamber 30b.

<<Oil Feed Valve>>

The oil feed valve 138 is provided on the protrusion upper-plate 132b1, which serves as an upper end portion of the protrusion 132b of the oil pan separator 132. That is, the oil feed valve 138 is located at a level lower than the upper limit position for the float element 135a of the float valve 135.

The oil feed valve 138 is configured to function according to a difference in oil level between the first chamber 30a and the second chamber 30b. The oil feed valve 138 is configured to be able to allow outflow of oil substantially only from the first chamber 30a to the second chamber 30b. The oil feed valve 138 is configured specifically as follows.

The protrusion upper-plate 132b1 has an oil feed hole 132b2 in the form of a through-hole. The oil feed valve 138 has an oil-feed-hole shutoff valve body 138a configured and disposed to be able to open and close the oil feed hole 132b2 according to a difference in oil level between the first chamber 30a and the second chamber 30b.

The oil-feed-hole shutoff valve body 138a is configured to be able to close the oil feed hole 132b2 from above the protrusion upper-plate 132b1 by means of lowering by its own weight. In the present embodiment, the oil-feed-hole shutoff valve body 138a is formed from a material whose specific gravity is slightly higher (preferably, about 1.2 times to about 2 times the specific gravity of the oil) than that (0.85 to 0.98) of oil.

Specifically, the oil-feed-hole shutoff valve body 138a in the present embodiment is formed from the same material as that for the oil pan separator 132; i.e., 6-nylon resin reinforced by containing glass fiber in an amount of 30% by weight (specific gravity: about 1.37).

Figure 5:
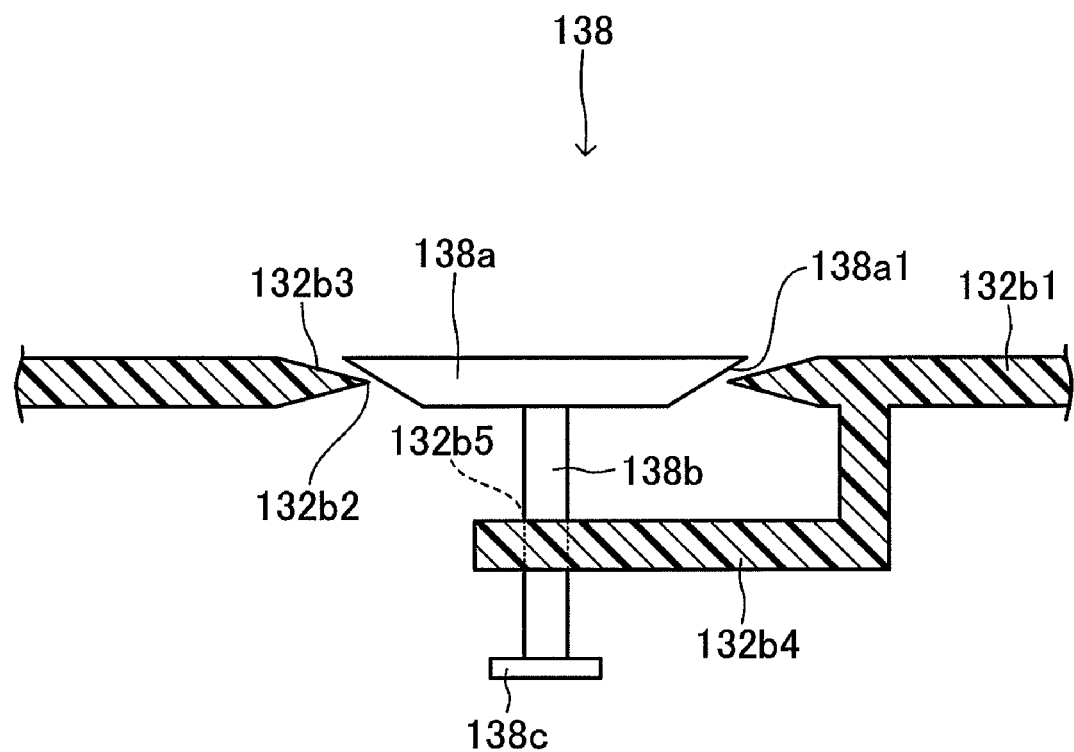
FIG. 5 is a side sectional view showing, on an enlarged scale, an oil feed valve and its periphery shown in FIG. 2.

FIG. 5 is a side sectional view showing, on an enlarged scale, the oil feed valve 138 and its periphery shown in FIG. 2. Referring to FIG. 5, an oil feed valve surface 138a1, which is a lower surface of an outer perimetric portion of the oil-feed-hole shutoff valve body 138a and faces the oil feed hole 132b2, is formed into a conical surface. The shape of the perimeter of the oil feed hole 132b2 is determined such that the perimeter of the oil feed hole 132b2 comes into line contact with the oil feed valve surface 138a1.

Specifically, as shown in FIG. 5, in the present embodiment, the perimeter of the oil feed hole 132b2 is formed into an acute shape as viewed in side section. An oil-feed-hole upper-surface 132b3, which is an upper surface of a perimetric portion of the oil feed hole 132b2 and faces the oil-feed-hole shutoff valve body 138a, is formed into a conical depression having a slope gentler than that of the oil feed valve surface 138a1.

A guide pin 138b is provided in such a manner as to project downward from the oil-feed-hole shutoff valve body 138a. The guide pin 138b is inserted through a guide hole 132b5, which is a through-hole and is formed in an oil-feed-valve guide 132b4 provided on the protrusion upper-plate 132b1.

A stopper 138c is formed at the lower end of the guide pin 138b and has an outside diameter greater than the diameter of the guide hole 132b5. The stopper 138c is configured to be able to restrict a position up to which the oil-feed-hole shutoff valve body 138a can rise.

<Description of Operation of Device Configuration of Embodiment>

The operation of the engine 10 having the oil pan 130 of the present embodiment will next be described.

Referring to FIG. 2, before the engine 10 of the present embodiment is started, the first chamber 30a and the second chamber 30b have substantially the same oil level.

Referring to FIGS. 1 and 2, when the engine 10 is started, the crankshaft 22 rotates. In association with rotation of the crankshaft 22, the rotor 42a of the oil pump 42 rotates, thereby activating the oil pump 42. As a result of the oil pump 42 being activated, oil contained in the first chamber 30a is sucked up through the oil suction port 41a of the oil strainer 41 disposed in a bottom region of the first chamber 30a.

Oil sucked up from the first chamber 30a reaches the oil pump 42 through the strainer channel 43 and the pump inlet path 42b. Oil which has reached the oil pump 42 is delivered toward the oil transport path 45 by the oil pump 42 and is then fed to members-to-be-lubricated, such as the pistons 21 and the crankshaft 22 via the oil filter 44 and the oil feed path 46.

Oil fed to the members-to-be-lubricated, such as the pistons 21 and the crankshaft 22, lubricates the members-to-be-lubricated and absorbs heat, such as frictional heat, from the members-to-be-lubricated. Subsequently, under the action of gravity, the oil returns toward the oil pan 30 from the engine block 20, which serves as the mechanism-to-be-lubricated.

Referring to FIG. 2, a portion of the return oil returns directly into the first chamber 30a through the first-chamber opening portion 30a1, and the remaining portion of the return oil is received by the lower case 134 (slope portion 134b) and by the return-oil storage separator 133 (horizontal partition plate 133a).

<<During Warming-Up Operation>>

Immediately after initiation of cold start (during a warming-up operation), the temperature of oil contained in the first chamber 30a is low. Also, only a small amount of the return oil is stored in the return-oil storage chamber 30c, and the temperature of the stored return oil is relatively low. In this case, the communication valve 136 and the oil return control valve 137 are closed as shown in FIG. 4A.

Referring again to FIG. 2, the closure of the communication valve 136 shuts off the oil communication path between a bottom region of the first chamber 30a and the second chamber 30b. If the oil level in the first chamber 30a is not excessively low, the float valve 135 is floating up in the oil contained in the first chamber 30a under the effect of buoyancy. Thus, the drain hole 132d is closed by the drain-hole shutoff valve body 135c (valve surface 135c1) of the float valve 135.

Thus, there is restrained inflow of low-temperature oil into a bottom region of the first chamber 30a from the second chamber 30b (a bottom region of the second chamber 30b). That is, the amount of oil capable of being fed to the engine block 20 is restricted to an amount stored in the first chamber 30a.

During the warming-up operation after initiation of cold start, the oil pump 42 sucks up oil contained in the first chamber 30a; thus, the oil level in the first chamber 30a drops below that before start-up. Meanwhile, since no oil flows between the first chamber 30a and the second chamber 30b, the oil level in the second chamber 30b is substantially the same as that before start-up. Therefore, during the warming-up operation after initiation of cold start, the first chamber 30a is lower in oil level than the second chamber 30b.

Even though such an oil level difference arises, the oil feed valve 138 does not open. That is, the pressure of oil residing above the oil feed valve 138 in the second chamber 30b presses downward the oil-feed-hole shutoff valve body 138a of the oil feed valve 138, whereby the oil-feed-hole shutoff valve body 138a closes the oil feed hole 132b2.

As a result of a portion of the return oil returning into the first chamber 30a, the temperature of oil contained in the first chamber 30a rises. In this manner, while the return oil returning into the first chamber 30a raises the temperature of oil contained in the first chamber 30a, the amount of oil circulating between the engine block 20 and the oil pan 130 is restricted. This accelerates an increase in the temperature of oil contained in the first chamber 30a and the temperature of the above-mentioned members-to-be-lubricated. That is, the progress of the warming-up operation is accelerated.

Furthermore, there is restrained inflow of low-temperature oil contained in the second chamber 30b (a bottom region of the second chamber 30b) into a bottom region of the first chamber 30a. Therefore, the oil level in the first chamber 30a drops (by, for example, about 10 mm) and thus becomes lower than the oil level in the second chamber 30*b*. That is, an oil level difference arises between the first chamber 30*a* and the second chamber 30*b*.

During the warming-up operation, the oil return control valve 137 is closed, thereby restraining inflow of the return oil stored in the return-oil storage chamber 30*c* into the second chamber 30*b*. Thus, a predetermined amount of the return oil can be stored in the return-oil storage chamber 30*c*.

The return oil which overflows the vertical partition plate 133*b* from the return-oil storage chamber 30*c* flows into the second chamber 30*b* through the oil return through-hole 133*c* and into the first chamber 30*a* through the first-chamber opening portion 30*a*1.

<<Completion of Warming-Up Operation>>

At the point of time when the temperature of oil contained in the first chamber 30*a* reaches a predetermined high temperature (e.g., about 60° C.), the warming-up operation ends. At the time of completion of the warming-up operation, first, the communication valve 136 is opened as shown in FIG. 4B in association with an increase in the temperature of oil contained in the first chamber 30*a*. As a result, the above-mentioned oil communication path between the bottom region of the first chamber 30*a* and the second chamber 30*b* is opened.

When the oil communication path is opened by means of the opening of the communication valve 136, because of a pressure difference associated with a difference in oil level which has arisen between the first chamber 30*a* and the second chamber 30*b* during the warming-up operation, oil contained in the second chamber 30*b* flows into a bottom region of the first chamber 30*a*.

Subsequently, while a temperature sensitive portion (corresponding to the wax 136*a* of the communication valve 136 shown in FIG. 4) of the oil return control valve 137 is immersed in oil contained in the return-oil storage chamber 30*c*, oil contained in the return-oil storage chamber 30*c* rises in temperature, whereby the oil return control valve 137 opens. Thus, the return oil stored in the return-oil storage chamber 30*c* vigorously flows into an upper region of the second chamber 30*b* through the oil return control valve 137 under the action of gravity. As a result of the inflow of the return oil into the upper region of the second chamber 30*b*, an oil level difference arises again instantaneously between the first chamber 30*a* and the second chamber 30*b*. Under a pressure difference associated with the occurrence of the oil level difference, oil contained in the second chamber 30*b* flows into a bottom region of the first chamber 30*a*.

Subsequently, by virtue of opening of the communication valve 136, a difference in oil level between the first chamber 30*a* and the second chamber 30*b* almost disappears. That is, the oil level difference is such that the first chamber 30*a* is slightly lower in oil level. Even in this case, the effect of a negative pressure generated in the oil suction port 41*a* of the oil strainer 41 reaches the oil communication path of the communication valve 136 formed in the vicinity of the oil suction port 41*a*. Thus, oil contained in the second chamber 30*b* can flow into a bottom region of the first chamber 30*a*.

<<Abrupt Drop in Oil Level in First Chamber>>

During operation, for some reason, the oil level in the first chamber 30*a* may abruptly drop.

For example, in the case where, at the time of cold start in an environment of very low temperature, the amount of stored oil is near the oil level "L," while, at a point of time of start-up, oil contained in the first chamber 30*a* is sucked up by the oil pump 42, oil of a low temperature and high viscosity is sluggish in return to the oil pan 130 (first chamber 30*a*).

In such a case, the oil level in the first chamber 30*a* may drop below the float-lowering start level (upper limit position for the float element 135*a*). At this time, the float valve 135 lowers, thereby opening the drain hole 132*d*. As a result of the drain hole 132*d* being opened, communication is established between a bottom region of the first chamber 30*a* and a bottom region of the second chamber 30*b* via the drain hole 132*d*.

As mentioned previously, the drain hole 132*d* is formed in the vicinity of the oil suction port 41*a* of the oil strainer 41. Thus, the effect of a negative pressure generated in the oil suction port 41*a* reaches the drain hole 132*d*, so that oil flows into a bottom region of the first chamber 30*a* from a bottom region of the second chamber 30*b* through the drain hole 132*d* and is thus fed to the oil suction port 41*a* of the oil strainer 41.

Subsequently, a large amount of the return oil may return to the oil pan 130. In this case, during the warming-up operation, the oil return control valve 137 is closed. Also, during the warming-up operation, the temperature of the return oil is not sufficiently high. Therefore, it is difficult for the return oil to pass through the clearance between the oil level gauge 50 and the oil-level-gauge support through-hole 133*d*. Thus, in this case, the return oil intensively returns into the first chamber 30*a* through the first-chamber opening portion 30*a*1, so that the oil level in the first chamber 30*a* becomes higher than that in the second chamber 30*b*.

When the intensive return of the return oil into the first chamber 30*a* brings about such an oil level difference that the oil level in the first chamber 30*a* is higher than that in the second chamber 30*b*, the oil feed valve 138 opens. That is, a pressure difference caused by the oil level difference between the first chamber 30*a* and the second chamber 30*b* causes the oil-feed-hole shutoff valve body 138*a* to be pushed up, thereby opening the oil feed hole 132*b*2. When the oil feed hole 138 is thus opened, oil flows out into the second chamber 30*b* from the first chamber 30*a* via the oil feed hole 132*b*2.

In this case, because of a pressure difference between the first chamber 30*a* and the second chamber 30*b* derived from intensive return of the return oil into an upper region of the first chamber 30*a*, oil of a relatively low temperature residing in a bottom portion of the first chamber 30*a* preferentially flows out into the second chamber 30*b* through the oil feed hole 132*b*2. That is, oil of a relatively low temperature contained in the first chamber 30*a* flows out into the second chamber 30*b*, and the return oil of a relatively high temperature preferentially remains in the first chamber 30*a*.

Also, oil that has flowed out into the second chamber 30*b* is relatively higher in temperature than oil that has been stored in the second chamber 30*b* from the time of very-low-temperature start-up. Therefore, oil that has flowed into the second chamber 30*b* through the oil feed hole 132*b*2 raises the temperature of oil contained in the second chamber 30*b* to a certain extent.

In this manner, by virtue of the intensive return of the return oil into the first chamber 30*a*, circulation of oil through the oil feed hole 132*b*2 arises, whereby the progress of the warming-up operation can further be accelerated.

<<Oil Change>>

Figure 6A:
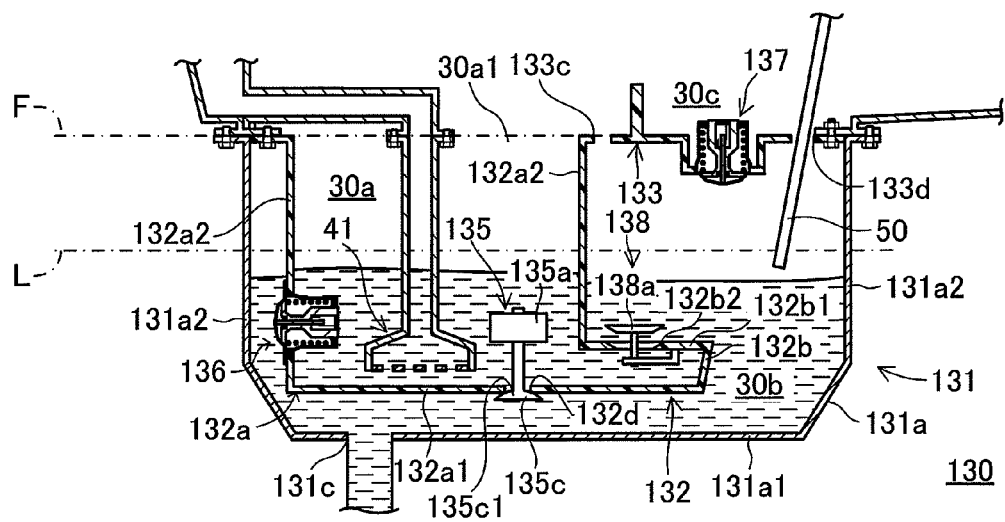
FIGS. 6A, 6B, 7A, 7B, 8A, 8B, 9A, and 9B are side sectional views showing a state of operation of a float valve and that of the oil feed valve at the time of oil change in the oil pan shown in FIG. 2.
Figure 9A:
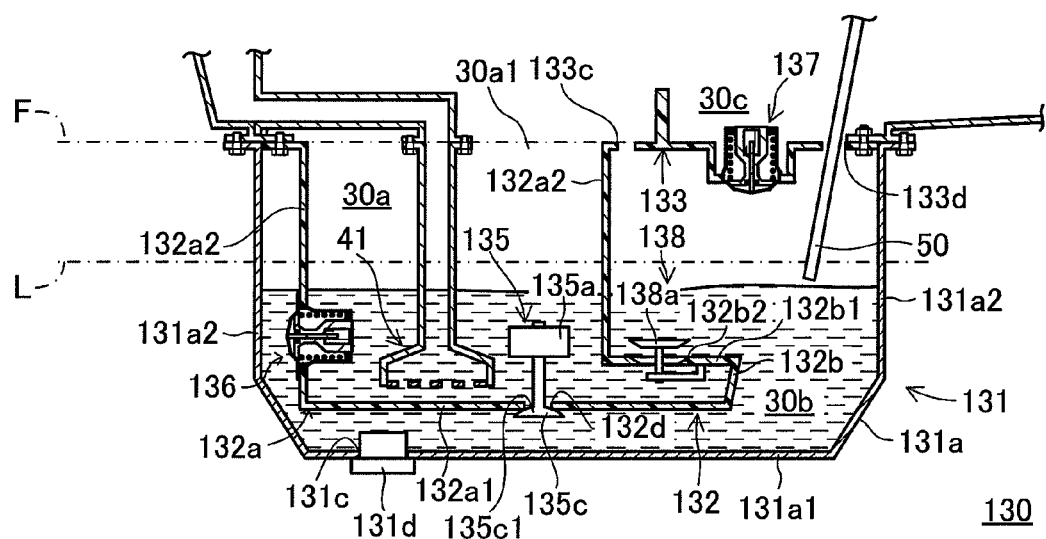
Figure 9B:
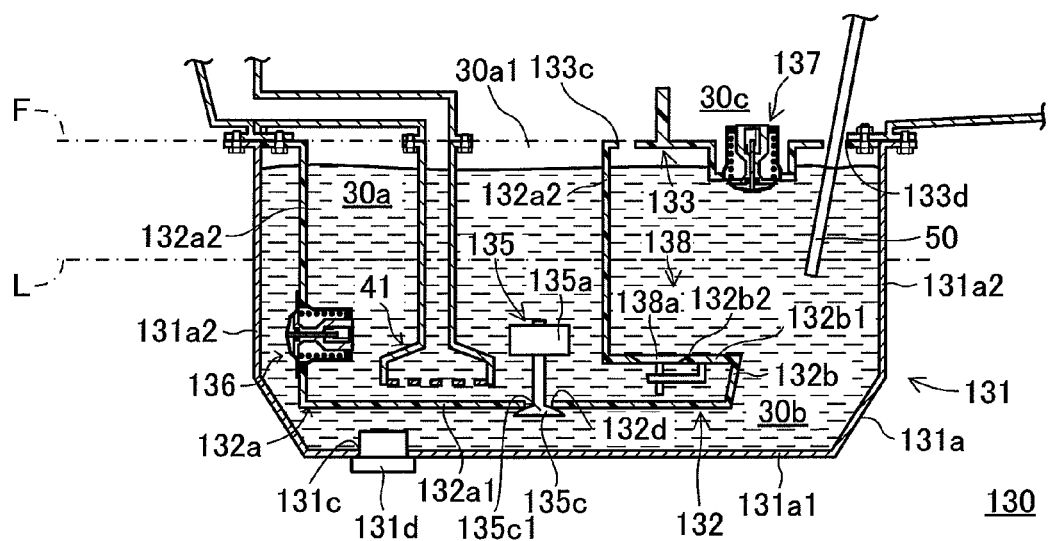

FIGS. 6A, to 9B are side sectional views showing a state of operation of the float valve 135 and that of the oil feed valve 138 at the time of oil change in the oil pan 130 shown in FIG. 2.

<<<Drainage of Oil>>>

Referring to FIG. 6A, when the drain bolt hole 131*c* is opened, oil contained in the second chamber 30*b* is drained to the exterior of the oil pan through the drain bolt hole 131*c*. As a result, the oil level in the second chamber 30*b* lowers.

The oil-change work is carried out after a while subsequent to engine stop. Thus, at the time of the drainage of oil, the communication valve 136 is closed. Also, a large amount of oil remains in the first chamber 30a. Accordingly, the float valve 135 is positioned at the upper limit position, and thus, the drain hole 132d of the oil pan separator 132 is closed.

Accordingly, at an early stage of drainage of oil, communication between the first chamber 30a and the second chamber 30b through the drain hole 132d and the communication valve 136 is substantially shut off. Therefore, as shown in FIG. 6A, in association with a drop in the second chamber 30b resulting from drainage of oil, there arises instantaneously a slight oil difference such that the first chamber 30a is higher in oil level than the second chamber 30b.

When such a difference in oil level arises, a pressure difference of oil arises between the first chamber 30a and the second chamber 30b. As shown in FIG. 6A, this pressure difference causes the oil-feed-hole shutoff valve body 138a to be pushed up. Thus, the oil feed hole 132b2 is opened, and oil is drained into the second chamber 30b from the first chamber 30a via the oil feed hole 132b2.

In this manner, while the oil level in the first chamber 30a and that in the second chamber 30b are being adjusted from the beginning of drainage of oil, oil is promptly drained to the exterior of the oil pan from the first chamber 30a and the second chamber 30b.

Figure 6B:
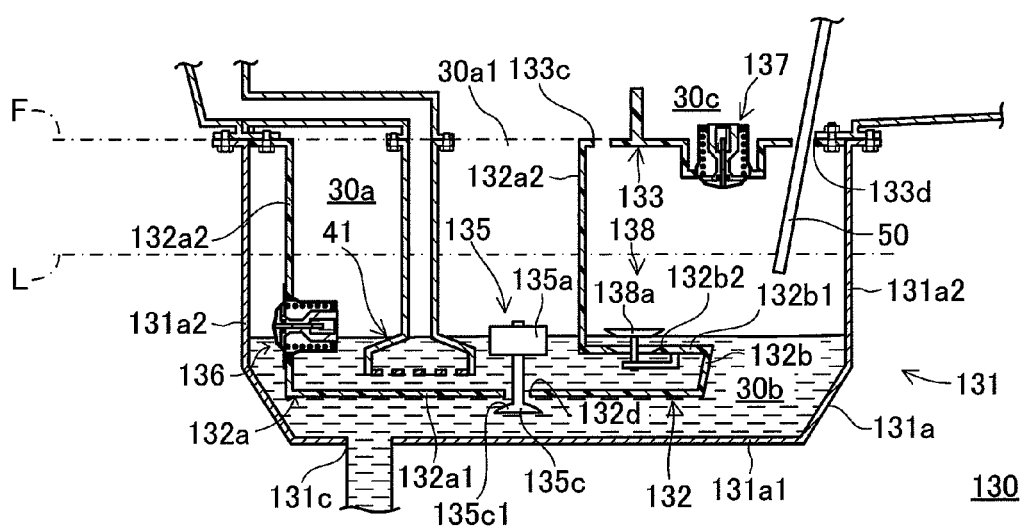

Subsequently, when the oil level further lowers than that shown in FIG. 6A, as shown in FIG. 6B, the oil level in the first chamber 30a lowers below the float-lowering start level. This is accompanied by lowering of the float valve 135. Thus, the drain hole 132d is opened. In this case, oil is drained from the first chamber 30a into the second chamber 30b through the oil feed hole 132b2 and through the drain hole 132d.

Figure 7A:
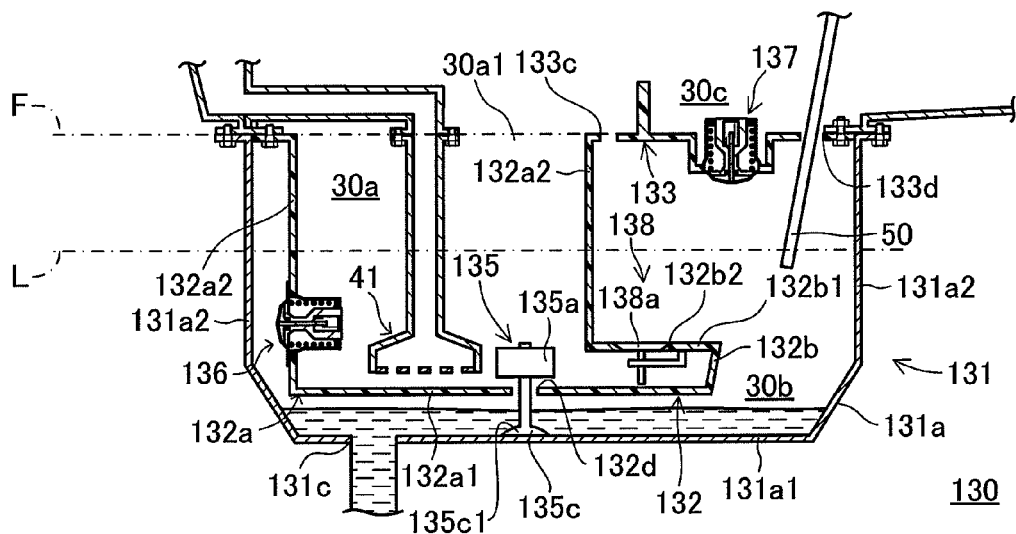
Figure 7B:
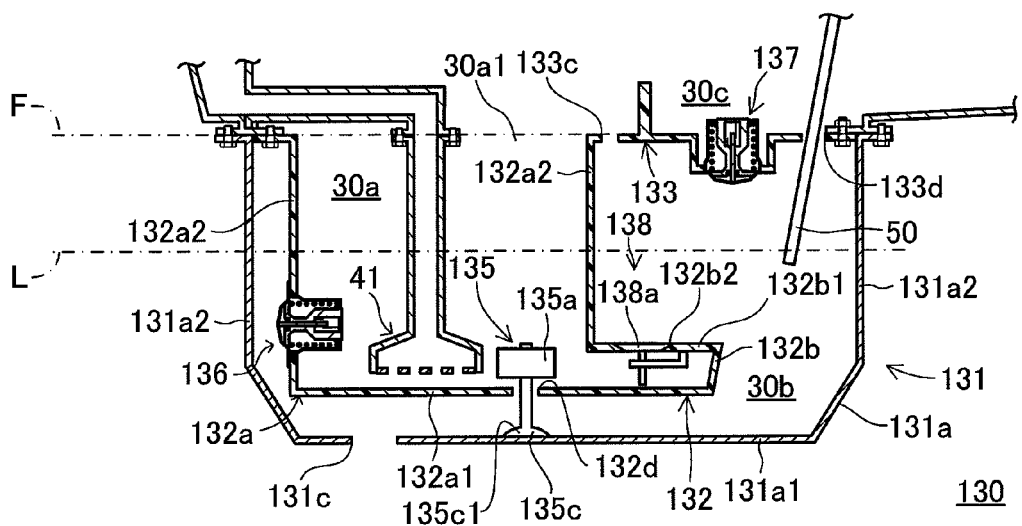

The oil level further lowers, and, as shown in FIG. 7A, the oil level in the first chamber 30a becomes lower than the protrusion upper-plate 132b1. This is accompanied by lowering of the oil-feed-hole shutoff valve body 138a of the oil feed valve 138 by the effect of the own weight of the oil-feed-hole shutoff valve body 138a; thus, the oil feed hole 132b2 is closed. Since the float valve 135 is lowered, the drain hole 132d remains opened. In this case, oil is drained into the second chamber 30b from the first chamber 30a through the drain hole 132d. Finally, as shown in FIG. 7B, the entire quantity of oil contained in the oil pan 130 is drained to the exterior of the oil pan 130.

In this manner, in the present embodiment, from the beginning to the end of drainage of oil, oil is substantially continuously drained to the exterior of the oil pan 130 from both of the first chamber 30a and the second chamber 30b.

<<Injection of Oil>>

Figure 8A:
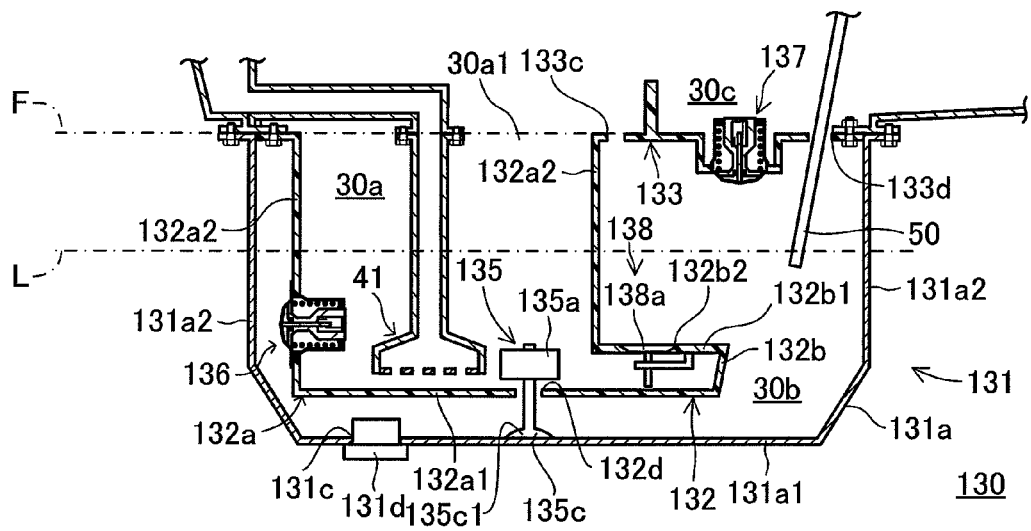

After the whole quantity of oil contained in the oil pan 130 is drained to the exterior of the oil pan 130 through the drain bolt hole 131c, as shown in FIG. 8A, the drain bolt 131d is screwed into the drain bolt hole 131c, thereby closing the drain bolt hole 131c. In this state, fresh oil is injected into the oil pan 130 from above. First, the fresh oil intensively flows into the first chamber 30a through the first-chamber opening portion 30a1 (a small portion of the fresh oil may flow into the second chamber 30b through the oil return through-hole 133c).

Figure 8B:
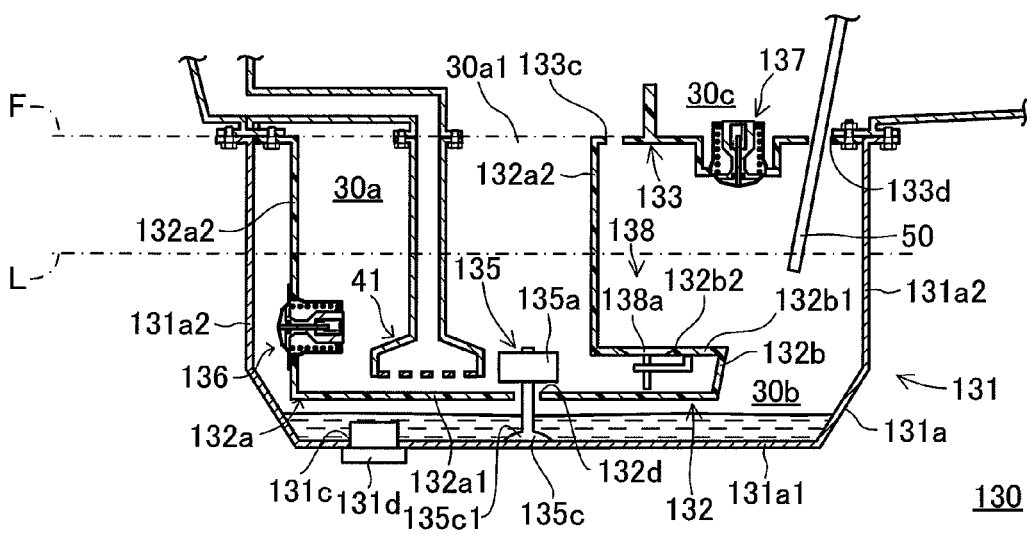

At an early stage of injection of oil, the float valve 135 is lowered; thus, the drain hole 132d is opened. Therefore, as shown in FIG. 8B, oil injected into the first chamber 30a flows out into the second chamber 30b through the drain hole 132d.

When the oil level of the second chamber 30b becomes higher than the bottom plate 132a1 of the oil pan separator 132, oil begins to be collected also in the first chamber 30a.

Then, when the oil level in the first chamber 30a reaches the aforementioned upper limit position, the float valve 135 closes the drain hole 132d.

When the oil level in the first chamber 30a becomes higher than the protrusion upper-plate 132b1, oil contained in the first chamber 30a pushes up the oil-feed-hole shutoff valve body 138a. As a result, as shown in FIG. 9A, the oil feed hole 132b2 is opened, so that oil injected into the first chamber 30a is also injected into the second chamber 30b through the oil feed hole 132b2.

The specific gravity of a material used to form the oil-feed-hole shutoff valve body 138a is merely slightly higher than that of oil. Thus, while injection of oil into the first chamber 30a continues, by the effect of strong momentum of oil flowing upward through the oil feed hole 132b2, as shown in FIG. 9A, the oil-feed-hole shutoff valve body 138a remains in a floating condition.

As mentioned above, in the present embodiment, from a relatively early stage of injection of oil to the end of injection of oil, the oil level in the first chamber 30a and the oil level in the second chamber 30b are adjusted such that the first chamber 30a and the second chamber 30b have substantially the same oil level. When injection of oil into the first chamber 30a is completed, as shown in FIG. 9B, the oil-feed-hole shutoff valve body 138a lowers by the effect of its own weight, thereby closing the oil feed hole 132b2.

<Actions and Effects of Device Configuration of Embodiment>

Referring to FIG. 2, according to the device configuration of the present embodiment, in either case of drainage of oil and injection of oil in the oil-change work, the oil feed valve 138 can appropriately adjust the oil levels of the first chamber 30a and the second chamber 30b.

Therefore, according to the present embodiment, at the time of injection of oil, by use of the oil level gauge 50, the amount of injected oil can be appropriately and readily grasped. Furthermore, there can be effectively restrained a problem of breakage of the oil pan separator 132 at the time of drainage of oil and at the time of injection of oil, which could otherwise result from a large oil level difference (a large pressure difference) between the first chamber 30a and the second chamber 30b. Thus, according to the present embodiment, in the lubrication device having the 2-chamber-type oil pan, the oil-change work can be carried out appropriately and promptly.

Also, in the device configuration of the present embodiment, the oil feed valve 138 has the oil-feed-hole shutoff valve body 138a formed from a material whose specific gravity is slightly higher than that of oil. Additionally, the oil-feed-hole shutoff valve body 138a moves vertically by the effect of its own weight and according to a difference in oil level between the first chamber 30a and the second chamber 30b, to thereby open and close the oil feed hole 132b2. By virtue of this, the direction of oil flow through the oil feed hole 132b2 provided in the protrusion upper-plate 132b1 of the protrusion 132b formed at a bottom portion of the first chamber 30a is restricted substantially to the direction from the first chamber 30a to the second chamber 30b.

Thus, according to the present embodiment, during the warming-up operation, an unintended inflow of oil into the first chamber 30a from the second chamber 30b through the oil feed hole 132b2 can be reliably shut off. Also, according to the present embodiment, when the return oil returns in a large amount to the first chamber 30a, oil is fed to the second chamber 30b from the first chamber 30a. Therefore, according to the present embodiment, by means of a simple device configuration, the warming-up operation can be favorably accelerated, and the oil-change work can be carried out promptly and appropriately.

Referring to FIG. 5, in the device configuration of the present embodiment, the oil feed valve surface 138a1, which serves as an outer perimeter of the oil-feed-hole shutoff valve body 138a, and the perimeter of the oil feed hole 132b2 are in line contact with each other. This reduces area where a narrow clearance in which sludge and the like may be retained is formed.

Therefore, the present embodiment can restrain, to the greatest possible extent, occurrence of problems, such as a failure in an appropriate opening-closing operation of the oil feed valve 138, and at-all-times establishment of communication through the oil feed hole 132b2, which could otherwise result from adhesion of sludge and the like to a contact region between the oil feed valve surface 138a1 and the perimeter of the oil feed hole 132b2.

Referring again to FIG. 2, in the device configuration of the present embodiment, the oil feed valve 138 is provided at a position lower than the upper limit position for the float element 135a of the float valve 135. That is, the protrusion upper-plate 132b1, the oil feed hole 132b2, and the oil-feed-hole shutoff valve body 138a are disposed at a position lower than the above-mentioned upper limit position.

Accordingly, an oil level at which the float valve 135 opens the drain hole 132d becomes higher than an oil level at which the oil feed valve 138 opens the oil feed hole 132b2. In this case, at the time of drainage of oil, before the oil feed valve 138 closes, the float valve 135 opens. At the time of injection of oil, before the float valve 135 closes, the oil feed valve 138 opens. Therefore, according to the present embodiment, oil change can be carried out promptly and reliably.

In the device configuration of the present embodiment, the oil storage cavity section 131a and the first-chamber-forming cavity section 132a, which is located internally of the oil storage cavity section 131a, are provided in such a manner as to open toward the cylinder block 20a, which serves as the mechanism-to-be-lubricated. Also, a predetermined clearance that serves as the second chamber 30b is formed between the oil pan cover 131 and the oil pan separator 132. That is, in the present embodiment, the second chamber 30b is formed externally of the first chamber 30a.

Thus, according to the present embodiment, the second chamber 30b can function as a thermally insulating layer that covers the first chamber 30a in a thermally insulative manner. Therefore, according to the present embodiment, during the warming-up operation, an increase in the temperature of oil contained in the first chamber 30a is further accelerated, whereby the progress of the warming-up operation can further be accelerated. Furthermore, according to the present embodiment, at the time of the oil-change work, the second chamber 30b and the first chamber 30a located internally of the second chamber 30b can be appropriately adjusted in oil level.

Thus, according to the present embodiment, while promptness of the oil-change work is ensured, subsequently to completion of the warming-up operation, oil contained in the oil pan 130 can be efficiently circulated.

In the device configuration of the present embodiment, by means of the communication valve 136, the condition of communication through the oil communication path extending between the first chamber 30a and the second chamber 30b can be reliably changed over between the warming-up operation and the post-warming-up operation.

Therefore, according to the present embodiment, without lessening the effect of the 2-chamber-type oil pan structure; i.e., the effect of accelerating the progress of the warming-up operation, after completion of the warming-up operation, oil can be actively circulated between the first chamber 30a and the second chamber 30b. Therefore, there is solved a problem involved in conventional technology in that only a limited amount of oil contained in the first chamber 30a is intensively used with a resultant early deterioration of oil, so that impairment in durability of oil can be restrained.

In the device configuration of the present embodiment, the return-oil storage chamber 30c is formed above the second chamber 30b. After the communication valve 136 opens, the oil return control valve 137 opens.

Therefore, according to the present embodiment, oil stored in the second chamber 30b is fed to the first chamber 30a at an early stage. This can restrain an excessive drop in oil level in the first chamber 30a to the greatest possible extent. That is, the occurrence of a shortage of supply of oil to the engine block 20 can be restrained to the greatest possible extent.

In the device configuration of the present embodiment, the communication valve 136 is diagonally positioned (positioned most distant) in relation to the oil return control valve 137, which serves as a communication section between the return-oil storage chamber 30c and the second chamber 30b. Because of a temporary rise in oil level in the second chamber 30b which has arisen at a position located diagonally to the communication valve 136 in association with opening of the oil return control valve 137, oil contained in the second chamber 30b and residing in the vicinity of the communication valve 136 flows into the first chamber 30a through the communication valve 136.

Thus, according to the present embodiment, oil can be actively circulated within the oil pan 130. Therefore, impairment in durability of oil can further be restrained.

In the device configuration of the present embodiment, when, during the warming-up operation, a shortage of oil does not arise in the first chamber 30a, the float valve 135 reliably closes the drain hole 132d. Meanwhile, even during the warming-up operation, if the oil level in the first chamber 30a drops excessively, the float valve 135 lowers to thereby open the drain hole 132d, whereby oil contained in the second chamber 30b can be fed into the first chamber 30a through the drain hole 132d.

Therefore, according to the present embodiment, even when the oil level in the first chamber 30a abruptly drops, without hindrance to the acceleration of the warming-up operation, the occurrence of a shortage in supply of oil to the mechanism-to-be-lubricated can be restrained to the greatest possible extent.

According to the device configuration of the present embodiment, the valve surface 135c1 is spherically formed. This provides a good contact between the valve surface 135c1 and the drain hole 132d. This enhances the performance of sealing against leakage of oil through the drain hole 132d during the warming-up operation.

Referring to FIG. 3, in the device configuration of the present embodiment, the valve surface 135c1 and the valve-body contact face 132d1 are formed such that the radius of curvature Rv of the valve surface 135c1 and the radius of curvature RH of the valve-body contact face 132d1 are in the relation of $Rv \leq RH$.

In the case of $Rv \cong RH$, the valve surface 135c1 and the valve-body contact face 132d1 which have substantially the same radius of curvature are in surface contact with each other over a wider range. Therefore, the condition of contact between them is enhanced, thereby further enhancing the performance of sealing against leakage of oil through the drain hole 132d.

In the case of Rv<RH, a small clearance is formed between the valve-body contact face 132d1 and the valve surface 135c1. Thus, even when the float valve 135 is inclined as a result of inclination of the surface of oil as effected by application of a centrifugal force and acceleration to oil (at the time of jackrabbit start, sudden acceleration, turning, or the like), while good contact is maintained between the valve surface 135c1 and the valve-body contact face 132d1, the float valve 135 smoothly sways.

Thus, in this case, there can be effectively restrained a great impairment in the performance of sealing against leakage of oil through the drain hole 132d at the time of swaying of the float valve 135, which could otherwise result from the occurrence of a great clearance between the valve-body contact face 132d1 and the valve surface 135c1 at the time of swaying of the float valve 135.

Also, in this case, a clearance between the valve-body contact face 132d1 and the valve surface 135c1 increases with respect to an outward direction. Furthermore, the inclination of the valve surface 135c1 increases with respect to an outward direction. Therefore, sedimentation or adhesion of foreign matter in the clearance becomes unlikely to occur.

<Modifications>

The above-described embodiment is a mere example of the best mode which the applicant of the present invention contemplated at the time of filing the present application. The present invention is not limited to the above-described embodiment. Various modifications to the above-described embodiment are possible so long as the invention is not modified in essence.

Next will be exemplified as many modifications of the embodiment as can be added at the time of filing the present application under the first-to-file system. In the following description of the exemplified modifications and the above description of the embodiment, component members similar in structure and function are denoted by the same names and by similar reference numerals (the same reference numerals or reference numerals having the same last 2 digits). The description of such component members appearing in the above description of the embodiment can be applied to the following exemplified modifications so long as no inconsistencies are involved.

Needless to say, even modifications are not limited to those exemplified below. Limitingly construing the present invention based on the above embodiment and the following exemplified modifications impairs the interests of an applicant who is motivated to file as quickly as possible under the first-to-file system while unfairly benefiting imitators, is adverse to the purpose of the Patent Law of protecting and utilizing inventions, and is thus impermissible.

Also, needless to say, the following modifications are applicable in appropriate combination so long as no technical inconsistencies are involved.

Figure 10:
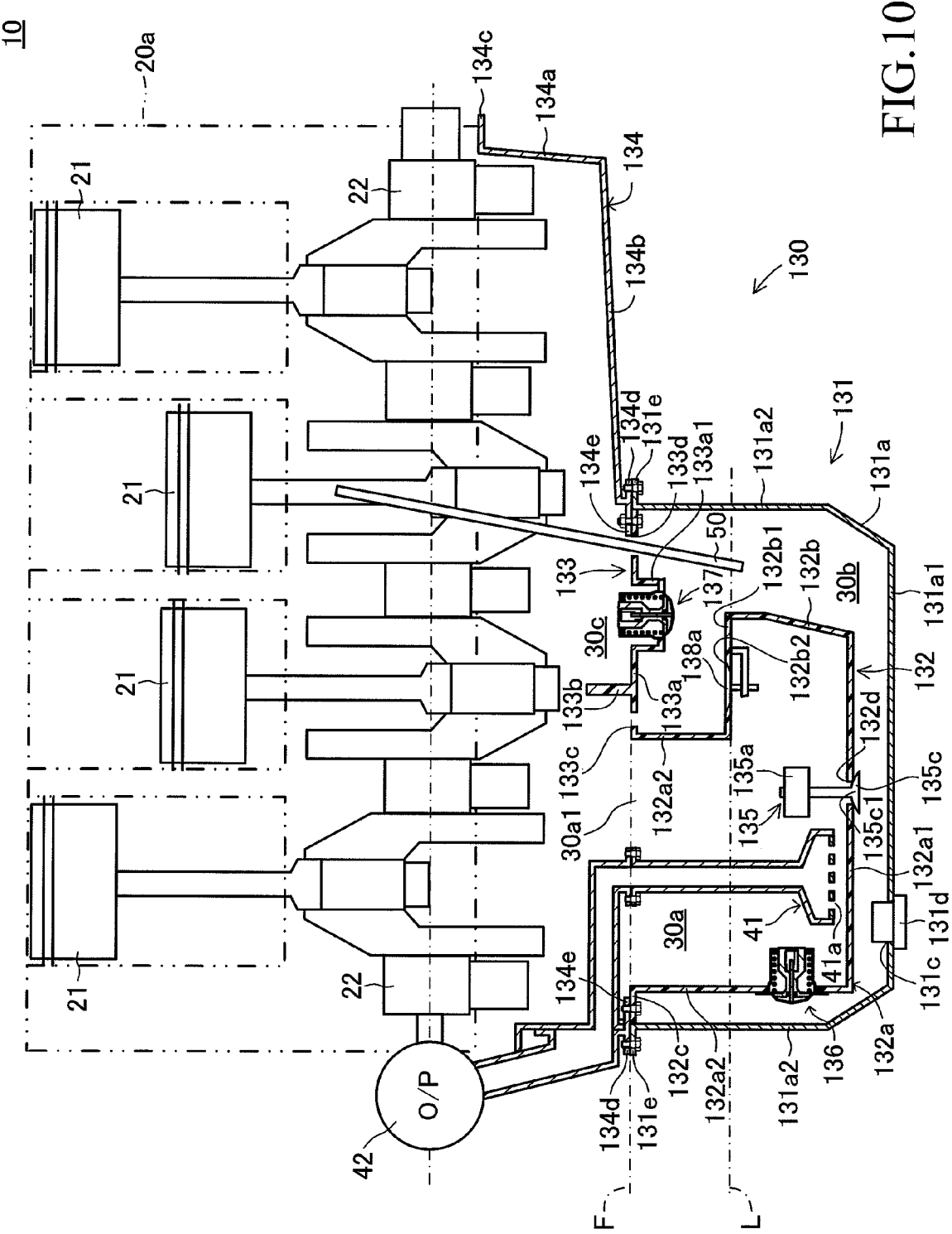
FIG. 10 is a side sectional view showing a schematic configuration of a modification of the oil pan shown in FIG. 2.
Figure 11A:
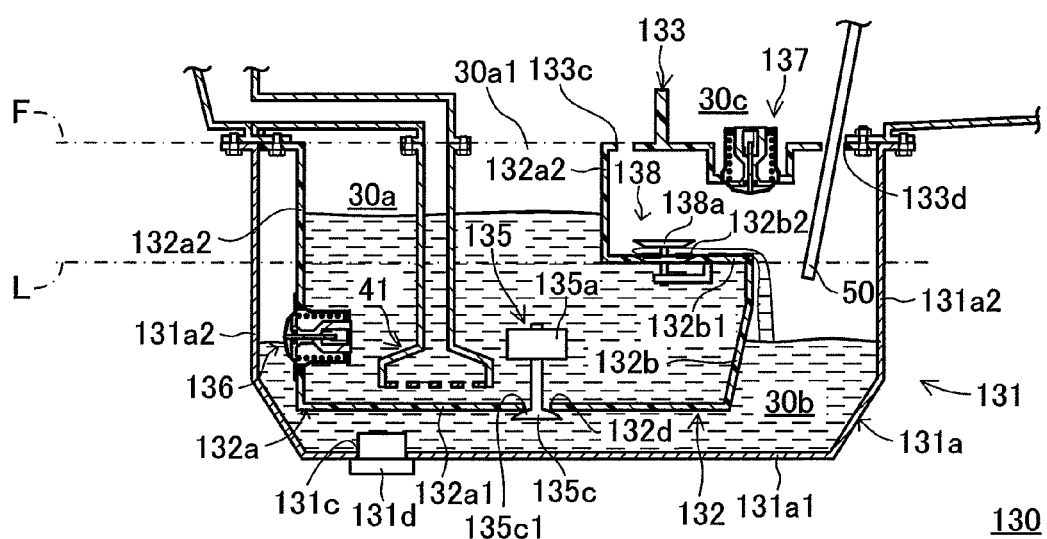
FIG. 11A is a side sectional view showing a state of operation at the time of oil injection in the oil pan shown in FIG. 10.
Figure 11B:
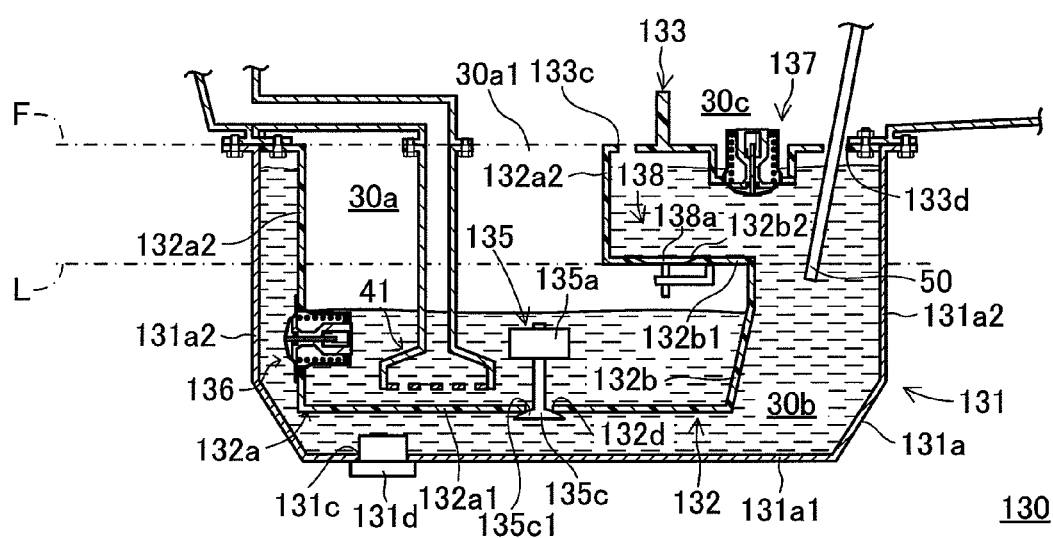
FIG. 11B is a side view showing a state of operation at the time of a warming-up operation in the oil pan.

(01) FIG. 10 is a side sectional view showing a schematic configuration of a modification of the oil pan 130 shown in FIG. 2. FIGS. 11A and 11B are side sectional views showing operations in the oil pan 130 shown in FIG. 10. FIG. 11A shows a state at the time of injection of oil, and FIG. 11B shows a state at the time of the warming-up operation.

In the oil pan 130 of the present modification, the protrusion 132b has a volume greater than that of the above-described embodiment. In the present modification, the oil pan separator 132 is configured such that the protrusion upper plate 132b1, which serves as an upper end portion of the protrusion 132b, is positioned at a level corresponding to the oil level "L."

According to such the configuration, as shown in FIG. 11A, similar to the above-described embodiment, at the time of injection of oil, the oil feed valve 138 opens on the basis of a difference in oil level between the first chamber 30a and the second chamber 30b. By virtue of this, injection of oil can be carried out promptly.

According to such the configuration, as shown in FIG. 11B, the volume of storage of oil in a bottom region of the first chamber 30a can be increased so long as the warming-up performance can be ensured. This can restrain, to the greatest possible extent, the occurrence of shortage of oil contained in the first chamber 30a at the time of cold start in an environment of a very low temperature as mentioned previously.

Furthermore, according to such the configuration, a narrow region of the second chamber 30b located laterally of the protrusion 132b extends relatively long along the vertical direction. By virtue of this, as shown in FIG. 11B, during the warming-up operation, a difference in oil level between the first chamber 30a and the second chamber 30b can be rendered relatively large. Accordingly, when, after completion of the warming-up operation, the communication valve 136 opens, oil contained in the second chamber 30b vigorously flows into the first chamber 30a, whereby oil is favorably circulated within the oil pan 130.

Figure 12:
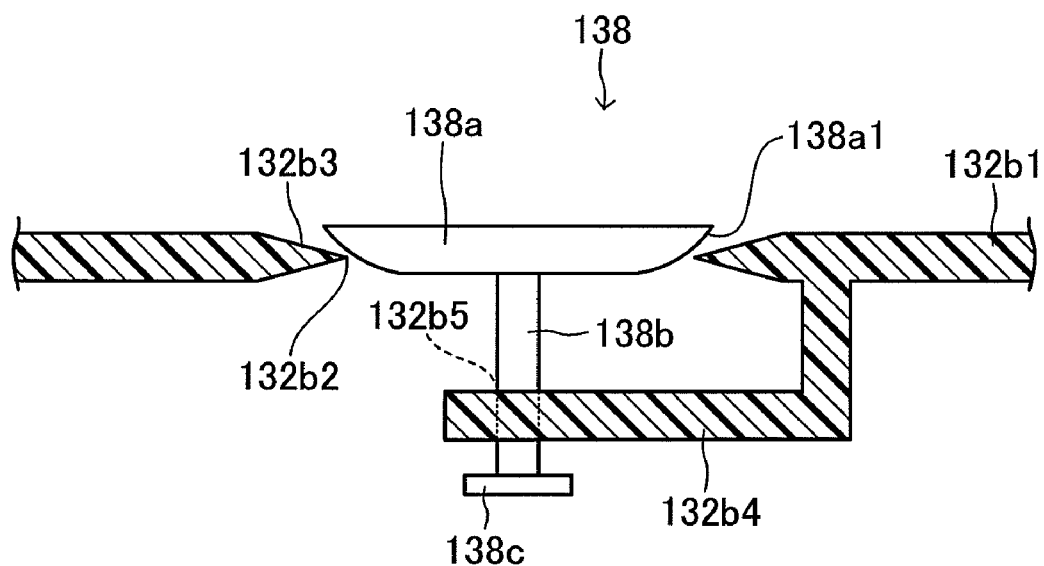
FIG. 12 is a side sectional view showing, on an enlarged scale, the configuration of a modification of the oil feed valve shown in FIG. 5.
Figure 13:
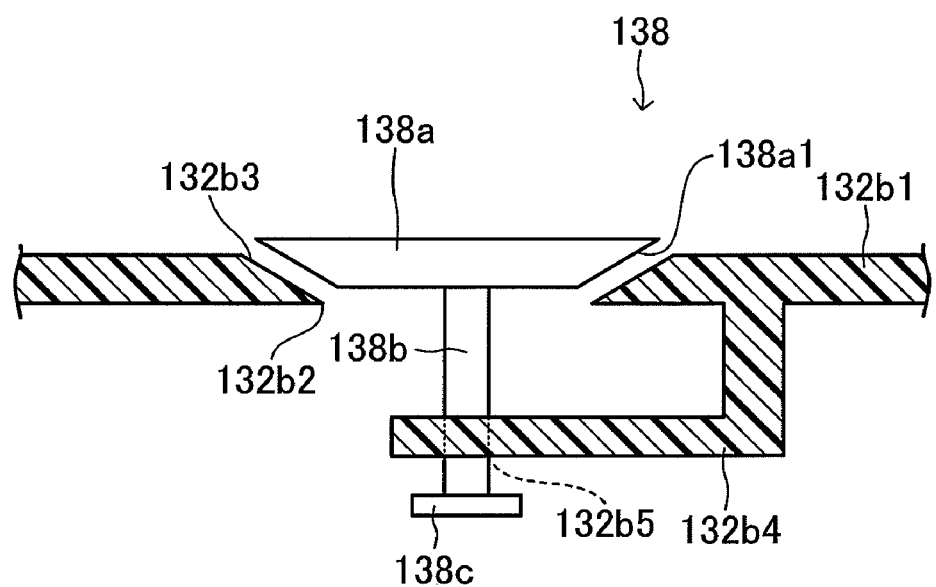
FIG. 13 is a side sectional view showing, on an enlarged scale, the configuration of another modification of the oil feed valve shown in FIG. 5.

(02) FIG. 12 is a side sectional view showing, on an enlarged scale, the configuration of a modification of the oil feed valve 138 shown in FIG. 5. FIG. 13 is a side sectional view showing, on an enlarged scale, the configuration of another modification of the oil feed valve 138 shown in FIG. 5.

As shown in FIG. 12, the oil feed valve surface 138a1 may be formed spherically or in the form of a curved surface. Also, as shown in FIG. 13, the oil feed valve surface 138a1 and the oil-feed-hole upper-surface 132b3 may be in surface contact with each other.

Figure 14A:
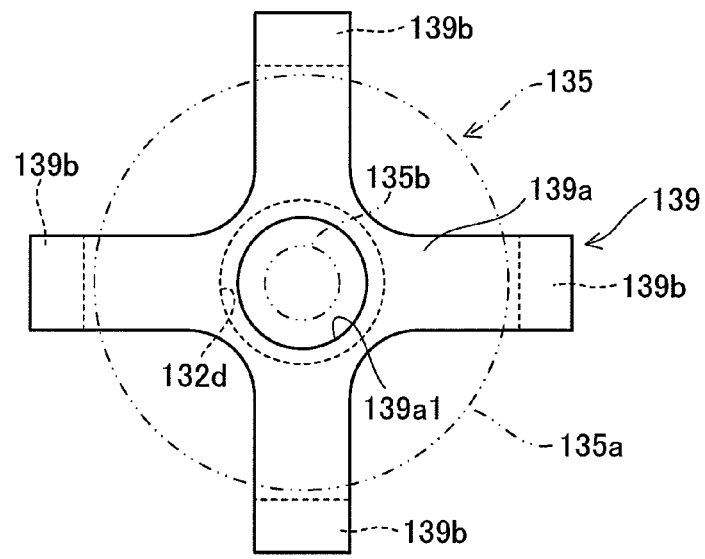
FIG. 14A is a plan view showing, on an enlarged scale, the configuration of a modification of a float valve shown in FIG. 2.
Figure 14B:
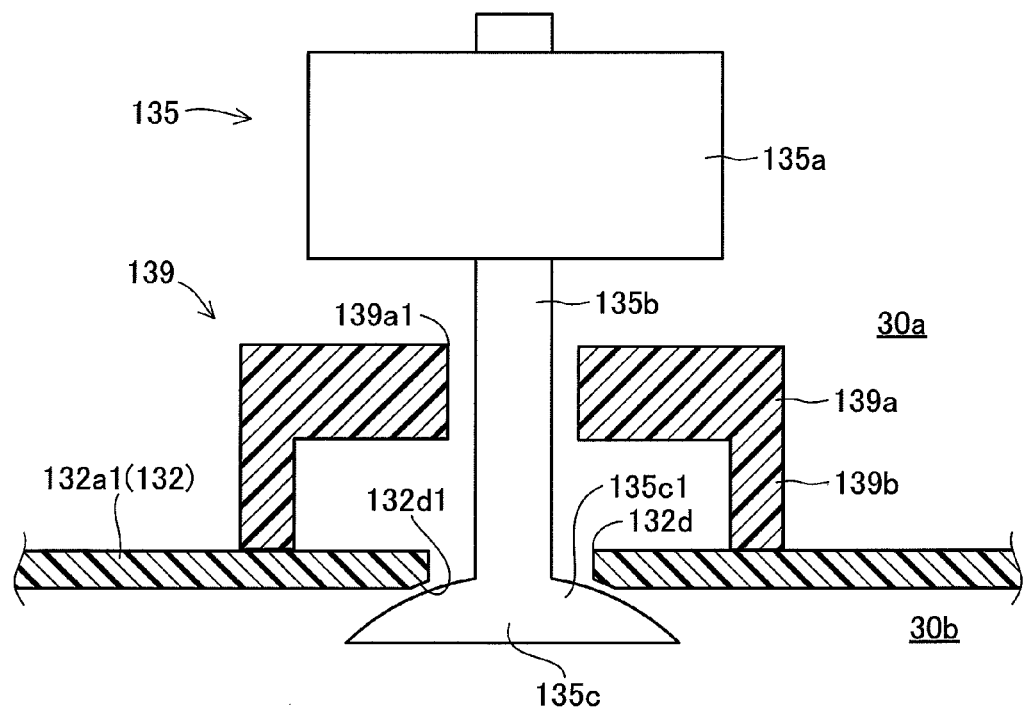
FIG. 14B is a side sectional view of the modification of the float valve.

(03) FIGS. 14A and 14B are plan views showing, on an enlarged scale, the configuration of a modification of the float valve 135 shown in FIG. 2, wherein FIG. 14A is a plan view, and FIG. 14B is a side sectional view. In FIG. 14A, component members of the float valve 135 are represented by the dash-dot-dot line.

In the present modification, a float guide member 139 is fixed on the upper surface (a surface located on a side toward the first chamber 30a) of the bottom plate 132a1 of the oil pan separator 132 and in the vicinity of the drain hole 132d. The float guide member 139 is disposed in such a manner as to face the connection bar 135b of the float valve 135. The float guide member 139 is configured to surround the connection bar 135b and guides a vertical movement of the connection bar 135b, whereby the inclination of the float valve 135 can be restrained.

Specifically, the float guide member 139 includes a plate-like guide portion 139a configured to surround the connection bar 135b of the float valve 135, and a plurality of leg portions 139b standing downward from the guide portion 139a. The float guide member 139 is configured such that, when the float valve 135 lowers to thereby open the drain hole 132d, oil can flow between the first chamber 30a and the second chamber 30b through the drain hole 132d and through a space located under the above-mentioned guide portion 139a and surrounded by the plurality of leg portions 139b.

According to such the configuration, even though, during operation of a vehicle, oil moves in association with starting, stopping, turning, going up or down a slope, or the like, the inclination of the float valve 135 is restrained. Also, the valve surface 135c1 is convexly spherically formed. Accordingly, even though the float valve 135 is inclined to some extent as a result of movement of oil, under the effect of buoyancy imposed on the float element 135a, the spherical valve surface 135c1 and the circular drain hole 132d are in favorably close contact with each other. Thus, particularly, during the warming-up operation, sealing against leakage of oil through the drain hole 132d can be carried out favorably.

In the case where, as shown in FIG. 14B, the valve surface 135c1 of the drain-hole shutoff valve body 135c of the float valve 135 is spherical, as mentioned above, the inclination of the float valve 135 does not greatly impair the state of restriction (shutoff) of oil flow between the first chamber 30a and the second chamber 30b. Therefore, in this case, as shown in FIGS. 14A and 14B, a relatively large clearance (e.g., about 5 mm) can be set between a guide hole 139a1 formed in the guide portion 139a of the float guide member 139 and the outer circumferential surface of the connection bar 135b.

According to such the configuration, the float valve 135 can quite smoothly move upward and downward according to variation of the oil level in the first chamber 30a. Particularly, at the time of draining the whole quantity oil from the first chamber 30a and the second chamber 30b, the oil drainage work can be carried out quite smoothly.

As shown in FIG. 14B, similar to the above-described embodiment, the valve-body contact face 132d1 may be formed at a lower end portion of the drain hole 132d of the bottom plate 132a1 of the oil pan separator 132.

Figure 15A:
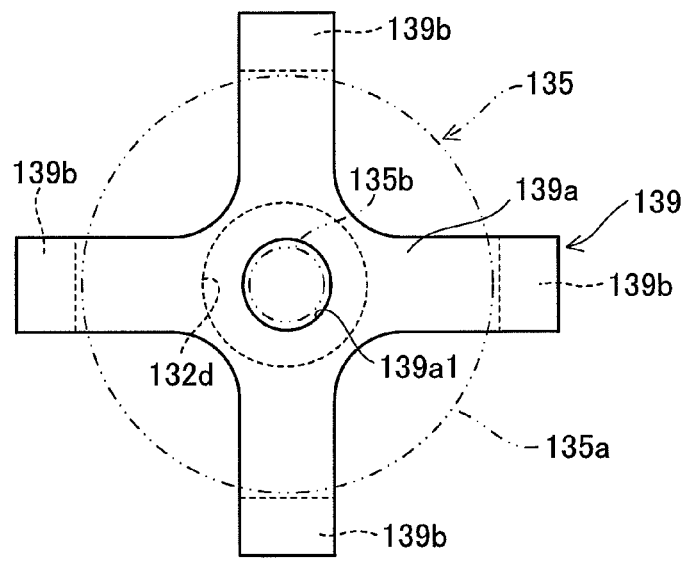
FIG. 15A is a plan view showing, on an enlarged scale, the configuration of another modification of the float valve shown in FIG. 2.
Figure 15B:
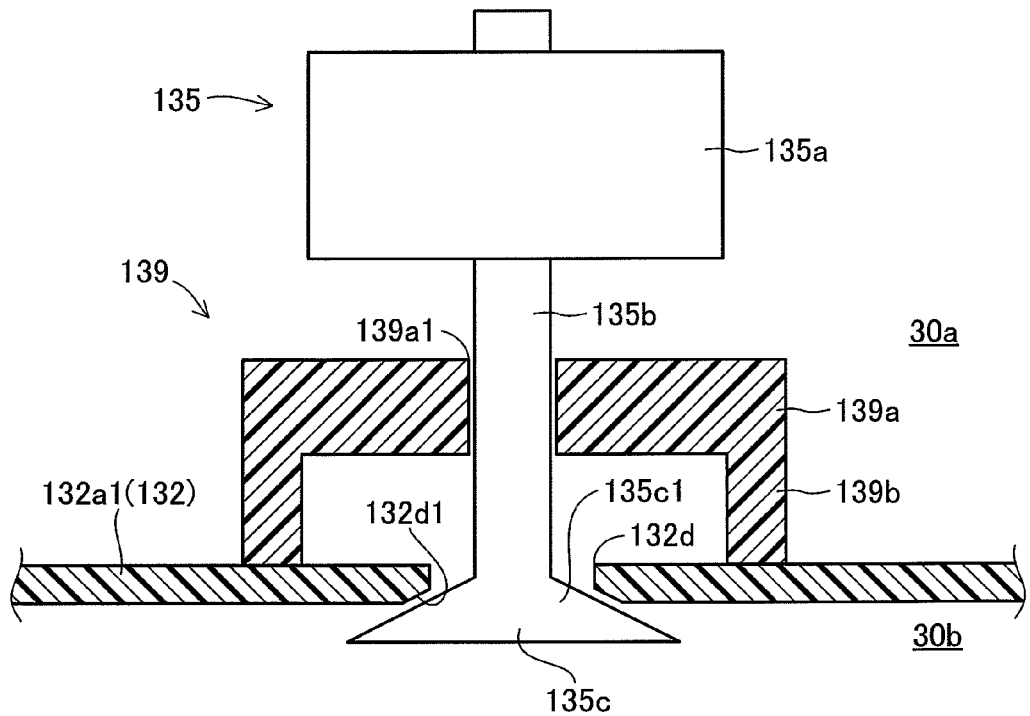
FIG. 15B is a side sectional view of the modification of the float valve.

(04) FIGS. 15A and 15B are views showing, on an enlarged scale, the configuration of another modification of the float valve 135 shown in FIG. 2. FIG. 15A is a plan view, and FIG. 15B is a side sectional view.

As shown in FIG. 15, in the case where the valve surface 135c1 is formed into a conical surface, a relatively small clearance (e.g., about 1 mm to about several mm) can be set between the guide hole 139a1 formed in the guide portion 139a of the float guide member 139 and the outer circumferential surface of the connection bar 135b. This can restrain the inclination of the float valve 135. Accordingly, there can be restrained a great impairment in the state of restriction (shutoff) of oil flow between the first chamber 30a and the second chamber 30b, which could otherwise result from the inclination of the float valve 135.

(05) FIGS. 16A, 16B, and 16C are side sectional views showing the configuration of a further modification of the float valve 135 shown in FIG. 2.

A float valve 235 according to the present modification includes a float element 235a, a connection bar 235b, and a drain-hole shutoff valve body 235c. In the present modification, a central portion of a lower surface 235a1 (a surface that faces a float guide member 239 to be described later) of the float element 235a is formed substantially into a conical surface, and a portion of the lower surface 235a1 around the central portion is formed into a planar surface. That is, through formation of such the lower surface 235a1 on the float element 235a, a projection is formed at a lower end portion of the float element 235a. A valve surface 235c1 of the drain-hole shutoff valve body 235c is formed spherically in such a manner as to be convexed outward.

The float guide member 239 of the present modification includes a guide portion 239a and leg portions 239b. The float guide member 239 (guide portion 239a) is configured to be able to cover most portion of the connection bar 235b along the longitudinal direction of the connection bar 235b.

An upper surface 239a2 of the float guide member 239 is formed into a shape corresponding to the above-mentioned lower surface 235a1 of the float element 235a. That is, a central portion of the lower surface 235a1 of the float element 235a is formed into the form of a conical depression, and a portion of the lower surface 235a1 around the central portion is formed into a planar surface. Through formation of such the upper surface 239a2 of the float guide member 239, a depression is formed at an upper end portion of the float guide member 239.

Furthermore, as shown in FIG. 16A, the lower surface 235a1 of the float element 235a and the upper surface 239a2 of the float guide member 239 are formed in parallel with each other such that, when the float valve 235 is positioned at the upper limit position, a clearance 6 between the lower surface 235a1 and the upper surface 239a2 becomes constant. That is, according to the present modification, the maximum downward travel of the float valve 235 is set to the minimum lift δ at which, at the time of the above-mentioned drainage of oil and at the time of an abrupt drop in oil surface in the first chamber 30a, a required amount of oil can pass through the drain hole 132d.

According to such the configuration, as shown in FIG. 16B, the float guide member 239 (guide portion 239a) surrounds most portion of the connection bar 235b of the float valve 235 along the longitudinal direction of the connection bar 235b. Therefore, the inclination of the float valve 235 can be restricted to the greatest possible extent.

Also, as shown in FIG. 16B, even when the float valve 235 positioned at the upper limit position is inclined, the drain hole 132d and the valve surface 235c1 are maintained in a state of good close contact with each other. Therefore, the performance of sealing against leakage of oil through the drain hole 132d can be favorably maintained.

As shown in FIG. 16C, when the float valve 235 is positioned at a lower position, the above-mentioned projection formed at a lower end portion of the float element 235a is engaged with the above-mentioned depression formed at an upper end portion of the float guide member 239. As shown in FIGS. 16A and 16C, the travel of the float valve 235 is set to a necessary minimum.

According to such the configuration, when the float valve 235 moves upward and downward, the float valve 235 is less inclined. Therefore, the float valve 235 can smoothly move upward and downward. Thus, as the oil level in the first chamber 30a rises, the float valve 235 smoothly moves up to the upper limit position, whereby the drain hole 132d can be closed promptly and reliably. As the oil level in the first chamber 30a lowers, the float valve 235 smoothly moves down to the lower position, whereby the drain hole 132d can be opened promptly and reliably, and a predetermined amount of oil can flow between the first chamber 30a and the second chamber 30b through the drain hole 132d.

Figure 17A:
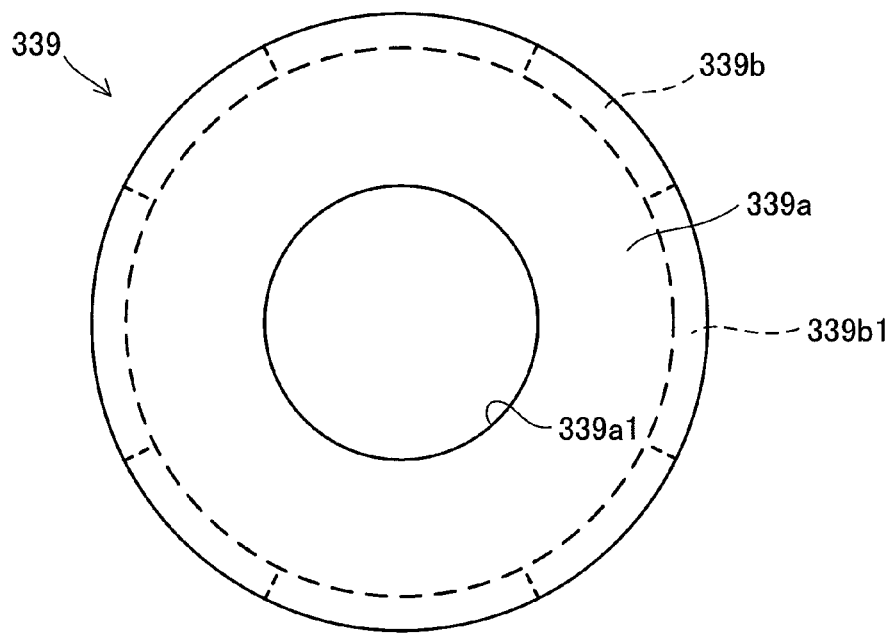
Figure 17B:
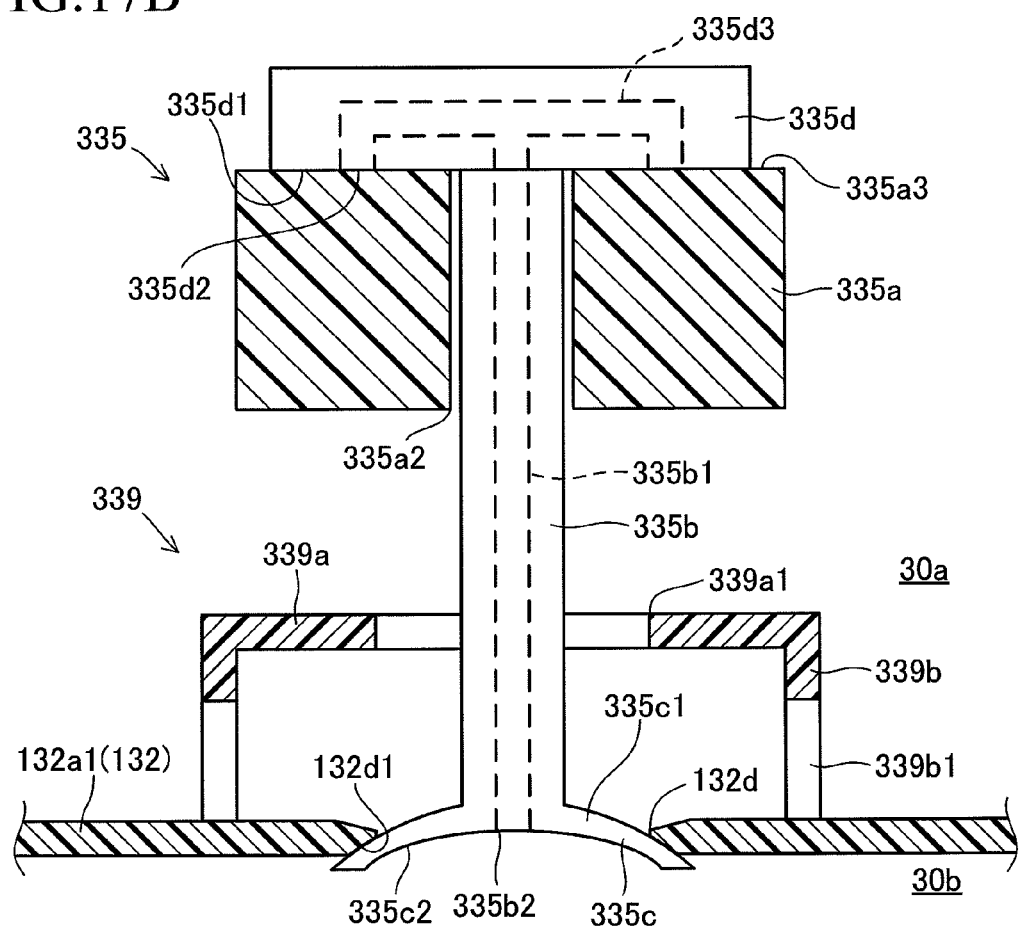

(06) FIGS. 17A and 17B are views showing the configuration of still another modification of the float valve 135 shown in FIG. 2. FIGS. 18A and 18B are side sectional views showing movements of the float valve shown in FIG. 17. The present modification employs a float valve 335 and a float guide member 339. FIG. 17A is a plan view of the float guide member 339, and FIG. 17B is a side sectional view showing, on an enlarged scale, the drain hole 132d and its periphery of the oil pan separator 132.

As shown in FIG. 17A, the float guide member 339 of the present modification includes a disklike guide portion 339a and a cylindrical leg portion 339b. A guide hole 339a1 is formed at a central portion of the guide portion 339a as viewed in plane for allowing the float valve 335 to extend therethrough. As shown in FIGS. 17A and 17B, the leg portion 339b has a plurality of openings 339b1, which serve as oil paths.

Referring to FIG. 17B, the float valve 335 of the present modification includes a float element 335a, a stem member 335b, a drain-hole shutoff valve body 335c, and a float stopper member 335d.

The float element 335a has a substantially cylindrical, external form. The float element 335a has a float through-hole 335a2 extending along the center axis of the above-mentioned cylindrical form. The rod-like stem member 335b extends through the float through-hole 335a2. The float through-hole 335a2 is formed such that a predetermined clearance is formed between the wall surface of the float through-hole 335a2 and the external surface of the rod-like stem member 335b. That is, the float element 335a is configured to be able to move along the vertical direction in FIG. 17B in relation to the stem member 335b.

A float upper-side surface 335a3, which is an upper surface (a surface opposite a side toward the drain-hole shutoff valve body 335c) of the float element 335a, is in the form of a plane having good flatness.

The stem member 335b is formed integrally with the drain-hole shutoff valve body 335c in such a manner as to extend upward from the drain-hole shutoff valve body 335c toward an inner region of the first chamber 30a. The stem member 335b is configured to be able to guide the upward and downward movement of the float element 335a by means of extending through the float through-hole 335a2 of the float element 335a with a predetermined clearance therebetween.

An intra-stem oil channel 335b1 is formed in the stem member 335b. The intra-stem oil channel 335b1 has a relatively large diameter (e.g., about 4 mm) for allowing low-temperature high-viscosity oil before completion of the warming-up operation to pass therethrough. A second-chamber-side opening 335b2, which is an end portion located toward the second chamber 30b, of the intra-stem oil channel 335b1 is located substantially at a central portion of the lower surface (a valve lower-side surface 335c2 to be described later) of the drain-hole shutoff valve body 335c.

The drain-hole shutoff valve body 335c is configured to be able to close the drain hole 132d from a side toward the second chamber 30b. A valve upper-side surface 335c1, which faces the drain hole 132d, of the drain-hole shutoff valve body 335c is spherically formed in such a manner as to be convexed upward. The valve lower-side surface 335c2 of the drain-hole shutoff valve body 335c, which is exposed toward the second chamber 30b, is concavely formed.

The float stopper member 335d1 is provided integrally with an upper end portion of the stem member 335b. A stopper lower-side surface 335d1, which is a lower surface (a surface which faces the float element 335a) of the float stopper member 335d, is in the form of a plane having good flatness. The float stopper member 335d is configured to be able to restrict rising of the float element 335a by means of the stopper lower-side surface 335d1 touching the float upper-side surface 335a3 of the float element 335a.

The stopper lower-side surface 335d has a first-chamber-side opening 335d2, which is an opening portion capable of opening in the first chamber 30a. The first-chamber-side opening 335d2 serves as an end portion, which is located on a side toward the first chamber 30a, of an intra-stopper oil channel 335d3 formed in the float stopper member 335d, and faces the float upper-side surface 335a3 of the float element 335a.

That is, the intra-stem oil channel 335b1 and the intra-stopper oil channel 335d3 constitute an intra-float-valve oil channel in such a manner as to extend between the second-chamber-side opening 335b2 formed in the valve lower-side surface 335c2, which is a surface located on the side toward the second chamber 30b of the drain-hole shutoff valve body 335c, and the first-chamber-side opening 335d2 formed in the stopper lower-side surface 335d1 of the float stopper member 335d.

In such the configuration, when the oil level in the first chamber 30a is sufficiently high, as shown in FIG. 18A, the float element 335a rises to an upper limit position where the float element 335a touches the float stopper member 335d. The float upper-side surface 335a3, which is an upper surface of the float element 335a having risen to the upper limit position, touches the stopper lower-side surface 335d1, which is a lower surface of the float stopper member 335d and in which the first-chamber-side opening 335d2 is formed.

Thus, the first-chamber-side opening 335d2 is closed by the float upper-side surface 335a3. This restrains (shuts off) the flowing of oil between the first chamber 30a and the second chamber 30b through the above-mentioned intra-float-valve oil channel.

When the oil level in the first chamber 30a lowers, as shown in FIG. 18B, the flow element 335a lowers from the upper limit position. At this time, the pressure of oil contained in the second chamber 30b pushes upward the valve lower-side surface 335c2, which is the surface of a bottom portion of the drain-hole shutoff valve body 335c, such that the valve lower-side surface 335c2 closes the drain hole 132d.

Thus, in a state in which the drain-hole shutoff valve body 335c closes the drain hole 132d (in a state in which the drain-hole shutoff valve body 335c, the stem member 335b, and the float stopper member 335d are collectively positioned at the upper limit position), only the float element 335a lowers.

At this time, the first-chamber-side opening 335d2, which has been closed by the float upper-side surface 335a3, is opened. This opens the intra-float-valve oil channel, which extends between the first-chamber-side opening 335d2 and the second-chamber-side opening 335b2, which is formed in the valve lower-side surface 335c2 of a bottom portion of the drain-hole shutoff valve body 335c. Under the effect of the above-mentioned pressure of oil imposed on a bottom portion of the drain-hole shutoff valve body 335c, oil contained in the second chamber 30b flows into the intra-float-valve oil channel through the second-chamber-side opening 335b2 and then flows into the first chamber 30a through the first-chamber-side opening 335d2, which serves as an end portion of the intra-float-valve oil channel located on a side toward the first chamber 30a.

According to such the configuration, when, during the warming-up operation, the oil level in the first chamber 30a drops excessively (e.g., when, immediately before cold start, the amount of oil is small), oil can be fed into the first chamber 30a from the second chamber 30b through the intra-float-valve oil channel.

Also, in the present modification, the valve upper-side surface 335c1, which faces the drain hole 132d, of the drain-hole shutoff valve body 335c is formed spherically in such a manner as to be convexed upward.

Thus, even when the float valve 335 positioned at the upper limit position is inclined because of movement of oil during operation, the valve upper-side surface 335c1 is in good contact with the drain hole 132d. Therefore, during operation (particularly, during the warming-up operation), an unintended establishment of communication of oil between the first chamber 30a and the second chamber 30b through the drain hole 132d can be reliably restrained.

In the process of draining the whole quantity oil from the first chamber 30a and the second chamber 30b, when the oil level in the first chamber 30a lowers further below that in FIG.

18B and becomes the level of the float guide member 339 or lower, as shown in FIG. 18C, the float element 335a rests on the flat guide portion 339a of the float guide member 339.

When the above-mentioned pressure of oil imposed on a bottom portion of the drain-hole shutoff valve body 335c lowers or disappears, the drain-hole shutoff valve body 335c, the stem member 335b, and the float stopper member 335d collectively move down to the lower position. Thus, the drain hole 132d is fully opened. Therefore, oil remaining in the first chamber 30a can be reliably drained into the second chamber 30b.

Also, in the present modification, the float guide member 339 is provided in such a manner as to face the stem member 335b of the float valve 335.

Thus, during operation, the inclination of the float valve 335 positioned at the upper limit position can be restrained to a certain extent.

Also, in the process of changing the whole quantity of oil contained in the first chamber 30a and the second chamber 30b, the upward and downward movement of the drain-hole shutoff valve body 335c, the stem member 335b, and the float stopper member 335d is guided.

Thus, in the process of changing the whole quantity of oil contained in the first chamber 30a and the second chamber 30b, the float valve 335 smoothly moves upward and downward. Therefore, as the oil level in the first chamber 30a rises, the float valve 335 reliably moves up to the upper limit position (FIG. 18A), whereby the performance of sealing against leakage of oil through the drain hole 132d can be favorably exhibited. Furthermore, in the process of draining the whole quantity of oil from the first chamber 30a and the second chamber 30b, the drain hole 132d is smoothly opened, whereby oil remaining in the first chamber 30a can be reliably drained into the second chamber 30b.

Figure 19A:
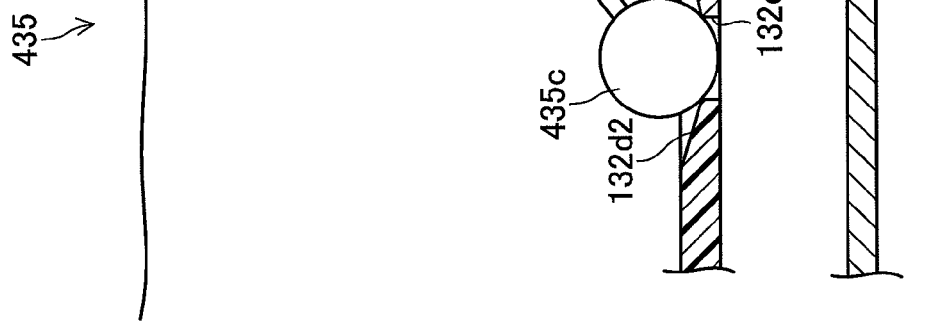
FIG. 19A is a front view showing the configuration of a still further modification of the float valve shown in FIG. 2.
Figure 19B:
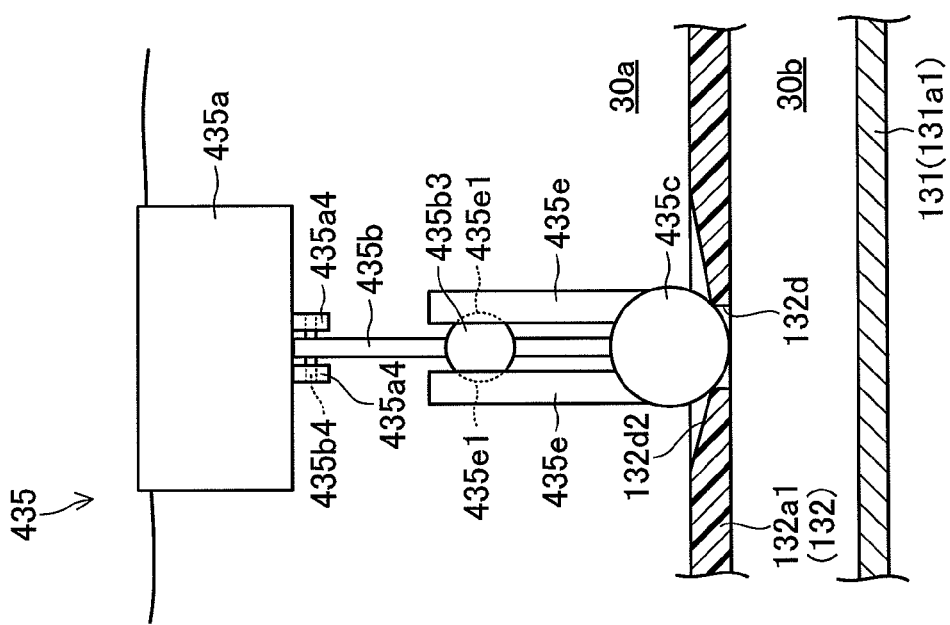
FIG. 19B is a side view of the modification of the float valve.

(07) FIGS. 19A and 19B are views showing the configuration of a still further modification of the float valve 135 shown in FIG. 2. FIG. 19A is a front view, and FIG. 19B is a side view. In FIG. 19, the bottom plate 131a1 of the oil pan cover 131 and the bottom plate 132a1 of the oil pan separator 132 are shown in section.

A float valve 435 of the present modification includes a float element 435a, a connection bar 435b, a drain-hole shutoff valve body 435c, and pivotal support members 435e.

In the present modification, unlike the above-described other modifications, the drain-hole shutoff valve body 435c is disposed inside the first chamber 30a and above the drain hole 132d. That is, the float valve 435 of the present modification is formed and disposed above the bottom plate 132a1 of the oil pan separator 132 and inside the first chamber 30a.

The connection bar 435b has a spherical pivot portion 435b3 formed at its substantially central portion. An upper end portion of the connection bar 435b is connected to a pair of ribs 435a4 provided on a lower end portion of the float element 435a via a pin 435b4. That is, the float element 435a is pivotally supported via the pin 435b4.

The spherical drain-hole shutoff valve body 435c is connected to a lower end portion of the connection bar 435b. A guide bevel 132d2 is formed around the drain hole 132d on the bottom plate 132a1 of the oil pan separator 132 in such a manner as to face the drain-hole shutoff valve body 435c. The guide bevel 132d2 assumes the form of a conical depression.

A pair of pivotal support members 435e stands upward toward an inner region of the first chamber 30a from the bottom plate 132a1 of the oil pan separator 132. The mutually facing inner surfaces of the paired pivotal support members 435e have respective support depressions 435e1 formed thereon. The support depressions 435e1 are provided at respective upper end portions of the pivotal support members 435e. Each of the support depressions 435e1 is a spherical depression having substantially the same radius of curvature as that of the pivot portion 435b3. The spherical pivot portion 435b3 is held in the paired support depressions 435e1 which face each other.

The connection bar 435b is supported by the paired pivotal support members 435e in such a manner as to be pivotable about the pivot portion 435b3 and the support depressions 435e1, which collectively serve as a pivotal center.

Specifically, referring to FIG. 19A, the connection bar 435b is designed to be able to pivotally move about the pivotal center by such a relatively small angle as to not interfere with the pivotal support members 435e. Referring to FIG. 19B, the connection bar 435b is designed to be able to pivotally move about the pivotal center clockwise and counterclockwise in a range between a state in which the drain-hole shutoff valve body 435c is in contact with the bottom plate 132a1 of the oil pan separator 132 (the float element 435a is positioned at the upper limit position), and a state in which the ribs 435a4 located at the lower end of the float element 435a are in contact with the bottom plate 132a1.

Referring to FIG. 19B, in the thus-configured float valve 435 of the present modification, as the float element 435a rises in association with an increase in the oil level in the first chamber 30a, the connection bar 435b pivotally moves clockwise (in a first direction). Accordingly, the drain-hole shutoff valve body 435c lowers. When the float element 435a rises to the upper limit position, the drain-hole shutoff valve body 435c touches the bottom plate 131a1 of the oil pan separator 132, thereby closing the drain hole 132d from above.

Also, in the float valve 435, as the float element 435a lowers in association with a decrease in the oil level in the first chamber 30a, the connection bar 435b pivotally moves clockwise in FIG. 19B (in a second direction opposite the first direction). Accordingly, the drain-hole shutoff valve body 435c rises, thereby opening the drain hole 132d.

Referring to FIG. 19A, in the float valve 435, when the drain-hole shutoff valve body 435c lowers in association with rising of the float element 435a, the drain-hole shutoff valve body 435c can be guided to a position just above the drain hole 132d so as to reliably close the drain hole 132d. Furthermore, in the float valve 435, even when oil sways in the left-right direction in FIG. 19 as a result of subjection to acceleration associated with starting, turning, accelerating, etc. of a vehicle, the drain-hole shutoff valve body 435c reliably closes the drain hole 132d.

Specifically, under the reaction of rising of the float element 435a as effected by buoyancy, the drain-hole shutoff valve body 435c is moved downward. The spherically formed lower surface (a surface that faces the drain hole 132d) of the drain-hole shutoff valve body 435c touches the guide bevel 132d2 in the form of a conical depression, whereby the drain-hole shutoff valve body 435c is guided to a position just above the drain hole 132d and closes the drain hole 132d from above with a predetermined pressing force.

In the configuration of the present modification, a component member of the float valve 435 is not disposed in the space between the bottom plate 131a1 of the oil pan cover 131 and the bottom plate 132a1 of the oil pan separator 132.

Thus, according to such the configuration, even when the bottom plate 131a1 of the oil pan cover 131 is deformed upward to thereby reduce the space between the bottom plate 131a1 and the bottom plate 132a1 of the oil pan separator 132, the functioning of the float valve 435 according to the oil level in the first chamber 30a is not hindered. Therefore, the float valve 435 can reliably function according to the oil level in the first chamber 30a.

Also, according to the present configuration, while the above-mentioned reliable functioning of the float valve 435 is ensured, the clearance between the bottom plate 131a1 of the oil pan cover 131 and the bottom plate 132a1 of the oil pan separator 132 can be reduced.

By virtue of this, while the space between the bottom plate 132a1 of the oil pan separator 132 and the oil suction port 41a (see FIG. 2) of the oil strainer 41 is set to such a large width as to allow good suction of oil through the oil suction port 41a, the bottom plate 132a1 and the oil suction port 41a can be disposed as low as possible.

Through employment of such the disposition, even when the amount of stored oil is reduced, the oil level in the first chamber 30a is more likely to be maintained above the oil suction port 41a of the oil strainer 41.

Thus, the occurrence of a shortage of supply of oil to the mechanism-to-be-lubricated can be restrained to the greatest possible extent. Also, without need to considerably increase the capacity of the oil pan 30 (see FIG. 1) and the capacity of the first chamber 30a, a supply of oil to the mechanism-to-be-lubricated can be ensured. Therefore, at the time of the warming-up operation, the temperature of oil contained in the first chamber 30a rises at an earlier stage, and thus the effect of further lowering fuel consumption can be yielded.

In the float valve 435 of the present modification, even in the case where the second chamber 30b (particularly, a region of the second chamber 30b located under the bottom plate 132a1 of the oil pan separator 132) is empty of oil, if the oil level in the first chamber 30a is higher than the upper limit position for the float element 435a, the drain hole 132d is not opened.

Thus, the float valve 435 of the present modification is applied in combination with the oil pan separator 132 having the configuration shown in FIG. 2.

That is, the oil pan separator 132, the oil feed valve 138, and the float valve 435 are configured such that, at the time of drainage of oil, after the float valve 435 of the present modification opens (start of lowering of the float element 435a and start of rising of the drain-hole shutoff valve body 435c), the oil feed valve 138 shown in FIG. 2 opens.

In other words, the oil pan separator 132, the oil feed valve 138, and the float valve 435 are configured such that the protrusion upper-plate 132b1 and the oil-feed-hole shutoff valve body 138a in FIG. 2 are lower than the upper limit position for the float element 435a.

Thus, according to the above-mentioned configuration, by virtue of the combination of the configuration in which the protrusion 132b and the oil feed valve 138 are disposed at a bottom portion of the oil pan 130 as shown in FIG. 2, and the configuration in which the float valve 435 is disposed above the bottom plate 132a1 of the oil pan separator 132 (disposed inside the first chamber 30a), good warming-up performance and a prompt, reliable oil-change work can be simultaneously achieved.

Figure 20:
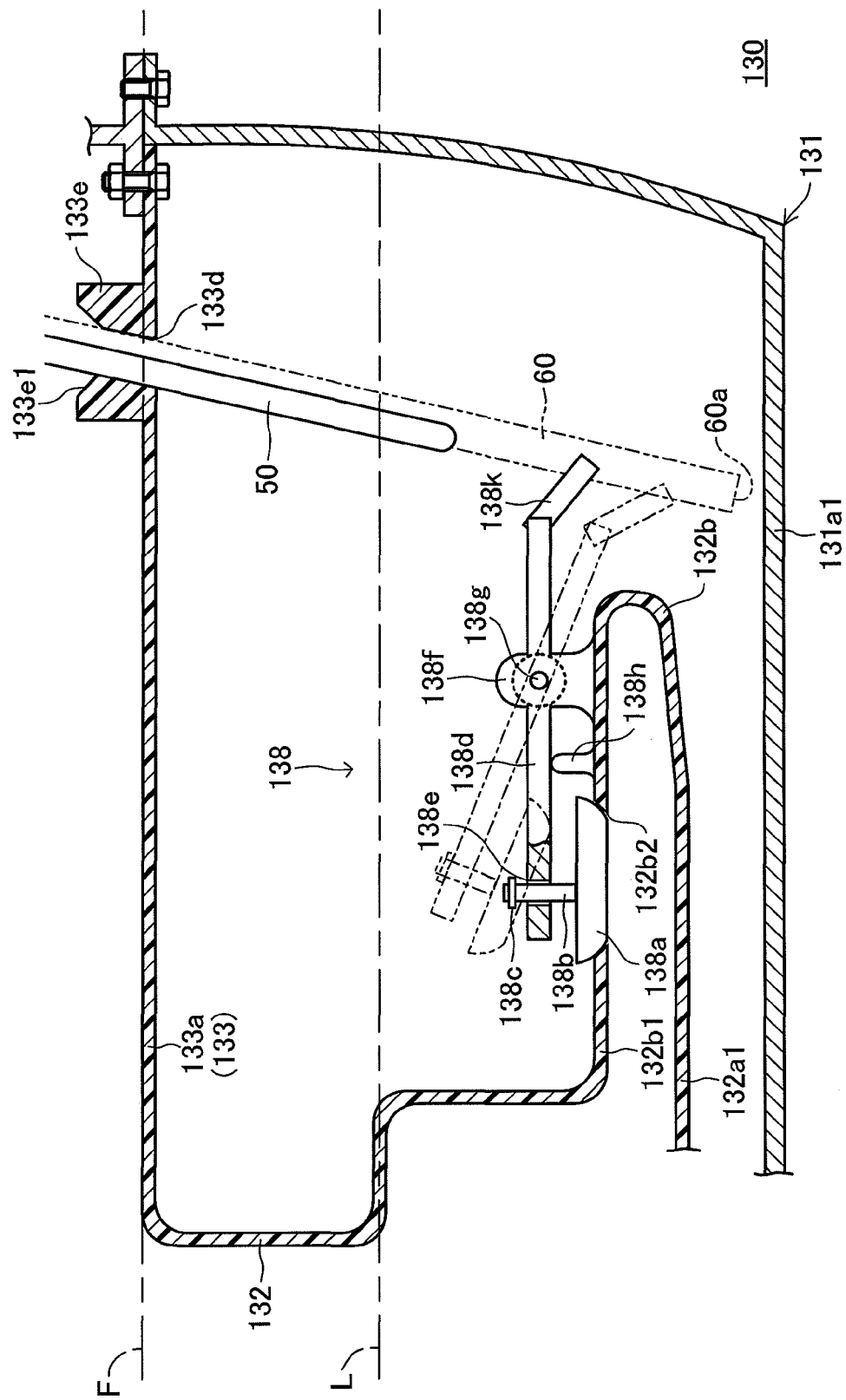
FIG. 20 is a side sectional view showing the configuration of essential portions of further modifications of the oil pan and the oil feed valve, respectively, shown in FIG. 2.
Figure 21:
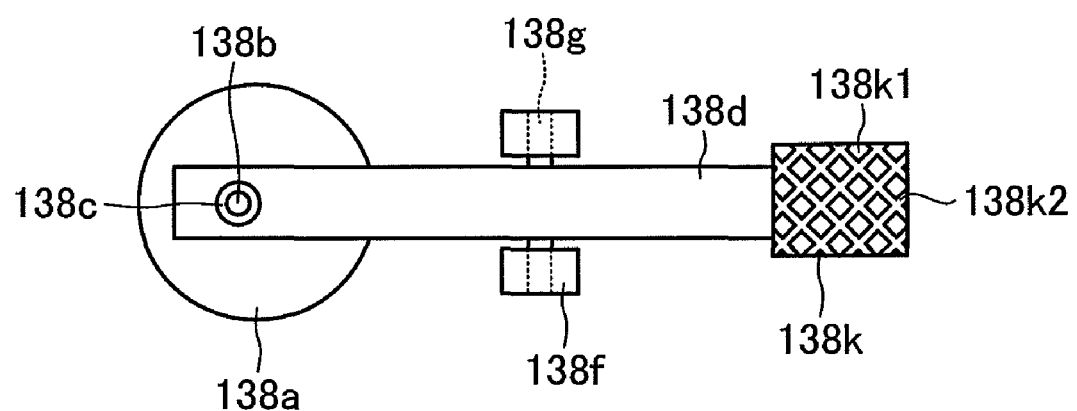
FIG. 21 is a plan view of the oil feed valve shown in FIG. 20.

(08) FIG. 20 is a side sectional view showing the configuration of essential portions of further modifications of the oil pan 130 and the oil feed valve 138, respectively, shown in FIG. 2. FIG. 21 is a plan view of the oil feed valve 138 shown in FIG. 20.

Referring to FIG. 20, in the oil pan 130, an oil-level-gauge support section 133e is formed in such a manner as to project upward from the horizontal partition plate 133a of the return-oil storage separator 133. The oil-level-gauge support section 133e has the oil-level-gauge support through-hole 133d extending therethrough.

An level-gauge guide surface 133e1 in the form of a conical depression is formed at an upper end portion of and around the oil-level-gauge support through-hole 133d.

The oil-level-gauge support through-hole 133d of the present embodiment is configured to allow insertion therethrough of a tube 60 for draining or injecting oil of a known oil-changing device used for oil-changing. The known oil-changing device is disclosed in, for example, Japanese Patent Application Laid-Open (kokai) Nos. 6-191600 and 7-42524.

Similar to the configuration of the above-described embodiment (see FIG. 2), the protrusion 132b of the oil pan separator 132 in the present modification is provided at a bottom portion of the oil pan 130.

The oil feed valve 138 in the present modification is disposed above the protrusion upper-plate 132b1 and the oil feed hole 132b2. The oil feed valve 138 is configured as described below in such a manner as to be able to close the oil feed hole 132b2 from above and to be able to open the oil feed hole 132b2 when the above-mentioned tube 60 is inserted through the oil-level-gauge support through-hole 133d.

The oil feed valve 138 includes an oil-feed-hole shutoff valve body 138a, a guide pin 138b, a stopper 138c, a link bar 138d, a guide hole 138e, link support ribs 138f, a pin 138g, a link downward-stopper 138h, and an abutment member 138k.

The oil-feed-hole shutoff valve body 138a is disposed above the oil feed hole 132b2 in such a manner as to be able to close the oil feed hole 132b2 from above. A material used to form the oil-feed-hole shutoff valve body 138a is similar to that used in the above-described embodiment.

The rod-like guide pin 138b stands upward from the oil-feed-hole shutoff valve body 138a. The stopper 138c is provided at an upper end portion of the guide pin 138b and has a diameter greater than that of the guide pin 138b.

The guide hole 138e, which is a through-hole, is formed in one end portion of the link bar 138d, which is formed of a rod-like member. The guide pin 138b is inserted through the guide hole 138e in such a manner as to be movable upward and downward. The guide hole 138e is formed such that its diameter is smaller than that of the stopper 138c.

The link bar 138d is configured such that, when the link bar 138d is in a substantially horizontal condition as represented by the solid line in FIG. 20, the guide hole 138e can guide an upward and downward movement of the oil-feed-hole shutoff valve body 138a. Also, the link bar 138d is configured such that, when the link bar 138d pivotally moves clockwise as represented by the dash-dot-dot line in FIG. 20, the link bar 138d can lift the oil-feed-hole shutoff valve body 138a via the stopper 138c and the guide pin 138b.

A pair of the link support ribs 138f stand upward from the protrusion upper-plate 132b1 of the oil pan separator 132. The paired link support ribs 138f are disposed such that the link support ribs 138f hold the link bar 138d therebetween in such a manner as to pivotally support the link bar 138d via the pin 138g.

The pin 138g is provided in such a manner as to pivotally support the link bar 138d and is located at a position which is biased, with respect to the longitudinal center of the link bar 138d, toward the other end portion of the link bar 138d opposite the one end portion where the guide hole 138e is formed. That is, in the link bar 138d, the position of the pin 138g is determined such that a mass that is located on the side toward the one end portion (left side in FIG. 20) with respect to the pin 138g is greater than the sum of a mass located on the side toward the other end portion and a mass of the abutment member 138*k*, which will be described later.

The link downward-stopper 138*h* stands upward from the protrusion upper-plate 132*b*1.

The link downward-stopper 138*h* is located between the link support ribs 138*f* and the oil feed hole 132*b*2. The link downward-stopper 138*h* is configured to be able to receive a pivotal movement of the link bar 138*d* when the link bar 138*d* pivotally moves about the pin 138*g* of the link bar 138*d* counterclockwise in FIG. 20 as effected by the own weight of a portion of the link bar 138*d* located on the side toward the one end portion of the link bar 138*d*, whereby the portion of the link bar 138*d* located on the side toward the one end portion of the link bar 138*d* can be supported substantially horizontally.

The abutment member 138*k* is provided at the other end portion of the link bar 138*d* opposite the one end portion. In the present embodiment, the abutment member 138*k* assumes the form of a flat plate. The abutment member 138*k* is disposed on an extension line of the center axis of the oil-level-gauge support through-hole 133*d*. The abutment member 138*k* is configured such that, when the above-mentioned tube 60 is inserted through the oil-level-gauge support through-hole 133*d*, the abutment member 138*k* can touch a distal end portion of the tube 60.

As shown in FIG. 20, the abutment member 138*k* is disposed so as to be spaced apart from the tip of the oil level gauge 50 in a state in which the oil level gauge 50 is supported in the oil-level-gauge support section 133*e*.

The oil feed valve 138 of the present modification is configured such that, when, in place of the oil level gauge 50, the tube 60 is inserted through the oil-level-gauge support through-hole 133*d* of the oil-level-gauge support section 133*e*, the link bar 138*d* is pivotally moved as represented by the dash-dot-dot line in FIG. 20.

The oil feed valve 138 is configured such that, in this case, the link bar 138*d* lifts the oil-feed-hole shutoff valve body 138*a*, whereby the oil feed hole 132*b*2 is forcibly opened. That is, the link section of the present invention includes the link bar 138*d*, the link support ribs 138*f*, the pin 138*g*, and the abutment member 138*k*.

Referring to FIG. 21, projections 138*k*1 and grooves 138*k*2 are formed on the upper surface of the abutment member 138*k*. In the present embodiment, the projections 138*k*1 and the grooves 138*k*2 are formed by means of knurling a flat plate.

The projections 138*k*1 and the grooves 138*k*2 are formed in such a geometry that, when the end portion of the tube 60 having a tube end opening 60*a* touches the abutment member 138*k*, clearances can be formed between the abutment member 138*k* and an end face around the tube end opening 60*a*.

Referring again to FIG. 20, in the configuration of the present modification, while the engine is operated, the oil level gauge 50 is supported in the oil-level-gauge support section 133*e*. That is, while the engine is operated, the oil level gauge 50 is inserted through the oil-level-gauge support through-hole 133*d*.

In this case, the tip of the oil level gauge 50 does not touch the abutment member 138*k*. Thus, in this case, the oil feed hole 132*b*2 is not opened. Therefore, particularly, during the warming-up operation, the oil feed hole 132*b*2 is reliably in a closed condition.

Meanwhile, in the process of changing oil in a manner similar to that of the above-described embodiment, while the upward and downward movement of the guide pin 138*b* is guided by the guide hole 138*e*, the oil-feed-hole shutoff valve body 138*a* moves upward and downward. In this manner, similar to the above-described embodiment, the first chamber 30*a* and the second chamber 30*b* are adjusted in oil level in an interlocking relation with each other.

In contrast to the above-described embodiment, in the process of changing oil by use of the oil-changing device, the tube 60 is inserted through the oil-level-gauge support through-hole 133*d*. A distal end portion of the tube 60 touches the abutment member 138*k*. Then, the abutment member 138*k* is pressed downward by the tube 60.

In this case, as represented by the dash-dot-dot line in FIG. 20, the link bar 138*d* rotates clockwise in FIG. 20. As a result of the rotation of the link bar 138*d*, the oil-feed-hole shutoff valve body 138*a* is lifted upward via the guide pin 138*b* and the stopper 138*c*. By this procedure, the oil feed hole 132*b*2 is opened.

Thus, when oil stored in the oil pan 130 is drained to the exterior of the oil pan 130 through the tube 60, oil can readily flow between the first chamber 30*a* and the second chamber 30*b* through the oil feed hole 132*b*2. Therefore, oil stored in the first chamber 30*a* and the second chamber 30*b* is drained promptly outward through the tube 60.

When fresh oil is injected through the tube 60 into the oil pan 130, which is empty through drainage of the whole quantity of oil, fresh oil can readily flow between the first chamber 30*a* and the second chamber 30*b* through the oil feed hole 132*b*2. Therefore, fresh oil spreads promptly to the first chamber 30*a* and the second chamber 30*b*.

In the case where the length of the tube 60 is short, oil may be drained and injected in a state in which the tube end opening 60*a* remains in contact with the upper surface of the abutment member 138*k*.

But then, in the present configuration, the projections 138*k*1 and the grooves 138*k*2 are formed on the upper surface of the abutment member 138*k*. By virtue of the projections 138*k*1 and the grooves 138*k*2, clearances are formed between the upper surface of the abutment member 138*k* and the tube end opening 60*a*. This prevents the tube end opening 60*a* from being closed.

As mentioned above, according to the configuration of the present modification, the closing of the oil feed hole 132*b*2 during operation and the opening of the oil feed hole 132*b*2 at the time of the oil-change work by use of the oil-changing device can be carried out reliably by means of a simple device configuration.

(09) The configuration of the present invention can be applied to applications other than the engine of the embodiment; for example, various lubrication devices each having an oil pan, such as automatic transmissions.

(10) For use as the communication valve 136 and/or the oil return control valve 137, in addition to the above-mentioned so-called thermostat valve device, those valve devices whose opening/closing action and opening can be controlled by an external device (engine control unit), such as solenoid valves, oil hydraulic valves, and pneumatic valves. By means of attaching a heater to the communication valve 136 and/or the oil return control valve 137, the communication valve 136 and/or the oil return control valve 137 can be forcibly opened by the external device.

(11) The oil pan separator 132 and the return-oil storage separator 133 can be formed independent of each other in the form of separate members. In this case, the oil pan separator 132 and the return-oil storage separator 133 can be joined together by bonding, fitting, bolting, etc.

(12) The return-oil storage separator 133 can be omitted. That is, the return-oil storage chamber 30*c* can be omitted.

In this case, a section of the oil pan separator 132 which is located externally (upwardly) of the first-chamber-forming cavity section 132a can be formed into such a slope as to extend upward and away from the strainer channel 43. That is, the section can be formed into such a slope that allows smooth descending flow of oil toward the first chamber 30a. The section can have the oil-level-gauge support through-hole 133d and the oil-level-gauge support section 133e.

(13) The lower case 134 may be formed integrally with the cylinder block 20a. Alternatively, the lower case 134 may be formed integrally with the oil pan cover 131. Furthermore, the lower case 134 may be formed integrally with the oil pan separator 132.

(14) In the case where the oil pan separator 132 does not have the protrusion 132b, the oil feed valve 138 can be provided at a lower portion of the side plate 132a2. In this case, the portion of the side plate 132a2 where the oil feed valve 138 is provided can be formed into such a slope that extends downward and away from the strainer channel 43. The oil-feed-hole shutoff valve body 138a can be formed of a flat-plate-like member whose upper end portion is pivotally supported by the side plate 132a2.

(15) Various configurations are available for holding the link bar 138d in a substantially horizontal condition when the tube 60 of the oil-changing device is not attached.

For example, a torsion spring may be provided in such a manner as to surround the pin 138g. Alternatively, a coil spring may be disposed in such a manner as to establish a bridge between a portion of the link bar 138d located on the side toward the one end portion of the link bar 138d and the protrusion upper-plate 132b1, which serves as an upper end portion of the protrusion 132b of the oil pan separator 132.

(16) In addition to the above-mentioned knurling process, a sandblasting process, a grooving process, etc. may be used to form the projections 138k1 and the grooves 138k2. Alternatively, holes or through-holes may be formed in the abutment member 138k in order to form convexoconcave on the abutment member 138k.

Figure 22:
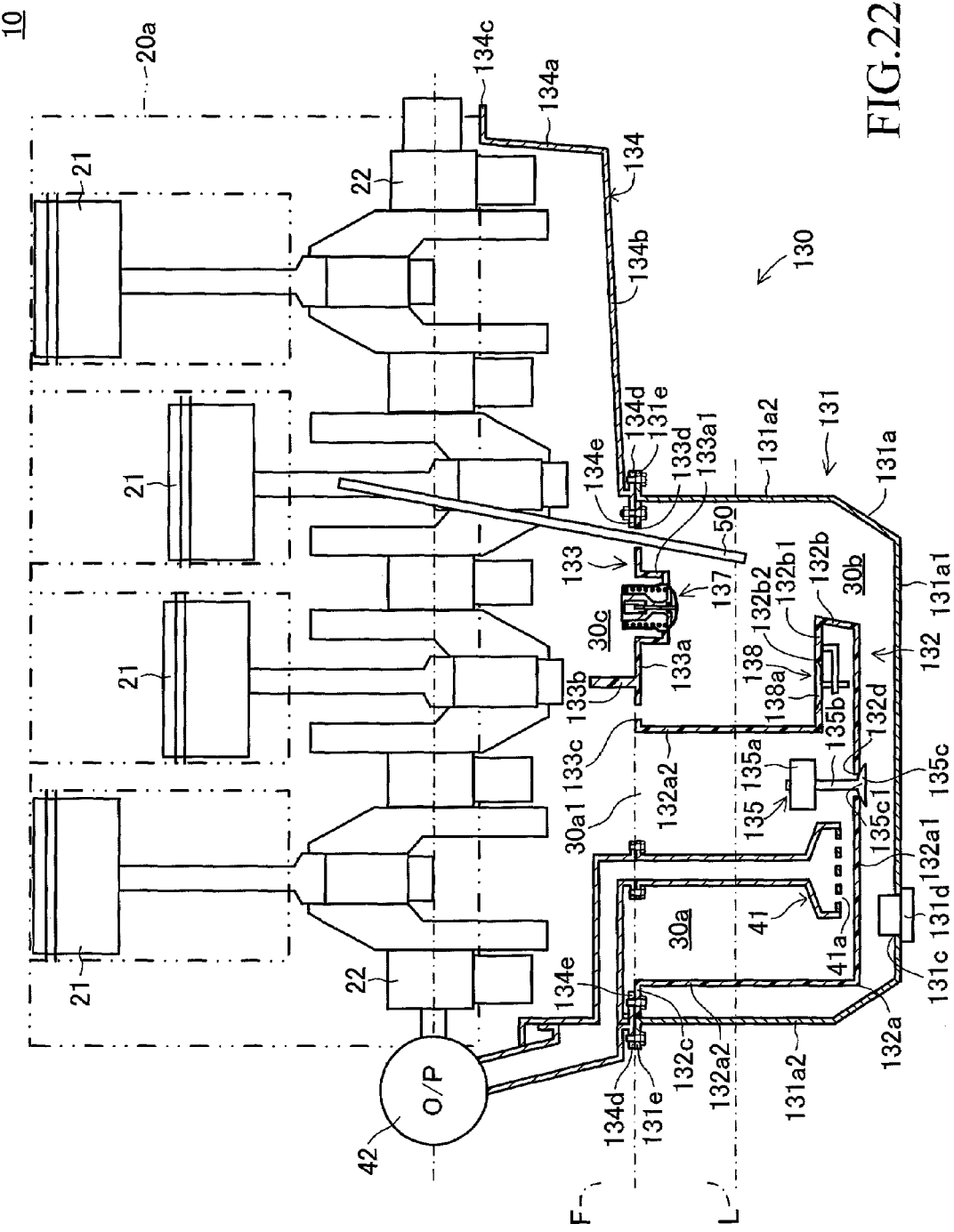
FIG. 22 is a side sectional view showing the configuration of another modification of the oil pan shown in FIG. 2.

(17) Needless to say, other modifications which are not specifically mentioned herein are encompassed in the scope of the invention so long as the invention is not modified in essence. For example, a unitarily formed component element appearing in the description of the above embodiment and modifications may be integrally formed in a seamless manner or may be formed by joining a plurality of separate parts together by bonding, welding, screwing, or the like. Also, the communication valve 136 may be omitted (see FIG. 22).

(18) Those components which constitute means for solving the problems to be solved by the invention and are illustrated with respect to operations and functions encompass not only the specific structures disclosed above in the description of the above embodiment and modifications but also any other structures that can implement the operations and functions.

The invention claimed is:

1. A lubrication device configured to be able to feed oil for lubricating a mechanism-to-be-lubricated to the mechanism, comprising:
    an oil pan configured to be able to store the oil in a space within the oil pan;
    an oil pump configured to be able to deliver the oil stored in the oil pan to the mechanism-to-be-lubricated; and
    an oil strainer having a suction port through which the oil residing in the space is sucked up, and connected to the oil pump via an oil flow path,
    wherein the oil pan comprises:
    an oil pan cover having an oil storage cavity section opening toward the mechanism-to-be-lubricated;
    an oil pan separator configured and disposed to divide a space within the oil storage cavity section into a first chamber in which the suction port of the oil strainer is disposed in a bottom region and a second chamber adjacent to the first chamber, the first chamber opens toward the mechanism-to-be-lubricated so as to communicate with the mechanism; and
    a one-way valve provided on the oil pan separator and configured to be able to allow substantially only outflow of the oil from the first chamber to the second chamber through functioning according to a difference in oil level between the first chamber and the second chamber.

2. A lubrication device according to claim 1, wherein the oil pan separator comprises:
    a bottom plate, and a side plate provided in such a manner as to surround the bottom plate, and connected to an end portion of the bottom plate; and
    a first-chamber-forming cavity section formed of the side plate and the bottom plate is configured to open toward the mechanism-to-be-lubricated.

3. A lubrication device according to claim 2, wherein the oil pan separator has an oil feed hole in the form of a through-hole formed in a region between the bottom plate and an upper end portion of the side plate; and
    the one-way valve has an oil-feed-hole shutoff valve body configured and disposed to be able to open and close the oil feed hole according to a difference in oil level between the first chamber and the second chamber.

4. A lubrication device according to claim 3, wherein the oil feed hole and the oil-feed-hole shutoff valve body are formed such that an outer perimeter of the oil-feed-hole shutoff valve body and a perimeter of the oil feed hole are in line contact with each other.

5. A lubrication device according to claim 3, wherein the oil pan separator has a protrusion formed in a region between an upper end of the side plate and a connection portion between the side plate and the bottom plate, and projecting laterally toward the outside of the oil pan;
    the oil feed hole is formed in a protrusion upper-plate, which serves as an upper end portion of the protrusion; and
    the oil-feed-hole shutoff valve body is configured to be able to close the oil feed hole from above the protrusion upper-plate by means of lowering by its own weight.

6. A lubrication device according to claim 3, further comprising an oil-level-gauge support section having an oil-level-gauge insertion hole for allowing insertion therethrough of an oil level gauge formed of a rod-like member and adapted to visually check an oil level in the oil pan, and configured to be able to support the oil level gauge when the oil level gauge is inserted into the oil-level-gauge insertion hole,
    wherein the one-way valve is configured such that, when, in place of the oil level gauge, a tube for draining or injecting the oil of an oil-changing device used for oil change is inserted into the oil-level-gauge insertion hole of the oil-level-gauge support section, the oil-feed-hole shutoff valve body opens the oil feed hole.

7. A lubrication device according to claim 6, wherein the one-way valve comprises:
    an abutment member located on an extension line of a center axis of the oil-level-gauge insertion hole and configured to be able to touch an end portion of the tube when the tube is inserted through the oil-level-gauge insertion hole, and
    a link section configured to move the oil-feed-hole shutoff valve body in a direction of opening the oil feed hole when the end portion of the tube touches and presses the abutment member.

8. A lubrication device according to claim 7, wherein convexoconcave is formed on a surface of the abutment member in such a geometry that, when the end portion of the tube having a tube end opening touches the surface of the abutment member, clearances are formed between the surface of the abutment member and an end face of the tube surrounding the tube end opening.

9. A lubrication device according to claim 7, wherein the abutment member is disposed so as to be spaced apart from a tip of the oil level gauge in a state in which the oil level gauge is supported in the oil-level-gauge support section.

10. A lubrication device according to claim 2, wherein a clearance that constitutes the second chamber is formed between the bottom plate of the oil pan separator and a bottom portion of the oil pan cover.

11. A lubrication device according to claim 10, further comprising a float valve configured to be able to open and close, according to an oil level in the first chamber, a drain hole which is formed in the form of a through-hole in the bottom plate of the oil pan separator so as to establish communication between the clearance constituting the second chamber, and a bottom region of the first chamber located above the clearance,
wherein the float valve comprises:
a float element disposed within the first chamber and configured to be able to float in the oil stored in the first chamber under the effect of buoyancy; and
a valve mechanism configured to be able to close the drain hole through rising of the float element associated with rising of an oil level in the first chamber.

12. A lubrication device according to claim 11, wherein
the valve mechanism comprises:
a drain-hole shutoff valve body disposed within the first chamber and above the drain hole;
a connection bar for connecting the drain-hole shutoff valve body and the float element together; and
a support member that pivotably supports the connection bar; and
the valve mechanism is configured such that the drain-hole shutoff valve body lowers through a pivotal movement of the connection bar in a first direction effected by rising of the float element associated with rising of the oil level in the first chamber and such that the drain-hole shutoff valve body rises through a pivotal movement of the connection bar in a second direction opposite the first direction effected by lowering of the float element associated with lowering of the oil level in the first chamber.

13. A lubrication device according to claim 11, wherein the one-way valve is disposed at a position lower than an upper limit position for the float element of the float valve.

14. An oil pan configured to be able to store oil for lubricating a mechanism-to-be-lubricated, comprising:
an oil pan cover having an oil storage cavity section opening toward the mechanism-to-be-lubricated;
an oil pan separator configured and disposed to divide a space within the oil storage cavity section into a first chamber which opens toward the mechanism-to-be-lubricated so as to communicate with the mechanism, and a second chamber adjacent to the first chamber; and
a one-way valve provided on the oil pan separator and configured to be able to allow substantially only outflow of the oil from the first chamber to the second chamber through actuation according to a difference in oil level between the first chamber and the second chamber.

15. An oil pan according to claim 14, wherein
the oil pan separator comprises:
a bottom plate, and
a side plate provided in such a manner as to surround the bottom plate, and connected to an end portion of the bottom plate; and
a first-chamber-forming cavity section formed of the side plate and the bottom plate is configured to open toward the mechanism-to-be-lubricated.

16. An oil pan according to claim 15, wherein
the oil pan separator has an oil feed hole in the form of a through-hole formed in a region between the bottom plate and an upper end portion of the side plate, and
the one-way valve has an oil-feed-hole shutoff valve body configured and disposed to be able to open and close the oil feed hole according to a difference in oil level between the first chamber and the second chamber.

17. An oil pan according to claim 16, wherein the oil feed hole and the oil-feed-hole shutoff valve body are formed such that an outer perimeter of the oil-feed-hole shutoff valve body and a perimeter of the oil feed hole are in line contact with each other.

18. An oil pan according to claim 16, wherein
the oil pan separator has a protrusion formed in a region between an upper end of the side plate and a connection portion between the side plate and the bottom plate, and projecting laterally toward the outside of the oil pan;
the oil feed hole is formed in a protrusion upper-plate, which serves as an upper end portion of the protrusion; and
the oil-feed-hole shutoff valve body is configured to be able to close the oil feed hole from above the protrusion upper-plate by means of lowering by its own weight.

19. An oil pan according to claim 16, further comprising an oil-level-gauge support section having an oil-level-gauge insertion hole for allowing insertion therethrough of an oil level gauge formed of a rod-like member and adapted to visually check an oil level in the oil pan, and configured to be able to support the oil level gauge when the oil level gauge is inserted into the oil-level-gauge insertion hole,
wherein the one-way valve is configured such that, when, in place of the oil level gauge, a tube for draining or injecting the oil of an oil-changing device used for oil change is inserted into the oil-level-gauge insertion hole of the oil-level-gauge support section, the oil-feed-hole shutoff valve body opens the oil feed hole.

20. An oil pan according to claim 19, wherein the one-way valve comprises:
an abutment member located on an extension line of a center axis of the oil-level-gauge insertion hole and configured to be able to touch an end portion of the tube when the tube is inserted through the oil-level-gauge insertion hole, and
a link section configured to move the oil-feed-hole shutoff valve body in a direction of opening the oil feed hole when the end portion of the tube touches and presses the abutment member.

21. An oil pan according to claim 20, wherein convexoconcave is formed on a surface of the abutment member in such a geometry that, when the end portion of the tube having a tube end opening touches the surface of the abutment member, clearances are formed between the surface of the abutment member and an end face of the tube around the tube end opening.

22. An oil pan according to claim 20, wherein the abutment member is disposed so as to be spaced apart from a tip of the oil level gauge in a state in which the oil level gauge is supported in the oil-level-gauge support section.

23. An oil pan according to claim 15, wherein a clearance that constitutes the second chamber is formed between the bottom plate of the oil pan separator and a bottom portion of the oil pan cover.

24. An oil pan according to claim 23, further comprising a float valve configured to be able to open and close, according to an oil level in the first chamber, a drain hole which is formed in the form of a through-hole in the bottom plate of the oil pan separator so as to establish communication between the clearance constituting the second chamber, and a bottom region of the first chamber located above the clearance,
wherein the float valve comprises:
a float element disposed within the first chamber and configured to be able to float in the oil stored in the first chamber under the effect of buoyancy; and
a valve mechanism configured to be able to close the drain hole through rising of the float element associated with rising of an oil level in the first chamber.

25. An oil pan according to claim 24, wherein
the valve mechanism comprises:
a drain-hole shutoff valve body disposed within the first chamber and above the drain hole;
a connection bar for connecting the drain-hole shutoff valve body and the float element together; and
a support member that pivotably supports the connection bar; and
the valve mechanism is configured such that the drain-hole shutoff valve body lowers through a pivotal movement of the connection bar in a first direction effected by rising of the float element associated with rising of the oil level in the first chamber and such that the drain-hole shutoff valve body rises through a pivotal movement of the connection bar in a second direction opposite the first direction effected by lowering of the float element associated with lowering of the oil level in the first chamber.

26. An oil pan according to claim 24, wherein the one-way valve is disposed at a position lower than an upper limit position for the float element of the float valve.

* * * * *